US008195646B2

(12) United States Patent
Evans et al.

(10) Patent No.: US 8,195,646 B2
(45) Date of Patent: Jun. 5, 2012

(54) SYSTEMS, METHODS, AND USER INTERFACES FOR STORING, SEARCHING, NAVIGATING, AND RETRIEVING ELECTRONIC INFORMATION

(75) Inventors: Christopher A. Evans, Sammamish, WA (US); David R. Parlin, Redmond, WA (US); Jason F. Moore, Redmond, WA (US); Lyon K. F. Wong, Issaquah, WA (US); Relja B. Ivanovic, Redmond, WA (US); Samuel Thomas Williams, Redmond, WA (US); Scott E. Dart, Redmond, WA (US); Stephan Hoefnagels, Seattle, WA (US); Timothy P. McKee, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 300 days.

(21) Appl. No.: 11/111,989

(22) Filed: Apr. 22, 2005

(65) Prior Publication Data

US 2006/0242164 A1    Oct. 26, 2006

(51) Int. Cl.
*G06F 17/30*  (2006.01)
(52) U.S. Cl. .................. 707/716; 707/803; 707/828
(58) Field of Classification Search .............. 707/762, 707/828, 627, 803, 767, 999.102, 716, 713, 707/705
See application file for complete search history.

(56) References Cited

U.S. PATENT DOCUMENTS

| | | | |
|---|---|---|---|
| 4,214,141 A | 7/1980 | Okuda | |
| 4,438,505 A | 3/1984 | Yanagiuchi | |
| 4,829,423 A | 5/1989 | Tennant et al. | |
| 4,881,179 A | 11/1989 | Vincent | |
| 4,931,935 A | 6/1990 | Ohira | |
| 5,060,135 A | 10/1991 | Levine et al. | |
| 5,230,072 A | 7/1993 | Smith et al. | |
| 5,241,671 A | 8/1993 | Reed et al. | |
| 5,297,250 A | 3/1994 | Leroy et al. | |
| 5,327,529 A | 7/1994 | Fults | |
| 5,333,266 A | 7/1994 | Boaz et al. | |
| 5,333,315 A | 7/1994 | Saether et al. | |
| 5,388,196 A | 2/1995 | Pajak et al. | |
| 5,418,946 A | 5/1995 | Mori | |
| 5,420,605 A | 5/1995 | Vouri | |
| 5,461,710 A | 10/1995 | Bloomfield et al. | |
| 5,499,364 A | 3/1996 | Klein et al. | |

(Continued)

FOREIGN PATENT DOCUMENTS

CN    1421800    11/2001

(Continued)

OTHER PUBLICATIONS

Bott, et al., Book titled "Special Edition Using Windows 98, Second Edition", Dec. 21, 1999, second edition, pp. 1-7.

(Continued)

*Primary Examiner* — Sherief Badawi
(74) *Attorney, Agent, or Firm* — Shook Hardy & Bacon L.L.P.

(57) ABSTRACT

Computer system navigation tools provide "links" to various different files, lists, folders, and/or other storage elements and allow users to organize files, e.g., by hierarchical properties, lists, auto lists, folders, and the like. Such systems and methods allow users to assign properties to a file (optionally in a hierarchical manner), to change assigned properties, to search, view, and retrieve information based on the assigned properties, and the like.

8 Claims, 26 Drawing Sheets

U.S. PATENT DOCUMENTS

| | | | |
|---|---|---|---|
| 5,504,852 A | 4/1996 | Thompson-Rohrlich | |
| 5,513,306 A | 4/1996 | Mills et al. | |
| 5,544,360 A | 8/1996 | Lewak et al. | |
| 5,546,527 A | 8/1996 | Fitzpatrick | |
| 5,550,852 A | 8/1996 | Patel et al. | |
| 5,559,948 A | 9/1996 | Bloomfield et al. | |
| 5,583,982 A | 12/1996 | Matheny et al. | |
| 5,590,259 A | 12/1996 | Anderson et al. | |
| 5,596,702 A | 1/1997 | Stucka | |
| 5,598,524 A | 1/1997 | Johnston, Jr. et al. | |
| 5,600,778 A | 2/1997 | Swanson et al. | |
| 5,606,669 A | 2/1997 | Bertin et al. | |
| 5,625,783 A | 4/1997 | Ezekiel | |
| 5,630,042 A | 5/1997 | McIntosh et al. | |
| 5,648,795 A | 7/1997 | Vouri | |
| 5,652,876 A | 7/1997 | Ashe | |
| 5,675,520 A | 10/1997 | Pitt | |
| 5,675,663 A | 10/1997 | Koerner et al. | |
| 5,680,563 A | 10/1997 | Edelman | |
| 5,696,486 A | 12/1997 | Poliquin et al. | |
| 5,696,914 A | 12/1997 | Nahaboo | |
| 5,710,926 A | 1/1998 | Maurer | |
| 5,721,908 A | 2/1998 | Lagarde et al. | |
| 5,757,925 A | 5/1998 | Faybishenko | |
| 5,760,770 A | 6/1998 | Bliss | |
| 5,790,121 A | 8/1998 | Sklar et al. | |
| 5,802,516 A | 9/1998 | Shwarts et al. | |
| 5,828,376 A | 10/1998 | Solimene et al. | |
| 5,831,606 A | 11/1998 | Nakajima et al. | |
| 5,835,094 A | 11/1998 | Ermel et al. | |
| 5,838,317 A | 11/1998 | Bolnick et al. | |
| 5,838,322 A | 11/1998 | Nakajima et al. | |
| 5,855,446 A | 1/1999 | Disborg | |
| 5,864,844 A | 1/1999 | James et al. | |
| 5,867,163 A | 2/1999 | Kurtenbach | |
| 5,870,088 A | 2/1999 | Washington | |
| 5,875,446 A | 2/1999 | Brown et al. | |
| 5,875,448 A | 2/1999 | Boys | |
| 5,878,410 A | 3/1999 | Zbikowski et al. | |
| 5,886,694 A | 3/1999 | Breinberg et al. | |
| 5,899,995 A | 5/1999 | Millier et al. | |
| 5,905,973 A | 5/1999 | Yonezawa et al. | |
| 5,907,703 A | 5/1999 | Kronenberg | |
| 5,907,837 A | 5/1999 | Ferrel | |
| 5,909,540 A | 6/1999 | Carter et al. | |
| 5,923,328 A | 7/1999 | Griesmer | |
| 5,924,090 A | 7/1999 | Krellenstein | |
| 5,929,854 A | 7/1999 | Ross | |
| 5,930,801 A | 7/1999 | Falkenhainer | |
| 5,933,139 A | 8/1999 | Feigner et al. | |
| 5,935,210 A | 8/1999 | Stark | |
| 5,973,686 A | 10/1999 | Shimogori | |
| 5,987,454 A | 11/1999 | Hobbs | |
| 5,987,506 A | 11/1999 | Carter et al. | |
| 6,003,040 A | 12/1999 | Mital et al. | |
| 6,008,806 A | 12/1999 | Nakajima et al. | |
| 6,014,137 A | 1/2000 | Burns | |
| 6,016,692 A | 1/2000 | Schaenzer et al. | |
| 6,021,262 A | 2/2000 | Cote et al. | |
| 6,023,708 A | 2/2000 | Mendez et al. | |
| 6,024,843 A | 2/2000 | Anderson et al. | |
| 6,037,944 A | 3/2000 | Hugh | |
| 6,055,540 A * | 4/2000 | Snow et al. | 707/103 R |
| 6,055,543 A | 4/2000 | Christensen et al. | |
| 6,061,059 A | 5/2000 | Taylor | |
| 6,061,692 A | 5/2000 | Thomas et al. | |
| 6,061,695 A | 5/2000 | Slivka et al. | |
| 6,065,012 A | 5/2000 | Balsara et al. | |
| 6,078,924 A | 6/2000 | Ainsbury et al. | |
| 6,097,389 A | 8/2000 | Morris et al. | |
| 6,101,509 A | 8/2000 | Hanson | |
| 6,144,968 A | 11/2000 | Zellweger | |
| 6,147,601 A | 11/2000 | Sandelman et al. | |
| 6,160,552 A | 12/2000 | Wilsher | |
| 6,175,364 B1 | 1/2001 | Wong et al. | |
| 6,181,342 B1 | 1/2001 | Niblack | |
| 6,182,068 B1 | 1/2001 | Culliss | |
| 6,195,650 B1 | 2/2001 | Gaither et al. | |
| 6,202,061 B1 | 3/2001 | Khosla et al. | |
| 6,208,985 B1 | 3/2001 | Krehel | |
| 6,216,122 B1 | 4/2001 | Elson | |
| 6,237,004 B1 | 5/2001 | Dodson et al. | |
| 6,237,011 B1 | 5/2001 | Ferguson et al. | |
| 6,240,407 B1 * | 5/2001 | Chang et al. | 707/2 |
| 6,240,421 B1 | 5/2001 | Stolarz | |
| 6,243,094 B1 | 6/2001 | Sklar | |
| 6,243,724 B1 | 6/2001 | Mander et al. | |
| 6,246,411 B1 | 6/2001 | Strauss | |
| 6,256,031 B1 * | 7/2001 | Meijer et al. | 715/854 |
| 6,268,852 B1 | 7/2001 | Lindhorst et al. | |
| 6,271,846 B1 | 8/2001 | Martinez et al. | |
| 6,275,829 B1 | 8/2001 | Angiulo et al. | |
| 6,279,016 B1 | 8/2001 | De Vorchik et al. | |
| 6,301,586 B1 | 10/2001 | Yang et al. | |
| 6,308,173 B1 | 10/2001 | Glasser et al. | |
| 6,317,142 B1 | 11/2001 | Decoste et al. | |
| 6,324,541 B1 | 11/2001 | de l'Etraz et al. | |
| 6,324,551 B1 | 11/2001 | Lamping et al. | |
| 6,326,953 B1 | 12/2001 | Wana | |
| 6,330,007 B1 | 12/2001 | Isreal | |
| 6,339,767 B1 | 1/2002 | Rivette et al. | |
| 6,341,280 B1 | 1/2002 | Glass et al. | |
| 6,342,907 B1 | 1/2002 | Petty | |
| 6,356,863 B1 | 3/2002 | Sayle | |
| 6,356,915 B1 | 3/2002 | Chtchetkine et al. | |
| 6,363,377 B1 | 3/2002 | Kravets et al. | |
| 6,363,400 B1 | 3/2002 | Chtchetkine et al. | |
| 6,369,840 B1 | 4/2002 | Barnett et al. | |
| 6,370,518 B1 | 4/2002 | Payne et al. | |
| 6,377,283 B1 | 4/2002 | Thomas | |
| 6,393,429 B1 | 5/2002 | Yagi et al. | |
| 6,401,097 B1 | 6/2002 | McCotter et al. | |
| 6,405,265 B1 | 6/2002 | Kronenberg | |
| 6,408,298 B1 | 6/2002 | Van | |
| 6,411,311 B1 | 6/2002 | Rich et al. | |
| 6,425,120 B1 | 7/2002 | Morganelli et al. | |
| 6,425,121 B1 | 7/2002 | Phillips | |
| 6,407,761 B1 | 8/2002 | Ching et al. | |
| 6,430,575 B1 | 8/2002 | Dourish et al. | |
| 6,437,807 B1 | 8/2002 | Berquist et al. | |
| 6,438,590 B1 | 8/2002 | Gartner | |
| 6,448,985 B1 | 9/2002 | McNally | |
| 6,453,311 B1 | 9/2002 | Powers, III | |
| 6,453,319 B1 | 9/2002 | Mattis et al. | |
| 6,462,762 B1 | 10/2002 | Ku | |
| 6,466,228 B1 | 10/2002 | Ulrich et al. | |
| 6,466,238 B1 | 10/2002 | Berry et al. | |
| 6,466,932 B1 | 10/2002 | Dennis et al. | |
| 6,470,344 B1 | 10/2002 | Kothuri et al. | |
| 6,473,100 B1 | 10/2002 | Beaumont et al. | |
| 6,480,835 B1 | 11/2002 | Light | |
| 6,483,525 B1 | 11/2002 | Tange | |
| 6,484,205 B1 | 11/2002 | Byford | |
| 6,505,233 B1 | 1/2003 | Hanson et al. | |
| 6,513,038 B1 | 1/2003 | Hasegawa et al. | |
| 6,519,612 B1 | 2/2003 | Howard et al. | |
| 6,526,399 B1 | 2/2003 | Coulson et al. | |
| 6,535,229 B1 | 3/2003 | Kraft | |
| 6,535,230 B1 | 3/2003 | Celik | |
| 6,539,399 B1 | 3/2003 | Hazama et al. | |
| 6,544,295 B1 | 4/2003 | Bodnar | |
| 6,549,217 B1 | 4/2003 | De Greef et al. | |
| 6,549,916 B1 | 4/2003 | Sedlar | |
| 6,563,514 B1 | 5/2003 | Samar | |
| 6,571,245 B2 | 5/2003 | Huang et al. | |
| 6,573,906 B1 | 6/2003 | Harding et al. | |
| 6,573,907 B1 | 6/2003 | Madrane | |
| 6,583,799 B1 | 6/2003 | Manolis et al. | |
| 6,590,585 B1 | 7/2003 | Suzuki et al. | |
| 6,606,105 B1 | 8/2003 | Quartetti | |
| 6,613,101 B2 | 9/2003 | Mander et al. | |
| 6,628,309 B1 | 9/2003 | Dodson et al. | |
| 6,636,238 B1 | 10/2003 | Amir et al. | |
| 6,636,250 B1 | 10/2003 | Gasser | |
| 6,638,313 B1 | 10/2003 | Freeman | |
| 6,658,406 B1 | 12/2003 | Mazner et al. | |
| 6,662,198 B2 | 12/2003 | Satyanarayanan et al. | |

| | | |
|---|---|---|
| 6,684,222 B1 | 1/2004 | Cornelius et al. |
| 6,721,760 B1 | 4/2004 | Ono |
| 6,735,623 B1 | 5/2004 | Prust |
| 6,738,770 B2 | 5/2004 | Gorman |
| 6,745,206 B2 | 6/2004 | Mandler et al. |
| 6,745,207 B2 | 6/2004 | Reuter et al. |
| 6,751,611 B2 | 6/2004 | Krupin |
| 6,751,626 B2 | 6/2004 | Brown et al. |
| 6,754,829 B1 | 6/2004 | Butt et al. |
| 6,760,721 B1 * | 7/2004 | Chasen et al. .................. 707/3 |
| 6,760,722 B1 | 7/2004 | Raghunandan |
| 6,762,776 B2 | 7/2004 | Huapaya |
| 6,762,777 B2 | 7/2004 | Carroll |
| 6,763,458 B1 | 7/2004 | Watanabe et al. |
| 6,763,777 B1 | 7/2004 | Rosenberg |
| 6,768,999 B2 | 7/2004 | Prager et al. |
| 6,774,911 B2 | 8/2004 | Hodgson et al. |
| 6,784,900 B1 | 8/2004 | Dobronsky et al. |
| 6,784,925 B1 | 8/2004 | Tomat et al. |
| 6,795,094 B1 | 9/2004 | Watanabe et al. |
| 6,801,909 B2 | 10/2004 | Delgado et al. |
| 6,801,919 B2 | 10/2004 | Hunt et al. |
| 6,803,926 B1 | 10/2004 | Lamb et al. |
| 6,810,404 B1 * | 10/2004 | Ferguson et al. ............ 707/200 |
| 6,813,474 B2 | 11/2004 | Robinson et al. |
| 6,816,863 B2 | 11/2004 | Bates et al. |
| 6,820,083 B1 | 11/2004 | Nagy et al. |
| 6,823,344 B1 | 11/2004 | Isensee et al. |
| 6,826,443 B2 | 11/2004 | Makinen |
| 6,847,959 B1 | 1/2005 | Arrouye et al. |
| 6,853,391 B2 | 2/2005 | Bates et al. |
| 6,865,568 B2 | 3/2005 | Chau |
| 6,871,348 B1 | 3/2005 | Cooper |
| 6,876,900 B2 | 4/2005 | Takeda et al. |
| 6,876,996 B2 | 4/2005 | Czajkowski et al. |
| 6,880,132 B2 | 4/2005 | Uemura |
| 6,883,009 B2 | 4/2005 | Yoo |
| 6,883,146 B2 | 4/2005 | Prabhu et al. |
| 6,885,860 B2 | 4/2005 | Bahl |
| 6,906,722 B2 | 6/2005 | Hrebejk et al. |
| 6,910,049 B2 | 6/2005 | Fenton et al. |
| 6,922,709 B2 | 7/2005 | Goodman |
| 6,925,608 B1 | 8/2005 | Neale et al. |
| 6,938,207 B1 | 8/2005 | Haynes |
| 6,944,647 B2 | 9/2005 | Shah et al. |
| 6,947,959 B1 | 9/2005 | Gill |
| 6,948,120 B1 | 9/2005 | Delgobbo |
| 6,950,818 B2 | 9/2005 | Dennis et al. |
| 6,950,989 B2 | 9/2005 | Rosenzweig et al. |
| 6,952,714 B2 | 10/2005 | Peart |
| 6,952,724 B2 | 10/2005 | Prust |
| 6,980,993 B2 | 12/2005 | Horvitz et al. |
| 6,983,424 B1 | 1/2006 | Dutta |
| 6,993,527 B1 * | 1/2006 | Raman et al. .................. 715/237 |
| 7,010,755 B2 | 3/2006 | Anderson et al. |
| 7,024,427 B2 | 4/2006 | Bobbitt et al. |
| 7,028,262 B2 | 4/2006 | Estrada et al. |
| 7,043,472 B2 | 5/2006 | Aridor et al. |
| 7,047,498 B2 | 5/2006 | Lui |
| 7,051,291 B2 | 5/2006 | Sciammarella et al. |
| 7,058,891 B2 | 6/2006 | O'Neal et al. |
| 7,062,500 B1 | 6/2006 | Hall et al. |
| 7,062,718 B2 | 6/2006 | Kodosky et al. |
| 7,068,291 B1 | 6/2006 | Roberts et al. |
| 7,100,150 B2 | 8/2006 | Polk |
| 7,106,843 B1 | 9/2006 | Gainsboro |
| 7,139,811 B2 | 11/2006 | Lev Ran et al. |
| 7,149,729 B2 | 12/2006 | Kaasten et al. |
| 7,162,466 B2 | 1/2007 | Kaasten et al. |
| 7,168,051 B2 | 1/2007 | Robinson et al. |
| 7,191,195 B2 | 3/2007 | Koyama et al. |
| 7,194,743 B2 | 3/2007 | Hayton |
| 7,203,948 B2 | 4/2007 | Mukundan et al. |
| 7,216,289 B2 | 5/2007 | Kagle |
| 7,216,301 B2 | 5/2007 | Moehrle |
| 7,219,302 B1 | 5/2007 | O'Shaughnessy et al. |
| 7,240,292 B2 | 7/2007 | Hally et al. |
| 7,243,334 B1 | 7/2007 | Berger et al. |
| 7,275,063 B2 | 9/2007 | Horn |
| 7,278,106 B1 | 10/2007 | Mason |
| 7,290,245 B2 | 10/2007 | Skjolsvold |
| 7,293,031 B1 | 11/2007 | Dusker et al. |
| 7,353,464 B1 | 4/2008 | Kundu et al. |
| 7,383,494 B2 | 6/2008 | Krolczyk et al. |
| 7,409,382 B2 | 8/2008 | Kido |
| 7,409,644 B2 | 8/2008 | Moore et al. |
| 7,415,484 B1 | 8/2008 | Tulkoff et al. |
| 7,499,925 B2 | 3/2009 | Moore et al. |
| 7,526,483 B2 | 4/2009 | Samji et al. |
| 7,536,386 B2 | 5/2009 | Samji et al. |
| 7,536,410 B2 | 5/2009 | Wong et al. |
| 7,587,411 B2 | 9/2009 | De Vorchik et al. |
| 7,590,625 B1 * | 9/2009 | Tennican et al. ..................... 1/1 |
| 7,614,016 B2 | 11/2009 | Wong |
| 7,627,552 B2 | 12/2009 | Moore et al. |
| 2001/0034733 A1 | 10/2001 | Prompt et al. |
| 2001/0034771 A1 | 10/2001 | Hutsch et al. |
| 2001/0047368 A1 | 11/2001 | Oshinsky et al. |
| 2001/0049675 A1 | 12/2001 | Mandler et al. |
| 2001/0053996 A1 | 12/2001 | Atkinson |
| 2001/0056434 A1 | 12/2001 | Kaplan et al. |
| 2001/0056508 A1 | 12/2001 | Arneson et al. |
| 2002/0010736 A1 | 1/2002 | Marques et al. |
| 2002/0019935 A1 | 2/2002 | Andrew et al. |
| 2002/0021828 A1 | 2/2002 | Papier et al. |
| 2002/0033844 A1 | 3/2002 | Levy et al. |
| 2002/0046209 A1 | 4/2002 | De Bellis |
| 2002/0046232 A1 | 4/2002 | Adams et al. |
| 2002/0046299 A1 | 4/2002 | Lefeber et al. |
| 2002/0049717 A1 | 4/2002 | Routtenberg et al. |
| 2002/0049777 A1 | 4/2002 | Terayama et al. |
| 2002/0052885 A1 | 5/2002 | Levy |
| 2002/0054167 A1 | 5/2002 | Hugh |
| 2002/0059199 A1 | 5/2002 | Harvey |
| 2002/0062310 A1 | 5/2002 | Marmor et al. |
| 2002/0063734 A1 | 5/2002 | Khalfay et al. |
| 2002/0070965 A1 | 6/2002 | Austin |
| 2002/0075310 A1 | 6/2002 | Prabhu et al. |
| 2002/0075312 A1 | 6/2002 | Amadio et al. |
| 2002/0075330 A1 | 6/2002 | Rosenzweig et al. |
| 2002/0078035 A1 | 6/2002 | Frank et al. |
| 2002/0087652 A1 * | 7/2002 | Davis et al. .................. 709/213 |
| 2002/0087740 A1 | 7/2002 | Castanho et al. |
| 2002/0087969 A1 | 7/2002 | Brunheroto et al. |
| 2002/0089540 A1 | 7/2002 | Geier et al. |
| 2002/0091679 A1 | 7/2002 | Wright |
| 2002/0091697 A1 | 7/2002 | Huang et al. |
| 2002/0091739 A1 | 7/2002 | Ferlitsch et al. |
| 2002/0095416 A1 | 7/2002 | Schwols |
| 2002/0097278 A1 | 7/2002 | Mandler et al. |
| 2002/0100039 A1 | 7/2002 | Iatropoulos et al. |
| 2002/0103998 A1 | 8/2002 | DeBruine |
| 2002/0104069 A1 | 8/2002 | Gouge et al. |
| 2002/0105548 A1 * | 8/2002 | Hayton et al. ................ 345/764 |
| 2002/0107973 A1 | 8/2002 | Lennon et al. |
| 2002/0111942 A1 | 8/2002 | Campbell et al. |
| 2002/0113821 A1 | 8/2002 | Hrebejk et al. |
| 2002/0120505 A1 | 8/2002 | Henkin et al. |
| 2002/0120604 A1 | 8/2002 | Labarge et al. |
| 2002/0120757 A1 | 8/2002 | Sutherland et al. |
| 2002/0129033 A1 | 9/2002 | Hoxie et al. |
| 2002/0138552 A1 | 9/2002 | DeBruine et al. |
| 2002/0138582 A1 | 9/2002 | Chandra et al. |
| 2002/0138744 A1 | 9/2002 | Schleicher et al. |
| 2002/0144155 A1 | 10/2002 | Bate et al. |
| 2002/0149888 A1 | 10/2002 | Motonishi et al. |
| 2002/0152262 A1 | 10/2002 | Arkin et al. |
| 2002/0152267 A1 | 10/2002 | Lennon |
| 2002/0156756 A1 | 10/2002 | Stanley et al. |
| 2002/0156895 A1 | 10/2002 | Brown |
| 2002/0161800 A1 | 10/2002 | Eld et al. |
| 2002/0163572 A1 | 11/2002 | Center et al. |
| 2002/0169678 A1 | 11/2002 | Chao et al. |
| 2002/0174329 A1 | 11/2002 | Bowler et al. |
| 2002/0181398 A1 | 12/2002 | Szlam |
| 2002/0184357 A1 | 12/2002 | Traversat et al. |
| 2002/0188605 A1 | 12/2002 | Adya et al. |
| 2002/0188621 A1 | 12/2002 | Flank et al. |

| | | | | | | |
|---|---|---|---|---|---|---|
| 2002/0188735 A1 | 12/2002 | Needham et al. | | 2004/0059755 A1 | 3/2004 | Farrington |
| 2002/0194252 A1 | 12/2002 | Powers, III | | 2004/0068524 A1 | 4/2004 | Aboulhosn et al. |
| 2002/0196276 A1 | 12/2002 | Corl et al. | | 2004/0070612 A1 | 4/2004 | Sinclair et al. |
| 2002/0199061 A1 | 12/2002 | Friedman et al. | | 2004/0073705 A1 | 4/2004 | Madril, Jr. et al. |
| 2003/0001964 A1 | 1/2003 | Masukura et al. | | 2004/0083433 A1 | 4/2004 | Takeya |
| 2003/0009484 A1 | 1/2003 | Hamanaka et al. | | 2004/0085581 A1 | 5/2004 | Tonkin |
| 2003/0014415 A1 | 1/2003 | Weiss et al. | | 2004/0088374 A1 | 5/2004 | Webb et al. |
| 2003/0018657 A1 | 1/2003 | Monday | | 2004/0091175 A1 | 5/2004 | Beyrouti |
| 2003/0018712 A1 | 1/2003 | Harrow et al. | | 2004/0098370 A1 | 5/2004 | Garland et al. |
| 2003/0028610 A1 | 2/2003 | Pearson | | 2004/0098379 A1 | 5/2004 | Huang |
| 2003/0033367 A1 | 2/2003 | Itoh | | 2004/0098742 A1 | 5/2004 | Hsieh et al. |
| 2003/0037060 A1 | 2/2003 | Kuehnel | | 2004/0103073 A1 | 5/2004 | Blake et al. |
| 2003/0041178 A1 | 2/2003 | Brouk et al. | | 2004/0103280 A1 | 5/2004 | Balfanz et al. |
| 2003/0046011 A1 | 3/2003 | Friedman | | 2004/0105127 A1 | 6/2004 | Cudd et al. |
| 2003/0046260 A1 | 3/2003 | Satyanarayanan et al. | | 2004/0117358 A1 | 6/2004 | von Kaenel et al. |
| 2003/0063124 A1 | 4/2003 | Melhem et al. | | 2004/0117405 A1 | 6/2004 | Short et al. |
| 2003/0069893 A1 | 4/2003 | Kanai et al. | | 2004/0128322 A1 | 7/2004 | Nagy |
| 2003/0069908 A1 | 4/2003 | Anthony et al. | | 2004/0133572 A1 | 7/2004 | Bailey et al. |
| 2003/0074356 A1 | 4/2003 | Kaler et al. | | 2004/0133588 A1 | 7/2004 | Kiessig et al. |
| 2003/0076322 A1 | 4/2003 | Ouzts et al. | | 2004/0133845 A1 | 7/2004 | Forstall et al. |
| 2003/0078918 A1 | 4/2003 | Souvignier et al. | | 2004/0142749 A1 | 7/2004 | Ishimaru et al. |
| 2003/0079038 A1 | 4/2003 | Robbin et al. | | 2004/0143349 A1 | 7/2004 | Roberts et al. |
| 2003/0081002 A1 | 5/2003 | De Vorchik et al. | | 2004/0148434 A1 | 7/2004 | Matsubara et al. |
| 2003/0081007 A1 | 5/2003 | Cyr et al. | | 2004/0153451 A1 | 8/2004 | Phillips et al. |
| 2003/0084425 A1 | 5/2003 | Glaser | | 2004/0153968 A1 | 8/2004 | Ching et al. |
| 2003/0085918 A1 | 5/2003 | Beaumont et al. | | 2004/0162838 A1* | 8/2004 | Murayama et al. ............ 707/100 |
| 2003/0093321 A1 | 5/2003 | Bodmer et al. | | 2004/0167942 A1 | 8/2004 | Oshinsky et al. |
| 2003/0093531 A1 | 5/2003 | Yeung et al. | | 2004/0168118 A1 | 8/2004 | Wong |
| 2003/0093580 A1 | 5/2003 | Thomas et al. | | 2004/0174396 A1 | 9/2004 | Jobs et al. |
| 2003/0097361 A1 | 5/2003 | Huang et al. | | 2004/0177116 A1 | 9/2004 | McConn et al. |
| 2003/0098881 A1 | 5/2003 | Nolte et al. | | 2004/0177148 A1 | 9/2004 | Tsimelzon, Jr. |
| 2003/0098893 A1 | 5/2003 | Makinen et al. | | 2004/0177319 A1 | 9/2004 | Horn |
| 2003/0098894 A1 | 5/2003 | Sheldon | | 2004/0181516 A1 | 9/2004 | Ellwanger et al. |
| 2003/0101200 A1 | 5/2003 | Koyama et al. | | 2004/0183824 A1 | 9/2004 | Benson et al. |
| 2003/0105745 A1 | 6/2003 | Davidson et al. | | 2004/0189694 A1 | 9/2004 | Kurtz et al. |
| 2003/0107597 A1 | 6/2003 | Jameson | | 2004/0189704 A1 | 9/2004 | Walsh et al. |
| 2003/0110188 A1 | 6/2003 | Howard et al. | | 2004/0189707 A1 | 9/2004 | Moore et al. |
| 2003/0115218 A1 | 6/2003 | Bobbitt et al. | | 2004/0193594 A1 | 9/2004 | Moore et al. |
| 2003/0117403 A1 | 6/2003 | Park et al. | | 2004/0193599 A1 | 9/2004 | Liu et al. |
| 2003/0117422 A1 | 6/2003 | Hiyama et al. | | 2004/0193600 A1 | 9/2004 | Kaasten et al. |
| 2003/0120678 A1 | 6/2003 | Hill et al. | | 2004/0193621 A1 | 9/2004 | Moore et al. |
| 2003/0120928 A1 | 6/2003 | Cato et al. | | 2004/0193672 A1 | 9/2004 | Samji et al. |
| 2003/0120952 A1 | 6/2003 | Tarbotton et al. | | 2004/0193673 A1 | 9/2004 | Samji et al. |
| 2003/0122873 A1 | 7/2003 | Dieberger et al. | | 2004/0199507 A1 | 10/2004 | Tawa |
| 2003/0126136 A1 | 7/2003 | Omoigui | | 2004/0205168 A1 | 10/2004 | Asher |
| 2003/0126212 A1 | 7/2003 | Morris et al. | | 2004/0205625 A1 | 10/2004 | Banatwala et al. |
| 2003/0135495 A1 | 7/2003 | Vagnozzi | | 2004/0205633 A1 | 10/2004 | Martinez et al. |
| 2003/0135513 A1 | 7/2003 | Quinn et al. | | 2004/0205698 A1 | 10/2004 | Schliesmann et al. |
| 2003/0135517 A1 | 7/2003 | Kauffman | | 2004/0215600 A1 | 10/2004 | Aridor et al. |
| 2003/0135659 A1 | 7/2003 | Bellotti et al. | | 2004/0220899 A1 | 11/2004 | Barney et al. |
| 2003/0140115 A1 | 7/2003 | Mehra | | 2004/0223057 A1 | 11/2004 | Oura et al. |
| 2003/0154185 A1 | 8/2003 | Suzuki et al. | | 2004/0225650 A1 | 11/2004 | Cooper et al. |
| 2003/0158855 A1 | 8/2003 | Farnham et al. | | 2004/0230572 A1 | 11/2004 | Omoigui |
| 2003/0177422 A1 | 9/2003 | Tararoukhine et al. | | 2004/0230599 A1 | 11/2004 | Moore et al. |
| 2003/0184587 A1 | 10/2003 | Ording et al. | | 2004/0230917 A1 | 11/2004 | Bales et al. |
| 2003/0195950 A1 | 10/2003 | Huang et al. | | 2004/0233235 A1 | 11/2004 | Rubin et al. |
| 2003/0210281 A1 | 11/2003 | Ellis et al. | | 2004/0243597 A1* | 12/2004 | Jensen et al. .................. 707/100 |
| 2003/0212664 A1 | 11/2003 | Breining et al. | | 2004/0249902 A1 | 12/2004 | Tadayon et al. |
| 2003/0212680 A1 | 11/2003 | Bates et al. | | 2004/0255048 A1 | 12/2004 | Ran et al. |
| 2003/0212710 A1 | 11/2003 | Guy | | 2004/0257169 A1 | 12/2004 | Nelson |
| 2003/0222915 A1 | 12/2003 | Marion et al. | | 2005/0004928 A1 | 1/2005 | Hamer et al. |
| 2003/0225796 A1 | 12/2003 | Matsubara | | 2005/0010860 A1 | 1/2005 | Weiss et al. |
| 2003/0227480 A1 | 12/2003 | Polk | | 2005/0015405 A1 | 1/2005 | Plastina et al. |
| 2003/0227487 A1 | 12/2003 | Hugh | | 2005/0022132 A1 | 1/2005 | Herzberg et al. |
| 2003/0233419 A1 | 12/2003 | Beringer | | 2005/0027757 A1 | 2/2005 | Kiessig et al. |
| 2004/0001106 A1 | 1/2004 | Deutscher et al. | | 2005/0050470 A1 | 3/2005 | Hudson et al. |
| 2004/0002993 A1 | 1/2004 | Toussaint et al. | | 2005/0055306 A1 | 3/2005 | Miller et al. |
| 2004/0003247 A1 | 1/2004 | Fraser et al. | | 2005/0071355 A1 | 3/2005 | Cameron et al. |
| 2004/0006549 A1 | 1/2004 | Mullins et al. | | 2005/0080807 A1 | 4/2005 | Beilinson et al. |
| 2004/0008226 A1 | 1/2004 | Manolis et al. | | 2005/0097477 A1 | 5/2005 | Camara et al. |
| 2004/0019584 A1 | 1/2004 | Greening et al. | | 2005/0114672 A1 | 5/2005 | Duncan et al. |
| 2004/0019655 A1 | 1/2004 | Uemura et al. | | 2005/0120242 A1 | 6/2005 | Mayer et al. |
| 2004/0019875 A1 | 1/2004 | Welch | | 2005/0131903 A1 | 6/2005 | Margolus et al. |
| 2004/0030731 A1 | 2/2004 | Iftode et al. | | 2005/0131905 A1 | 6/2005 | Margolus et al. |
| 2004/0044696 A1 | 3/2004 | Frost | | 2005/0132304 A1 | 6/2005 | Guido et al. |
| 2004/0044776 A1 | 3/2004 | Larkin | | 2005/0138567 A1 | 6/2005 | Smith et al. |
| 2004/0054674 A1 | 3/2004 | Carpenter et al. | | 2005/0149481 A1 | 7/2005 | Hesselink et al. |
| 2004/0056894 A1 | 3/2004 | Zaika et al. | | 2005/0165753 A1 | 7/2005 | Chen et al. |
| 2004/0056896 A1 | 3/2004 | Doblmayr et al. | | 2005/0166159 A1 | 7/2005 | Mondry et al. |

| | | | |
|---|---|---|---|
| 2005/0166189 A1 | 7/2005 | Ma | |
| 2005/0171947 A1 | 8/2005 | Gautestad | |
| 2005/0187954 A1* | 8/2005 | Raman et al. | 707/100 |
| 2005/0188174 A1 | 8/2005 | Guzak | |
| 2005/0192953 A1 | 9/2005 | Neale et al. | |
| 2005/0192966 A1 | 9/2005 | Hilbert et al. | |
| 2005/0207757 A1 | 9/2005 | Okuno | |
| 2005/0240880 A1 | 10/2005 | Banks | |
| 2005/0243993 A1 | 11/2005 | McKinzie et al. | |
| 2005/0246331 A1 | 11/2005 | De Vorchik et al. | |
| 2005/0246643 A1 | 11/2005 | Gusmorino et al. | |
| 2005/0246648 A1 | 11/2005 | Miner | |
| 2005/0246664 A1 | 11/2005 | Michelman et al. | |
| 2005/0256909 A1 | 11/2005 | Aboulhosn et al. | |
| 2005/0257169 A1 | 11/2005 | Tu | |
| 2005/0283476 A1 | 12/2005 | Kaasten et al. | |
| 2006/0004692 A1 | 1/2006 | Kaasten et al. | |
| 2006/0004739 A1 | 1/2006 | Anthony et al. | |
| 2006/0020586 A1 | 1/2006 | Prompt et al. | |
| 2006/0036568 A1 | 2/2006 | Moore et al. | |
| 2006/0059204 A1* | 3/2006 | Borthakur et al. | 707/200 |
| 2006/0080308 A1 | 4/2006 | Carpentier et al. | |
| 2006/0090137 A1 | 4/2006 | Cheng | |
| 2006/0129627 A1 | 6/2006 | Phillips et al. | |
| 2006/0173873 A1 | 8/2006 | Prompt et al. | |
| 2006/0200455 A1 | 9/2006 | Wilson | |
| 2006/0200466 A1 | 9/2006 | Kaasten et al. | |
| 2006/0200832 A1 | 9/2006 | Dutton | |
| 2006/0218122 A1 | 9/2006 | Poston et al. | |
| 2006/0218533 A1 | 9/2006 | Koduru et al. | |
| 2006/0242122 A1 | 10/2006 | DeVorchik | |
| 2006/0242585 A1 | 10/2006 | Cutsinger | |
| 2006/0242591 A1 | 10/2006 | Van Dok | |
| 2007/0180432 A1 | 8/2007 | Gassner et al. | |

FOREIGN PATENT DOCUMENTS

| | | |
|---|---|---|
| EP | 1089196 | 4/2001 |
| EP | 1235137 | 8/2002 |
| GB | 2329492 | 3/1999 |
| JP | 2004362745 | 12/1992 |
| JP | 2005089173 | 4/1993 |
| JP | 09244940 | 9/1997 |
| JP | 2001067250 | 3/2001 |
| JP | 2001142766 | 5/2001 |
| JP | 2001154831 | 6/2001 |
| JP | 2001188702 | 7/2001 |
| JP | 2001297022 | 10/2001 |
| JP | 2002099565 | 4/2002 |
| JP | 2002140216 | 5/2002 |
| JP | 2002182953 | 6/2002 |
| JP | 2002334103 | 11/2002 |
| JP | 2002269145 | 4/2004 |
| NO | 20042749 | 8/2009 |
| RU | 2347258 | 2/2009 |
| WO | WO9322738 | 11/1993 |
| WO | WO9412944 | 6/1994 |
| WO | WO9414281 | 6/1994 |
| WO | WO9949663 | 9/1999 |
| WO | WO0051021 | 8/2000 |
| WO | 01/63919 A1 | 8/2001 |
| WO | WO0157867 | 8/2001 |
| WO | WO0167668 | 9/2001 |
| WO | WO 0225420 | 3/2002 |
| WO | WO03001720 | 1/2003 |
| WO | WO 2004107151 | 9/2004 |
| WO | WO2004097680 | 11/2004 |

OTHER PUBLICATIONS

Supplementary European Search Report for EP 04780390 dated Jun. 18, 2007.
Kuchinsky, et al., "FotoFile: A Consumer Multimedia Organization and Retrieval System", May 1999, ACM, pp. 496-503.
Written Opinion of SG 200301764-7 dated Jan. 11, 2007.
Windows Commander (website), <URL: http://www.ghisier.com>, accessed using http://www.archive.org/web/web.php, in particular, http://web.archive.org/web/20030207145141/www.ghisler.com/feature1.htm, archived on Feb. 7, 2003; http://web.archive.org/web/20021017022627/www.ghisler.com/addons.htm, archived on Oct. 17, 2002; http://web.archive.org/web/20021009213316/www.ghisler.com/efaquser.htm, archived on Oct. 9, 2003; unable to access website.
Bott, et al., "Microsoft Windows XP Inside Out", Microsoft Press, 2001, Chapter 11, 39 pages.
International Search Report and Written Opinion of PCT/US04/25931 dated Apr. 3, 2007.
Langer, Maria, Mac OS X: Visual QuickStart Guide; Apr. 2001, Peachpit Press, Mac OS X Disk Organization (pp. 1-3), Views (pp. 1-11), Outlines (1-3).
Ray, Jay, Mac OS X Unleashed, Nov. 2001, Sams, Chapter 4. The Finder: Working with Files and Applications (pp. 1-15), Getting File Information (pp. 1-7).
McFedries, Paul; "The Complete Idiot's Guide to Windows XP", Table of Contents, Oct. 3, 2001; Alpha Books, Ch. 6: Using My Computer to Fiddle w/h Files and Folder-printed p. 1-6, Finding a File in Mess p. 103.
Written Opinion of Singapore Application No. 200403220-7 dated May 18, 2006.
Microsoft Press Pass, "Windows XP is Here!", New York, Oct. 25, 2001.
Microsoft, "Microsoft Windows XP Professional Product Documentation" section: (1) To Change how you view items in a folder, (2) Viewing files and folders overview, (3) To associate a file with a program, (4) To Change or remove a program, copyright 2006, publication date unknown.
McFedries, Paul, "The Complete Idiots Guide to Windows XP", Table of Contents, Oct. 3, 2001; Alpha Books, Chapter 8: A Tour of the My Pictures Folder—printed pp. 1-8, Chapter 11: Sights and Sounds: Music and Other Multimedia-printed pp. 1-3.
Stanek R. William, "Microsoft Windows XP Professional Administrator's Pocket Consultant", Sep. 25, 2001; Microsoft Press, Chapter 9, printed pp. 1-8.
Shah, Sarju, "Windows XP Preview", FiringSquad, May 4, 2001, online, printed pp. 1-5; Figure: Hi-Res Image Viewer.
European Search Report for 03007909.9-2211 dated Jun. 30, 2006.
D. Esposito, "More Windows 2000 UI Goodies: Extending Explorer Views by Customizing Hypertext Template Files", MSDN Magazine, <http://msdn.microsoft.com/msdnmag/issues/0600/w2kui2/default.aspx?print=true?, first date of publication unknown but no later than Jun. 2000, 15 pages.
Microsoft: "Microsoft Windows 2000 Professional Step by Step—Lesson 3—Managing Files and Folders" <http://www.microsoft.com/mspress/books/sampshap/1589.asp>, Jan. 5, 2000, 12 pages.
Australian Search Report for SG 200301764-7 dated Mar. 30, 2006.
D. Esposito, Visual C++ Windows Shell Programming, Dec. 1, 1998, Apress, ISBN 1861001843, pp. 463-469.
P. DiLascia, "More Fun with MFC:DIBs, Palettes, Subclassing, and a Gamut of Goodies, Part III", Microsoft Systems Journal, Jun. 1997, 20 pages.
Australian Written Opinion for SG 200301764-7 dated Mar. 30, 2006.
Windows Commander, <http://web.archive.org/web/20030207145141/www.ghisler.com/feature1.htm> (Feb. 7, 2003) and <http://web.archive.org/web/20021017022627/www.ghisler.com/addons.htm> (Oct. 17, 2002), 7 pages.
Directory Opus 6.1—Viewer SDK Plugin SDK 1.0, GP Software, 2001, <http://web.archive.org/web/20030219151121/www.gpsoft.com.au/Developer.html>, first date of publication unknown but, prior to Feb. 19, 2003, 30 pages.
Wikipedia, File Allocation Table, 2006, <http://en.wikipedia.org/wiki/File_Allocation_Table>.
Cohen, et al., "A Case for Associative Peer to Peer Overlays"—ACM SIGCOMM Computer Communications Review, vol. 33, No. 1, Jan. 2003, pp. 95-100.
Lui, et al., "Interoperability of Peer-to-Peer File Sharing Protocols"—ACM SIGecom Exchanges, vol. 3, No. 3, Aug. 2002, pp. 25-33.
Adobe, Inc., et al., "Adobe Photoshop CS Classroom in a Book," Dec. 1, 2003, pp. 1-29.
Adobe, Inc., et al., "Adobe Photoshop 7.0", 2001; pp. 1-9.

Heinlein, et al., "Integration of Message Passing and Shared Memory in the Stanford FLASH Multiprocessor, Architectural Support for Programming Languages and Operating Systems," pp. 38-50, published 1994.
Louis, et al., "Context Learning Can Improve User Interaction Information Reuse and Integration," Proceedings of the 2004 IEEE International Conference on, pp. 115-120, Nov. 8-10, 2004.
Microsoft Windows XP Version 2002 (Screen Dumps, Figs. 1-16).
Simpson, Alan, Windows 95 Uncut, 1995, IDG Books Worldwide, Inc., pp. 104-107.
Feng, et al., "Schemata Transformation of Object-Oriented Conceptual Models to XML", Computer systems Science & Engineering, vol. 18, No. 1, Jan. 2003.
Joseph, M., "The UML for Data Modellers," Elektron, Apr. 2004, pp. 72-73.
Wang, G., et al., "Extending XML Schema with Nonmonotonic Inheritance," in M.A. Jesufeld and O. Paster (eds.), ER 2003 Workshops, Lecture Notes in Computer Science 2814:402-407.2003.
A.T. McCray, et al., Extending the Role of Metadata in a Digital Library System, May 19, 1999, IEEE, pp. 190-199.
Alexa T. McCray, et al., Principles for Digital Library Development, May 2001, ACM, pp. 49-53.
Stelovsky, J., and C. Aschwanden, "Software Architecture for Unified Management of Event Notification and Stream I/O and Its Use for Recording and Analysis of User Events," *Proceedings of the 35th Annual Hawaii International Conference on System Sciences*, IEEE Computer Society, Big Island, Hawaii, Jan. 7-10, 2002, p. 1862-1867.
"About Managing Messages With Rules", Microsoft® Outlook® 2003 Help file, 3 pp.
"Trillian/Trillian Pro IM Clients" Products Description, © 1999-2004 Cerulean Studios, <http://www.ceruleanstudios.com> [retrieved Apr. 30, 2004].
International Search Report of WO2004/097638 A1 (McKee, et al.) dated Nov. 11, 2004.
Examples of dialogs user interfaces; date of first publication prior to Mar. 31, 2005; 8 pages.
"Visually Theming and Styling Your Applications and Documents" (CLI 308); downloaded from <http://msdn.microsoft.com/longhorn/pdcmaterials/pdctalksavalon/>; date of first publication prior to Mar. 31, 2005; 34 pages.
New User Interface Possibilities in Longhorn (CLI 304); downloaded from <http://msdn.microsoft.com/longhorn/pdcmaterials/pdctalksavalon/>; date of first publication prior to Mar. 31, 2005; 45 pages.
Windows Forms: Exploiting Windows Longhorn "Features from Within Your Application" (CLI 391); downloaded from http://msdn.microsoft.com/longhorn/pdcmaterials/pdctalksavalon/>; date of first publication prior to Mar. 31, 2005; 27 pages.
MessageBox Function; downloaded from <http://msdn.microsoft.com>; date of first publication prior to Mar. 31, 2005; 4 pages.
Creating and Installing Theme Files; downloaded from <http://msdn.microsoft.com>; date of first publication prior to Feb. 21, 2005; 4 pages.
"MessageBox Function"; downloaded from <http://msdn.microsoft.com>; date of first publication prior to Mar. 31, 2005; 4 pages.
"Creating and Installing Theme Files"; downloaded from <http://msdn.microsoft.com>; date of first publication prior to Feb. 21, 2005; 4 pages.
"About Dialog Boxes"; downloaded from <http://msdn.microsoft.com>; date of first publication prior to Feb. 21, 2005; 10 pages.
"Property Sheets and Inspectors"; downloaded from <http://msdn.microsoft.com>; date of first publication prior to Feb. 21, 2005; 6 pages.
"Propsheetpage"; downloaded from <http://msdn.microsoft.com>; date of first publication prior to Feb. 21, 2005; 3 pages.
"DialogProc Function"; downloaded from <http://msdn.microsoft.com>; date of first publication prior to Feb. 21, 2005; 2 pages.
"Creating Wizards"; downloaded from <http://msdn.microsoft.com>; date of first publication prior to Mar. 31, 2005; 17 pages.
"Property Sheets"; downloaded from <http://msdn.microsoft.com>; date of first publication prior to Mar. 31, 2005; 7 pages.
"Property Sheet Reference"; downloaded from <http://msdn.microsoft.com>; date of first publication prior to Mar. 31, 2005; 5 pages.
"DrawItemstruct Structure"; downloaded from <http://msdn.microsoft.com>; date of first publication prior to Feb. 25, 2005; 3 pages.
"Using Buttons"; downloaded from <http://msdn.microsoft.com>; date of first publication prior to Feb. 25, 2005; 5 pages.
Button Messages; downloaded from <http://msdn.microsoft.com>; date of first publication prior to Feb. 25, 2005; 4 pages.
"Button Styles"; downloaded from <http://msdn.microsoft.com>; date of first publication prior to Feb. 25, 2005; 2 pages.
"CreateWindow Function"; downloaded from <http://msdn.microsoft.com>; date of first publication prior to Feb. 25, 2005; 5 pages.
"Using Dialog Boxes"; downloaded from <http://msdn.microsoft.com>; date of first publication prior to Mar. 31, 2005; 8 pages.
"CreatePropertySheetPage Function"; downloaded from <http://msdn.microsoft.com>; date of first publication prior to Mar. 31, 2005; 1 page.
"DestroyPropertySheetPage Function"; downloaded from <http://msdn.microsoft.com>; date of first publication prior to Mar. 31, 2005; 1 page.
"PropertySheet Function"; downloaded from <http://msdn.microsoft.com>; date of first publication prior to Mar. 31, 2005; 2 pages.
"PropSheetPageProc Function"; downloaded from <http://msdn.microsoft.com>; date of first publication prior to Mar. 31, 2005; 2 pages.
"PropSheetProc Function"; downloaded from <http://msdn.microsoft.com>; date of first publication prior to Mar. 31, 2005; 2 pages.
"PSN_KILLACTIVE Notification"; downloaded from <http://msdn.microsoft.com>; date of first publication prior to Mar. 31, 2005; 1 page.
"PSN_OUERYCANCEL Notification"; downloaded from <http://msdn.microsoft.com>; date of first publication prior to Mar. 31, 2005; 1 page.
"PSN_RESET Notification"; downloaded from <http://msdn.microsoft.com>; date of first publication prior to Mar. 31, 2005; 1 page.
"PSN_SETACTIVE Notification"; downloaded from <http://msdn.microsoft.com>; date of first publication prior to Mar. 31, 2005; 1 page.
"PSN_TRANSLATEACCELERATOR Notification"; downloaded from <http://msdn.microsoft.com>; date of first publication prior to Mar. 31, 2005; 1 page.
"PSN_WIZBACK Notification"; downloaded from <http://msdn.microsoft.com>; date of first publication prior to Mar. 31, 2005; 3 pages.
"PSN_WIZFINISH Notification"; downloaded from <http://msdn.microsoft.com>; date of first publication prior to Mar. 31, 2005; 1 page.
"PSN_WIZNEXT Notification"; downloaded from <http://msdn.microsoft.com>; date of first publication prior to Mar. 31, 2005; 3 pages.
"PSM_ADDPAGE Message"; downloaded from <http://msdn.microsoft.com>; date of first publication prior to Mar. 31, 2005; 2 pages.
"PSM_IDTOINDEX Message"; downloaded from <http//msdn.microsoft.com>; date of first publication prior to Mar. 31, 2005; 1 page.
"PSM_INDEXTOHWND Message"; downloaded from <http://msdn.microsoft.com>; date of first publication prior to Mar. 31, 2005; 1 page.
"PSM_INDEXTOID Message"; downloaded from <http://msdn.microsoft.com>; date of first publication prior to Mar. 31, 2005; 1 page.
"PSM_INDEXTOPAGE Message"; downloaded from <http://msdn.microsoft.com>; date of first publication prior to Mar. 31, 2005; 1 page.

"PSM_PAGETOINDEX Message"; downloaded from <http://msdn.microsoft.com>; date of first publication prior to Mar. 31, 2005; 1 page.
"PSM_PRESSBUTTON Message"; downloaded from <http://msdn.microsoft.com>; date of first publication prior to Mar. 31, 2005; 1 page.
"PSM_QUERYSIBLINGS Message" ; downloaded from <http://msdn.microsoft.com>; date of first publication prior to Mar. 31, 2005; 1 page.
"PSM_SETCURSEL Message "; downloaded from <http://msdn.microsoft.com>; date of publication prior to Mar. 31, 2005; 1 page.
"PSM_SETCURSELID Message"; downloaded from <http://msdn.microsoft.com>; date of first publication prior to Mar. 31, 2005; 1 page.
"PSM_SETFINISHTEXT Message"; downloaded from <http://msdn.microsoft.com>; date of first publication prior to Mar. 31, 2005; 1 page.
"PSM_SETHEADERTITLE Message"; downloaded from <http://msdn.microsoft.com>; date of first publication prior to Mar. 31, 2005; 1 page.
"PSM_SETWIZBUTTONS Message"; downloaded from <http://msdn.microsoft.com>; date of first publication prior to Mar. 31, 2005; 2 pages.
"Propsheetheader Structure" ; downloaded from <http://msdn.microsoft.com>; date of first publication prior to Mar. 31, 2005; 5 pages.
"Propsheetpage Structure"; downloaded from <http://msdn.microsoft.com>; date of first publication prior to Mar. 31, 2005; 4 pages.
"Pshnotify Structure"; downloaded from <http://msdn.microsoft.com>; date of first publication prior to Mar. 31, 2005; 1 page.
"BCM_GETIDEALSIZE Message"; downloaded from <http://msdn.microsoft.com>; date of first publication prior to Mar. 31, 2005; 1 page.
"PSM_SETTITLE Message"; downloaded from <http://msdn.microsoft.com>; date of first publication prior to Mar. 31, 2005; 1 page.
Lee, J., "An End-User Perspective on File-Sharing Systems," Communications of the ACM 46(2):49-53, Feb. 2003.
Ohtani, A., et al., "A File Sharing Method for Storing Area Network and Its Performance Verification," NEC Res. & Develop. 44(1):85-90, Jan. 2003.
H. Weinreich, et al., "The Look of the Link—Concepts of the User Interface of Extended Hyperlinks," Proceedings of the Twelfth ACM Conference on Hypertext and Hypermedia, Hypertext '01, Aarhus, Denmark, Aug. 2001, pp. 19-28.
Seltzer, M., et al., "Journaling Versus Soft Updates: Asynchronous Meta-data Protection in File Systems," Proceedings of the 2000 USENIX Technical Conference, San Diego, CA, Jun. 18-23, 2000, pp. 71-84.
R. Rao, et al., "Rich Interaction in the Digital Library," Communications of the ACM 38(4):29-39.1995.
Piernas, J., et al., "DualFS: A New Journaling File System Without Meta-Data Duplication," Conference Proceedings of the 2002 International Conference on Supercomputing, New York, Jun. 22-26, 2002, p. 137-146.
Manber, U., and S. Wu, "Glimpse: A Tool to Search Through Entire File Systems," Proceedings of USENIX Winter 1994 Conference, San Francisco, CA, Jan. 17-21, 1994.
Coster, R., and D. Svensson, "Inverted File Search Algorithms for Collaborative Filtering," Proceedings of the 25th Annual International ACM SIGIR Conference on Research and Development in Information Retrieval, Tampere, Finland, Aug. 11-15, 2002.
Gifford, D.K., et al., "Semantic File Systems," Proceedings of the 13th ACM Symposium on Operating Systems Principles, Pacific Grove CA., Sep. 1991, pp. 16-25.
Blair, C., and G.E. Monahan, "Optimal Sequential File Search: A Reduced-State Dynamic Programming Approach," European Journal of Operational Research 86(2):358-365, 1995.
Clay, L.M., et al., Posting Protocol for Improved Keyword Search Success in Peer-to-Peer File Sharing Systems, Proceedings of SPIE-Int. Soc. Opt. Eng., Santa Clara, CA, Jan. 23-24, 2003, vol. 5019, pp. 138-149.

Na, J., and V. Rajaravivarma, "Multimedia File Sharing in Multimedia Home or Office Business Networks," Proceedings of the 35th Southeastern Symposium on System Theory, Morgantown, W. Va., Mar. 16-18, 2003, pp. 237-241.
Kwon G., and K.D. Ryu, "An Efficient Peer-to-Peer File Sharing Exploiting Hierarchy and Asymmetry," Proceedings of the 2003 Symposium on Applications and the Internet, Orlando, Fla., Jan. 27-31, 2003, pp. 226-233.
Qian, J., et al., "ACLA: A Framework for Access Control List (ACL) Analysis and Optimization," Fifth Joint Working Conference on Communications and Multimedia Security, Darnstadt, Germany, May 21-22, 2001, pp. 197-211.
Rao, J.R., "Some Performance Measures of File Sharing on Multiple Computer Systems," Proceedings of the Conference on Modeling and Simulation, vol. 6, Part I, Pittsburgh, Penn., Apr. 24-25, 1976, pp. 527-530.
Reinauer, R., "Unix System V.# Remote File Sharing Capabilities and Administration," Unisphere 8(6):64-68, Sep. 1988.
Templin, P.J., Jr., "Providing a Centralized File Sharing Resource at Bucknell University", Proceedings of the User Services Conference for College and University Computing Services Organization, Bloomington, Ind., Oct. 25-28, 1998, pp. 289-292.
Yamai, N. et al., "NFS-Based Secure File Sharing Over Multiple Administrative Domains With Minimal Administration," Systems and Computers in Japan 33(14):50-58, Dec. 2002.
Yong Kyu Lee, et al., Metadata Management of the SANtopia File System, Proceedomgs of the 8th International Conference onParallel and Distributed Systems (ICPADS 2001), Kyoungju City, Korea, Jun. 26-29, 2001, pp. 492-499, IEEE Computer Society, 2001, ISBN 0-7695-1153-8.
Horst F. Wedde, et al., A Universal Framework for Managing Metadata in the Distributed Dragon Slayer System, Proceedings of the 26th Euromicro Conference (EUROMICRO'00), vol. 2, Maastricht, The Netherlands, Sep. 5-7, 2000, pp. 96-101, IEEE Computer Society, 2000, ISBN 1089-6503.
Jolon Faichney, et al., Goldleaf Hierarchical Document Browser, Second Australian User Interface Conference (AUIC'01), Gold Coast, Queensland, Australia, Jan. 29-Feb. 1, 2001, pp. 13-20, IEEE Computer Society, 2001, ISBN 0-7695-0969-X.
Dino Esposito, New Graphical Interface: Enhance Your Programs with New Windows XP Shell Features, MSDN Magazine, Nov. 2001, vol. 16, No. 11.
Stuart Yeates, et al., Tag Insertion Complexity, Data Compression Conference, (DCC 2001), Snowbird, Utah, USA, Mar. 27-29, 2001,pp. 243-252, IEEE Computer Society2001, ISBN 1068-0314.
Bipin C. Desal, et al., Resource Discovery: Modeling, Cataloguing and Searching, Seventh International Workshop on Database and Expert Systems Applications (DEXA '96), Zurich, Switzerland, Sep. 9-10, 1996, pp. 70-75, IEEE-CS Press, 1996, ISBN 0-8186-7662-0.
Gulrukh Ahanger, et al., Automatic Composition Techniques for Video Production, IEEE Transactions on Knowledge and Data Engineering, Nov./Dec. 1998, pp. 967-987, vol. 10, No. 6, IEEE Computer Society, 1998, ISBN 1041-4347.
Jane Hunter, An Overview of the MPEG-7 Description Language (DDL), IEEE Transactions on Circuits and Systems for Video Technology, Jun. 2001, pp. 765-772, vol. 11, No. 6, IEEE Computer Society, 2001, ISBN 1051-8215.
Philippe Salembier, et al., MPEG-7 Multimedia Description Schemes, IEEE Transactions on Circuits and Systems for Video Technology, Jun. 2001, pp. 748-759, vol. 11, No. 6, IEEE Computer Society, 2001, ISBN 1051-8215.
Thomas Sikora, The MPEG-7 Visual Standard for Content Description—An Overview, IEEE Transactions on Circuits and Systems for Video Technology, Jun. 2001, pp. 696-702, vol. 11, No. 6, IEEE Computer Society, 2001, ISBN 1051-8215.
B.S. Manjunath, Et al., Color and Texture Descriptors, IEEE Transactions on Circuits and Systems for Video Technology, Jun. 2001, pp. 703-715, vol. 11, No. 6, IEEE Computer Society, 2001, ISBN 1051-8215.
"Predefined Properties" http://help.sap.comlsaphelp-ep50sp5/helpdata/en/la/9a4a3b80f2ec40aa7456bc87a94259/content.htm.

"Info Vision Infonnation Management System" http://66.1 02. 7.1 04/search?q=cache:m IXV6K6sQOQJ :www.amlib.netlproducts/infovision.htm+customised+multi+property+file+navigation&hl=en.

"Previewing Files in the Common Dialog" http://www.elitevb.comlcontentiO 1,0084,0 II.

"TdcFolderListView component" http://www.appcontrols.comlmanualsIdiskcontrols/index.htm1?tdcfolderlistview.htm.

"Previewing Files" http://developer.apple.comldocumentation/QuickTimelINMAC/QT/iqMovieToolbox.1a.htm.

"Text File Previewer 2.0 Beta" http://www.freedownloadscenter.comlUtilitieslText-VieworslText-File]reviewer.html.

"Your Next OS: Windows 2006?" http://www.pcworld.comlnewsiarticle/O,aid,ll3'631,OO.asp.

"GetOpenFileName Function," downloaded from <http://msdn.microsoft.com>; date of first publication prior to Mar. 28, 2005; 2 pages.

"GetSaveFileName Function," downloaded from <http://msdn.microsoft.com>; date of first publication prior to Mar. 28, 2005; 2 pages.

"Using Common Dialog Boxes," downloaded from <http://msdn.microsoft.com>; date of first publication prior to Mar. 28, 2005; 8 pages.

"How to Use a Common Dialog File Open Dialog with Win32 API," downloaded from <http://support.microsoft.com>; date of first publication prior to Mar. 28, 2005; 3 pages.

"Creating an Enhanced Metafile," downloaded from <http://msdn.microsoft.com>; date of first publication prior to Mar. 28. 2005; 2 pages.

"Common Dialog Box Library," downloaded from <http://msdn.microsoft.com>: date of first publication prior to Mar. 28, 2005; 8 pages.

"Openfilename Structure," downloaded from <http://msdn.microsoft.com>; date of first publication prior to Mar. 28, 2005; 7 pages.

"Open and Save as Dialog Boxes," downloaded from <http://msdn.microsoft.com>; date of first publication prior to Mar. 29, 2005; 9 pages.

"Customizing common dialog boxes," downloaded from http://msdn.microsoft.com; date for first publication prior to Apr. 20, 2005, 4 pages.

G.D. Venolia, et al., Supporting Email Workflow. Microsoft Research Technical Report MSR-TR-2001-88. Revised Dec. 2001 (Original Sep. 2001). Microsoft Corporation, Redmond, WA.

G.D. Venolia and C. Neustaedter. Understanding Sequence and Reply Relationships within Email Converstations: A Mixed-Model Visualization. Microsoft Research Technical Report MSR-TR-2002-102. Sep. 23, 2002 (Revised Jan. 13, 2003).

Microsoft Digital Image Suite User's Manual, Version 9.0. pp. 105-118, Available: http://www.microsoft.com/products/imaging/guides/SuiteManual.pdf, Apr. 30, 2004.

"Using Tags to Organize Your Photos.", Adobe Photoshop Album 2.0 Tutorial, Available: http://www.adobe.com/digitalimag/tips/phsaltaggin/pdfs/phsaltaggin.pdf, Apr. 30, 2004.

Mozilla.ORG, "Mozilla Firebird's Features", Dec. 4, 2003, Section—Find as you Type.

1st TurboRun—Get to any program, document or bookmark in seconds!, printed from http://www.turborun.com on Mar. 25, 2005.

International Search Report of PCT/US03/15717 dated Aug. 26, 2003.

International Search Report of PCT/US03/15625 dated Aug. 8, 2003.

Netscape Corporation, "Mozilla.org Find As You Type," Sep. 12, 2003, pp. 1-4.

Nishimasa, Makoto, "Easily Creating a Network by Using Standard Features, Home Network Easily Realized Using Windows 2000," Windows 2000 World, vol. 6, No. 2, pp. 126-133, IDG Japan, Inc., Japan, Feb. 1, 2002.

Pogue, David, "Windows XP Home Edition: The Missing Manual", O'Reilly, 2001.

Takane, Hideya et al., "Control of Access to Folders and Files," Windows NT World, vol. 5, No. 5, pp. 160-165, IDG Japan, Inc., Japan, May 1, 2000.

Tanaka, Yuji, "Utilization Report, Introduction of 'Convenient Techniques' Which Are Unexpectedly Unknown, Advanced Techniques for 'Compression and Decompression,'" Nikkei PC 21, vol. 7, No. 21, pp. 100-105, Nikkei Business Publications, Inc., Japan, Nov. 1, 2002.

International Search Report and Written Opinion; PCT Application No. PCTUS0526655, Filing date: Jul. 28, 2005; dated Mar. 21, 2006, 8 pages.

International Search Report; PCT Application No. PCTUS0513589, Filing date: Apr. 22, 2005; dated Dec. 7, 2005, 13 pages.

International Search Report; PCT Application No. PCTUS0626854, Filing date: Jul. 10, 2006; dated Sep. 25, 2007, 19 pages.

International Search Report; PCT Application No. PCTUS0527258, Filing date: Aug. 1, 2005; dated Feb. 24, 2006, 9 pages.

Ferri, Fernando, et al. "An Object-Oriented Model for a Multi-Media Patient Folder Management System," ACM SIBGIO Newsletter, vol. 16, Issue 1, Jun. 1996, pp. 2-18.

Anonymous, "Organize Your Digital Media Collection,"Jun. 30, 2003, 3 pages, www.microsoft.com/windowsxp/using/windowsmediaplayer/getstarted/organize.mspx.

Anciaux, et al., "A Tamper-Resistant and Portable Healthcare Folder," Hindawai Publishing Corporation, International Journal of Telemedicine and Applications, vol. 2008, Article ID 763534, pp. 1-9.

Cohen, J. "The Unofficial Guide to the Workplace Shell," Apr. 5, 1992, 45 pages, http://www.verfasser.de/web/web.nsf/c5.

Cooper, A., "About Face The Essentials of User Interface Design," IDG Books, 1995, p. 141.

Campbell, David, "Extending the Windows Explorer with Name Space Extensions," Microsoft Systems Journal, Microsoft Corporation, vol. 5, No. 6, Jul. 1996, pp. 89-96.

Dorot, V., "Explanatory Dictionary on Modern Computer Vocabulary," S. Petersburg, BHV-Petersburg, pp. 218-219.

Bott, Ed et al., "Master Your Music Library," May 5, 2003, 7 pages, www.microsoft.com/windowsxp/using/windowsmediaplayer/expert/bott_03may05.mspx.

International Search Report of PCT/US05/26655, Jun. 23, 2005.

Rathbone, Andy, "Windows XP for Dummies," 2001, Wiley Publishing, Inc., pp. 145, 203, 204.

Sugasawa, Eiji, "When and What of Pictures Become Clear! How to Readily Organize Images from Digital Cameras," Nikkei PC Beginners, vol. 2, No. 4, pp. 78-95, Nikkei Business Publications, Inc., Japan.

Grosky, et al., "Using Metadata for Intelligent Browsing of Structured Media Objects," Dec. 1994, Sigmond Record, vol. 23, No. 4, pp. 49-56.

Sellen, Abigail J. et al., "How Knowledge Workers Use the Web," Proceedings of the SIGCHI Conference on Human Factors in Computing Systems: Changing Our World, Changing Ourselves, ACM, 2002, pp. 227-234.

Miles, Darryl, "Implementing Windows Terminal Server and Citrix MetaFrame on IBM @ Server X Series Servers," Apr. 2003, pp. 1-62.

Jamsa, K., "1001 Windows 98 Tips," 1998, 2 pages, Jamsa Press.

Sekiguchi, Kumiko, "Visual Basic Q&A," MSDN Magazine 2001, No. 16, Jul. 18, 2001, pp. 97-103, ASCII Inc., Japan.

Capretz, Luiz F. et al., "Component-Based Software Development," Nov. 2001, pp. 1834-1837, IECON '01, The 27th Annual Conference of the IEEE Industrial Electronics Society.

Russionovich, Mark, "Internal Structure of NTFS4.0," Aug. 1, 2001, pp. 176-182, NIKKEI Windows 2000, vol. 2, No. 53, Nikkei Business Publications, Inc., Japan.

Halvorson, Michael, et al, "Microsoft Office XP, Professional Office Manual," Jul. 23, 2001, pp. 78-80, first edition, Nikkei BP Soft Press.

Microsoft Corporation, "Windows 98 Step by Step," 1998, p. 63, Microsoft Press.

Microsoft Windows XP Professional, 1985-2001.

Microsoft Windows XP Professional, Screen Shots 1-8, copyright (1985-2001).

Microsoft Windows XP Version 2002 Screen Dumps.

Olive, et al., "A Generic Metadata Query Tool", 1999, pp. 1-8.

Patent Abstracts of Japan, Publication No. 2002-099565, Information Retrieval Apparatus, Abstract, May 4, 2002, 1 page.

Patent Abstracts of Japan, Publication No. 2002-334103, Retrieval Processing System and Retrieval Processing Method, Abstract, Nov. 22, 2002, 1 page.

"About Dialog Boxes", date of first publication prior to Feb. 21, 2005, 10 pages, 2004 Microsoft Corporation, downloaded from <http://msdn.microsoft.com>.

Dourish, Paul, et al., "Presto: An Experimental Architecture for Fluid Interactive Document Spaces," ACM Transactions on Computer—Human Interaction (TOCHI) Jun. 1999, pp. 133-161, vol, 6, Issue 2, ACM.

Zhujun, Xu James, "Survey of Some Mobile Agent System," Feb. 10, 2003, pp. 1-22.

Northrup, Tony, et al., "Plus! Party Mode: Mix Audio and Video in Playlists," Mar. 17, 2003, 6 pages, www.microsoft.com/windowsxp/using/windowsmediaplayer/expert/northrup_03march17.mspx.

Verhoeven, et al., A Generic Metadata Tool, 10-19999, pp. 1-8.

"Revelle, A Visual Search Tool for Early Elementary Science Students," Mar. 2002, pp. 49-57, vol. 11, Journal of Science Education and Technology.

English translation of Official Notice of Rejection for JP2003125924 dated Nov. 21, 2008.

AdventNet "5.43 Parsing MIBs" Jan. 4, 2005, AdventNet Inc., http://web.archive.org/web/20050104147 16/http://web.adventnet.com/products/agenttester/help/mib_browser/mib_operations/mb_parsing_mibs.html.

International Search Report and Written Opinion of PCT/US04/25931, Apr. 3, 2007.

International Search Report for WO2004/097638 A1 (McKee, et al.), Nov. 11, 2004.

International Search Report of EP03007786, Aug. 26, 2003.

"How Easy! Introduction to 'Storage Idea,'" NIKKEI PC 21, vol. 6, No. 1, pp. 46-53, Nikkei Business Publications, Inc., Japan, Jan. 1, 2001.

Australian Search Report for SG 200301757-1 dated Dec. 1, 2004.

Domoto, Kenji et al., "The Power of Fast Full Text Search," Nikkei Byte, No. 156, pp. 142-167, Nikkei Business Publications, Inc., Japan, Sep. 22, 1996.

European Patent Office, "Supplemental European Search Report," Nov. 20, 2007, 1 pg. EP 04779634.

European Search Report dated Sep. 20, 2007 for European Patent Application No. 05 10 3492, 5 pages.

Examination Report for New Zealand Patent No. 534665, 2 pages.

International Search Report of EP 03007909 dated Jun. 13, 2006.

* cited by examiner

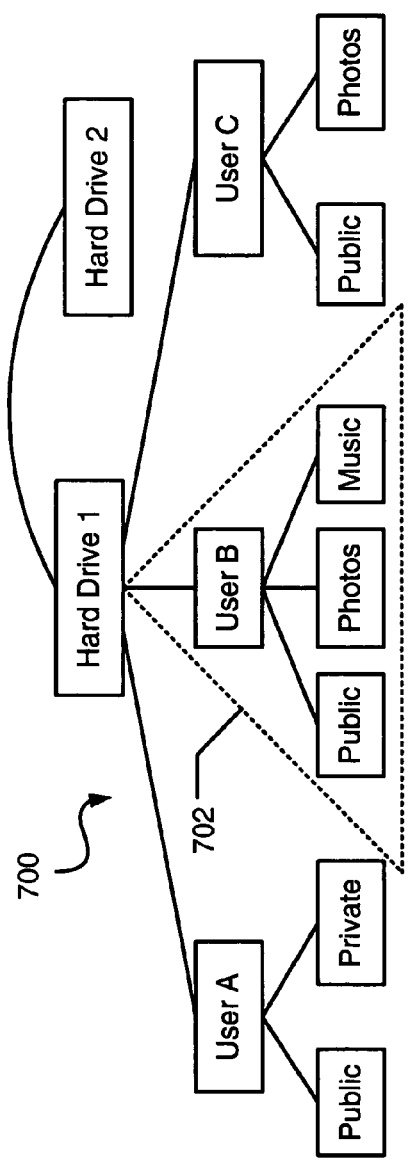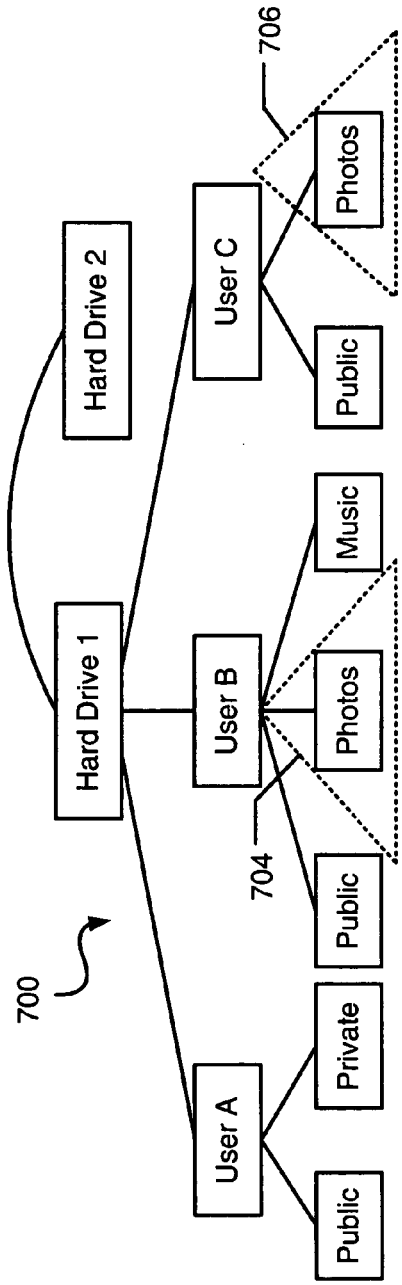
FIG. 7A
FIG. 7B

SYSTEMS, METHODS, AND USER INTERFACES FOR STORING, SEARCHING, NAVIGATING, AND RETRIEVING ELECTRONIC INFORMATION

FIELD OF THE INVENTION

The present invention generally relates to systems, methods, and computer-readable media with computer-executable instructions stored thereon for storing, searching, navigating, and retrieving electronic data and other information on a computer system or network, as well as to aspects of user interfaces associated with these functions and available for performing these functions.

BACKGROUND

Tremendous volumes of information are stored on and/or available through computer systems and networks, and this information can be made available to computer users for a variety of different purposes. Although computers can provide this wealth of information to users, the information is only valuable and useful to users if users can reliably locate and retrieve the desired information from the system or network. The stored information is of little or no value to users if it cannot be readily located and/or retrieved without substantial searching time, effort, and/or frustration.

SUMMARY

Aspects of the present invention relate to systems, methods, and user interfaces that provide navigational tools for storage systems of computers, their operating systems, networks, and the like. In accordance with at least some examples of this invention, navigation tools and/or their corresponding user interfaces and displays may be provided in multiple different windows, application programs, and the like. In at least some examples of this invention, navigation tools or and/or their corresponding user interfaces and display panel(s) may include windows or panes that include "links" to various different files, lists, folders, pages, and/or other storage elements. If desired, navigational tools in accordance with at least some aspects of this invention may be customized for different application programs, for portions of applications programs, for portions of operating systems, by different users, and the like (e.g., by independent software providers from those providing the computer operating system) to be better suited or targeted for navigating information relating to that set of files, etc., and/or to that user. The navigational tools in accordance with at least some examples of this invention also may provide useful ways of organizing and/or displaying information regarding the user's files, e.g., by hierarchical properties, lists, auto lists, folders, etc. Systems and methods according to at least some examples of the invention also may make it easy for users to assign properties to files, change assigned properties associated with files, and the like, optionally with the use of hierarchical properties. Additionally, in accordance with at least some examples of the invention, navigational tools may be provided for searching, locating, and viewing information relating to stored or accessible files, e.g., in a query-based file and/or retrieval system.

Additional aspects of the invention relate to computer-readable media including computer-executable instructions stored thereon for performing various methods and/or operating various systems, including systems and methods having navigational tools for organizing, searching, locating, and/or displaying information relating to files located in a computer storage system and/or accessible through a computer system as described above (and as will be described in more detail below).

BRIEF DESCRIPTION OF THE DRAWINGS

Various objects, features, and advantages of the present invention will be more readily apparent and more fully understood from the following detailed description, taken in connection with the appended drawings, in which:

FIGS. 7A and 7B are diagrams that illustrate examples of different scopes that may be used during navigation and display operations in accordance with examples of this invention;

DETAILED DESCRIPTION

Figure 1:
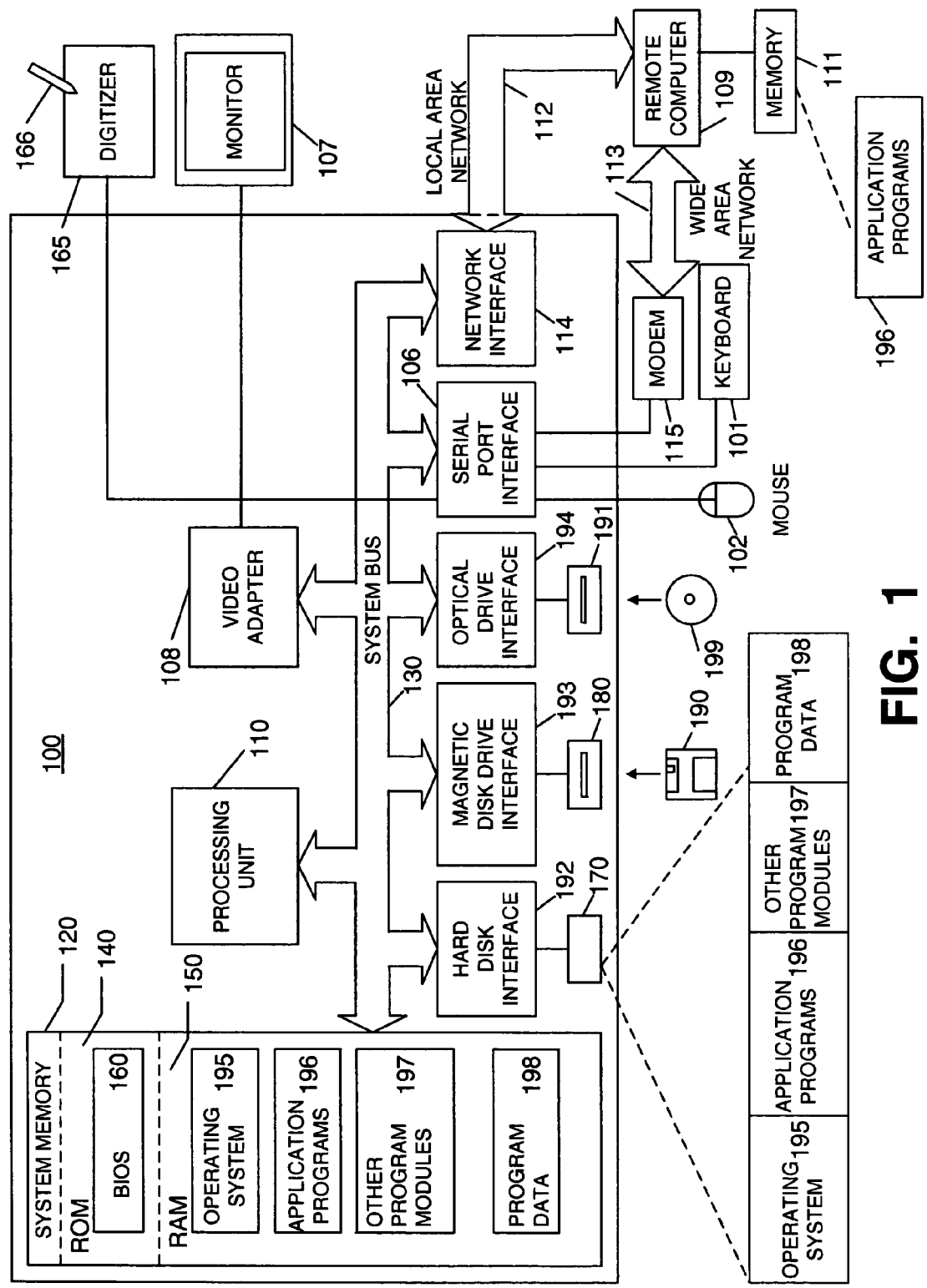
FIG. 1 illustrates a schematic diagram of a general-purpose digital computing environment in which certain aspects of the present invention may be implemented.

As described above, aspects of the present invention relate to systems, methods, and computer-readable media for storing, searching, navigating, and/or retrieving electronic information in and available through computing systems and/or networks. The following description is divided into sub-sections to assist the reader. The sub-sections include: Terms; General Description of Various Aspects of the Invention; Example Hardware; Example Systems, Methods, and Computer-Readable Media According to the Invention; and Conclusion.

I. Terms

The following terms may be used in this specification and, unless otherwise specified or clear from the context, the terms have the meanings provided below:

"Hierarchical Property"—A type of property whose value may include an ordered collection of categorizing unique strings. Each string may be made unique, for example, by the path through which it is specified, and this path also may be used to define the categories to which each property value belongs.

"Parent Property Value"—A property value that has one or more possible children property values.

"Child Property Value"—A property value that is a child of another property value.

"Auto lists"—Lists of files or other data resulting from queries for information over a fixed scope matching a pre-selected set of filter conditions. Examples of "auto lists" include, but are not limited to: file creation dates, file creation time, last edit date, last edit time, file rating data, file author list, last use=yesterday, last use=last week, etc. A "navigation panel," as described below, may include one or more "auto lists."

"Lists"—Shortcuts or "links" to auto lists, files, file collections, folders, and the like. A "navigation panel," as described below, may include one or more "Lists."

"Page"—A specific folder, list, auto list, or the like. A "page" may constitute a node in a hierarchical table to which users can navigate, e.g., by selecting items from a menu, from the navigational tool according to aspects of the invention, etc. Individual "pages" or listings of "pages" at various levels in a storage system and/or available through a computer system or network may appear in a navigation panel and/or a display panel, as described in more detail below.

"Computer-Readable Medium"—any available media that can be accessed by a user on a computer system. By way of example, and not limitation, "computer-readable media" may include storage media and communication media. "Computer storage media" includes volatile and non-volatile, removable and non-removable media implemented in any method or technology for storage of information, such as computer-readable instructions, data structures, program modules or other data. "Computer storage media" includes, but is not limited to, RAM, ROM, EEPROM, flash memory or other optical storage devices; magnetic cassettes, magnetic tape, magnetic disk storage or other magnetic storage devices; or any other medium that can be used to store the desired information and that can be accessed by a computer. "Computer storage media" does not include non-statutory forms of energy, such as carrier waves. "Communication media" typically embodies computer-readable instructions, data structures, program modules or other data in a modulated data signal, such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media, such as a wired network or direct-wired connection, and wireless media, such as acoustic, RF, infrared and other wireless media. Combinations of any of the above should also be included within the scope of "computer-readable media."

II. General Description of Various Aspects of the Invention

A. Storing Properties in a Hierarchical Relationship

Aspects of the present invention relate to computer-readable media having data structures stored thereon. The data structure in accordance with at least some examples of this invention may include: (a) a first data set containing at least some of content of an electronic file; and (b) a second data set containing property data associated with the electronic file. This second data set may include a first flat path string indicating a first property associated with the electronic file, wherein the first flat path string indicates a hierarchical structure of the property data. Optionally, if desired, the second data set may include multiple flat path strings of data indicating multiple properties associated with the electronic file, e.g., in a hierarchical structure. The second data set may be provided in any desired manner, for example, as metadata included in and/or associated with the first data set. Of course, if desired, a third data set (or even more data sets) containing additional property data may be included in and/or associated with the electronic file, wherein the third data set (or additional data sets) includes another flat path string indicating another property associated with the electronic file, and wherein the additional flat path string indicates a hierarchical structure of the property data in the third (or additional) data set.

Additional example aspects of this invention relate to systems and methods for storing electronic data including hierarchical property information. Such systems and methods may include: (a) creating an electronic file including electronic data for storage on a computer-readable medium (e.g., using one or more computer processing systems); (b) receiving input data indicating a first property value to be included as part of the electronic file or associated with the electronic file (e.g., via a mouse, pen, digitizer, keyboard, network connection, disk drive, etc.), wherein the first property value includes a first data set including a first flat path string indicating the first property value, and wherein the first flat path string indicates a hierarchical structure of the first property value; and (c) storing the electronic file with the first flat path string included therein or associated therewith (e.g., in an electronic memory device), wherein the first flat path string is stored or associated with the electronic file in any desired manner, e.g., through linking information, as part of the file, as metadata, etc. Optionally, systems and methods in accordance with at least some examples of this invention further may receive input data indicating a second property value to be included as part of the electronic file or associated with the electronic file, wherein the second property value includes a second data set including a second flat path string indicating the second property value, wherein the second flat path string indicates a hierarchical structure of the second property value, and wherein the storing of the electronic file includes storing the electronic file with the second flat path string included therein or associated therewith. Any number of property values may be stored in and/or associated with an electronic file in this manner in accordance with the invention.

Still additional example aspects of this invention relate to systems and method for processing electronic data that includes hierarchical property information associated with it. Systems and methods according to at least some examples of this invention may include: (a) receiving data on a computer system or network (e.g., into the computer system's or network's memory) indicating a hierarchical structure of plural defined property values, wherein each defined property value has an unique flat path data string associated with it as compared with all other defined property values in the hierarchical structure; (b) receiving user input indicating a new property value to be included at a user desired location in the hierarchical structure (e.g., via a mouse, pen, digitizer, keyboard, network connection, disk drive, etc.); and (c) based on the user desired location in the hierarchical structure, determining whether the new property value would have a flat path data string that differs from all other flat path data strings existing in the hierarchical structure. The flat path data string for the new property value may include, for example, at least a first parent property portion and a first child property portion (optionally, at least one of the first parent property portion or the first child property portion may be identical to a portion of at least one other defined property value in the hierarchical structure). The method further may include adding the new property value to the hierarchical structure at the user desired location when the flat path data string for the new property value is determined to differ from all other flat path data strings for properties existing in the hierarchical structure.

In use of various systems and methods in accordance with examples of the invention, a user may enter input into the system indicating a search query, wherein the search query includes selection of a search property that includes a property value in the hierarchical property structure. Once the search query is entered, systems and methods in accordance with at least some examples of the invention may determine which electronic files stored on or available through a computer system or network (optionally with a search scope that limits the scope of files to be searched) meet the search query, wherein the electronic files determined to meet the search query include the first search property stored therein or associated therewith. As another example, the search query may include user selection of multiple properties in the hierarchical structure, and determination of which electronic files stored on or available through the computer system or network (optionally within a limited search scope) meet the search query may include identification of electronic files that include at least one of the selected properties.

The property data included in the computer-readable media, systems, and methods according to examples of this invention may be stored in any suitable or desired manner without departing from the invention, e.g., in a manner so as to indicate a hierarchical structure of the property data in the property data set. As examples, the property data structure may take on one of the following formats: parent property value-delimiter-child property value; parent property value-delimiter-child property value-delimiter-grandchild property value; child property value-delimiter-parent property value; and/or child property value-delimiter-parent property value-delimiter-grandparent property value. Of course, any number of levels in the property hierarchical structure and the data structure in the flat path data string may be provided without departing from this invention.

Additional aspects of the invention relate to computer-readable media including computer-executable instructions stored thereon for providing hierarchical property data and/or using hierarchical property data, e.g., for storing, searching, navigating, and/or retrieving electronic files and related information, including computer-readable media for performing the various methods and/or operating the various systems described above.

B. Multiple Property Selections

Other aspects of the present invention relate to methods and systems for processing input data that include multiple user selections, including multiple selections of electronic file property data. Such systems and methods may include, for example: (a) selecting a first search parameter from a hierarchical structure including plural search elements (e.g., through a user input device, such as a mouse, pen, digitizer, keyboard, network connection, disk drive, etc.); (b) selecting a second search parameter from the hierarchical structure (e.g., through a user input device, such as a mouse, pen, digitizer, keyboard, network connection, disk drive, etc.); and (c) determining whether the first search parameter is located within the same element set in the hierarchical structure as the second search parameter (e.g., using a computer processing system). Various displays may be generated (e.g., on a computer display device) by the computer processing system depending on whether the first search parameter is determined to be located within the same element set as the second search parameter. In accordance with at least some examples of the invention, search results indicating a union of electronic files meeting the first search parameter or the second search parameter may be displayed when the first search parameter is determined to be located within the same element set in the hierarchical structure as the second search parameter. Additionally or alternatively, search results indicating an intersection of electronic files meeting both the first search parameter and the second search parameter may be displayed when the first search parameter is determined to be located outside the element set in the hierarchical structure of the second search parameter.

In accordance with at least some examples of this invention, the hierarchical structure(s) of the various search elements may include plural properties arranged in a hierarchical manner. At least one of the search parameters may include one of these defined property values. Optionally, in at least some examples, at least one of the search elements will constitute a folder element, a list element, an auto list element, or any other desired element in the hierarchical structure. Still additional features of at least some examples of the invention may include determining or defining a scope for the search activities, optionally based, at least in part, on the hierarchical structure of the search elements and/or user input selecting portions of the hierarchical structure for the search scope.

Additional aspects of the invention relate to computer-readable media including computer-executable instructions stored thereon for performing various search methods and/or operating various searching systems, including systems and methods like those described above.

C. Grouping and Stacking in the Display Panel

Still additional example aspects of the present invention relate to computer displays providing user interfaces for searching electronic files stored on or available through a computer system or network. User interfaces in accordance with at least some examples of this invention may include: (a) a navigation panel displaying a hierarchical structure of search elements, wherein at least some individual search elements in the hierarchical structure may be expanded, optionally in response to user input, to display one or more child search elements in the hierarchical structure, and wherein the navigation panel receives user input directed to one or more search elements; and (b) a display panel displaying information relating, at least in part, to search results obtained from searching the electronic files, wherein the search results are determined, at least in part, based on the user input received through the navigation panel. Once expanded, the individual search elements in the hierarchical structure of the navigation panel may remain expanded to display the child elements in the hierarchical structure irrespective of the manner in which the search results are displayed in the display panel (e.g., in a stacked manner, in a grouped manner, in a combined grouped and stacked manner, etc.). The various search elements in the hierarchical structure may include, for example, property values, list elements, auto list elements, folder elements, etc., and the hierarchical structure may be, at least in part, defined by individual user input.

In accordance with at least some examples of the user interfaces in accordance with the invention, user input selecting child search elements or otherwise changing search elements in the hierarchical structure of the navigation panel will produce and/or drive corresponding changes in the search results displayed in the display panel of the user interface.

Additional example aspects of the invention relate to systems and methods for navigating electronic data stored on or available through a computer system or network. Such systems and methods may include: (a) providing a navigation panel (e.g., using a computer processing system) displaying a hierarchical structure of navigation elements, wherein at least some individual navigation elements in the hierarchical structure may be expanded, optionally in response to user input, to display child navigation elements in the hierarchical structure; (b) receiving user input, through the navigation panel, selecting one or more of the navigation elements (e.g., through a user input device, such as a mouse, pen, digitizer, keyboard, network connection, disk drive, etc.); and (c) displaying information relating, at least in part, to search results obtained from searching the electronic data, e.g., on a display device, wherein the search results are determined, at least in part, based on the user input received through the navigation panel (e.g., using the computer processing system), and wherein the information is displayed on a display device simultaneous with display of the navigation panel. Additionally, systems and methods in accordance with at least some examples of this invention further may include: receiving new user input, through the navigation panel, selecting one or more new navigation elements from the hierarchical structure (e.g., via an input system as described above); and changing the information displayed (e.g., using a computer processing system), at least in part, based on the new navigation element or elements selected, wherein the changed information is displayed on the display device simultaneous with the navigation panel. The new user input may constitute, in at least some examples, a child navigation element in the hierarchical structure from the navigation element initially selected to thereby filter down the information displayed. Again, the various search elements in the hierarchical structure may include, for example, property values, list elements, auto list elements, folder elements, etc., and the hierarchical structure may be, at least in part, defined by individual user input.

Still additional systems and methods in accordance with at least some examples of this invention may include systems and methods for displaying information regarding electronic data stored on or available through a computer system or network. Such systems and methods may include, for example: (a) providing a navigation panel displaying a hierarchical structure of navigation elements, e.g., on a display device (generated using a computer processing system), wherein at least some of the individual navigation elements in the hierarchical structure include folder elements; (b) receiving user input, through the navigation panel, selecting at least one folder element (e.g., using a user input device as described above); and (c) displaying information on the display device relating, at least in part, to search results obtained from searching the electronic data, wherein the search results are determined (e.g., using a computer processing system), at least in part, based on the user input received through the navigation panel, wherein the information is displayed simultaneous with display of the navigation panel, and wherein the information is displayed such that any sub-folders provided under the selected folder element are displayed as stacks. Additional features of at least some systems and methods in accordance with examples of this invention may include: receiving new user input (e.g., via a user input device), through the navigation panel, selecting one or more new navigation elements from the hierarchical structure; and changing the information displayed, at least in part, based on the new navigation element or elements selected (using a computer processing system to generate the display). The new user input may be used to select a property value in the hierarchical structure, and the information displayed, at least in part, may correspond to electronic data having the selected property value associated with it.

Still additional aspects of the invention relate to computer-readable media including computer-executable instructions stored thereon providing user interfaces, performing various searching and/or displaying methods, and/or operating various searching and/or displaying systems including use of the hierarchical searching and navigation elements, including providing the user interfaces, performing the various methods, and/or operating the various systems like those described above.

III. Example Hardware

FIG. 1 illustrates a schematic diagram of a general-purpose digital computing environment that can be used to implement various aspects of the present invention. In FIG. 1, a computer 100 includes a processing unit 110, a system memory 120, and a system bus 130 that couples various system components including the system memory 120 to the processing unit 110. The system bus 130 may be any of several types of bus structures including a memory bus or memory controller, a peripheral bus, and a local bus using any of a variety of bus architectures. The system memory 120 may include read only memory (ROM) 140 and random access memory (RAM) 150.

A basic input/output system 160 (BIOS), contains the basic routines that help to transfer information between elements within the computer 100, such as during start-up, is stored in the ROM 140. The computer 100 also may include a hard disk drive 170 for reading from and writing to a hard disk (not shown), a magnetic disk drive 180 for reading from or writing to a removable magnetic disk 190, and an optical disk drive 191 for reading from or writing to a removable optical disk 199, such as a CD ROM or other optical media. The hard disk drive 170, magnetic disk drive 180, and optical disk drive 191 are connected to the system bus 130 by a hard disk drive interface 192, a magnetic disk drive interface 193, and an optical disk drive interface 194, respectively. These drives and their associated computer-readable media provide non-volatile storage of computer-readable instructions, data structures, program modules, and other data for the personal computer 100. It will be appreciated by those skilled in the art that other types of computer-readable media that can store data that is accessible by a computer, such as magnetic cassettes, flash memory cards, digital video disks, Bernoulli cartridges, random access memories (RAMs), read only memories (ROMs), and the like, may also be used in the example operating environment.

A number of program modules can be stored on the hard disk drive 170, magnetic disk 190, optical disk 199, ROM 140, or RAM 150, including an operating system 195, one or more application programs 196, other program modules 197, and program data 198. A user can enter commands and information into the computer 100 through input devices, such as a keyboard 101 and pointing device 102 (such as a mouse). Other input devices (not shown) may include a microphone, joystick, game pad, satellite dish, scanner, or the like. These and other input devices are often connected to the processing unit 110 through a serial port interface 106 that is coupled to the system bus 130, but they also may be connected by other interfaces, such as a parallel port, game port, or a universal serial bus (USB), and the like. Further still, these devices may be coupled directly to the system bus 130 via an appropriate interface (not shown).

A monitor 107 or other type of display device also may be connected to the system bus 130 via an interface, such as a video adapter 108. In addition to the monitor 107, personal computers typically include other peripheral output devices (not shown), such as speakers and printers. In one example, a pen digitizer 165 and accompanying pen or stylus 166 are provided in order to digitally capture freehand input. Although a connection between the pen digitizer 165 and the serial port interface 106 is shown in FIG. 1, in practice, the pen digitizer 165 may be directly coupled to the processing unit 110, or it may be coupled to the processing unit 110 in any suitable manner, such as via a parallel port or another interface and the system bus 130 as is known in the art. Furthermore, although the digitizer 165 is shown apart from the monitor 107 in FIG. 1, the usable input area of the digitizer 165 may be co-extensive with the display area of the monitor 107. Further still, the digitizer 165 may be integrated in the monitor 107, or it may exist as a separate device overlaying or otherwise appended to the monitor 107.

The computer 100 can operate in a networked environment using logical connections to one or more remote computers, such as a remote computer 109. The remote computer 109 can be a server, a router, a network PC, a peer device or other common network node, and it typically includes many or all of the elements described above relative to the computer 100, although for simplicity, only a memory storage device 111 has been illustrated in FIG. 1. The logical connections depicted in FIG. 1 include a local area network (LAN) 112 and a wide area network (WAN) 113. Such networking environments are commonplace in offices, enterprise-wide computer networks, intranets, and the Internet, using both wired and wireless connections.

When used in a LAN networking environment, the computer 100 is connected to the local area network 112 through a network interface or adapter 114. When used in a WAN networking environment, the personal computer 100 typically includes a modem 115 or other means for establishing a communications link over the wide area network 113, such as the Internet. The modem 115, which may be internal or external to the computer 100, may be connected to the system bus 130 via the serial port interface 106. In a networked environment, program modules depicted relative to the personal computer 100, or portions thereof, may be stored in the remote memory storage device.

It will be appreciated that the network connections shown are examples and other techniques for establishing a communications link between the computers can be used. The existence of any of various well-known protocols such as TCP/IP, Ethernet, FTP, HTTP, UDP, and the like is presumed, and the system can be operated in a user-server configuration to permit a user to retrieve web pages from a web-based server. Any of various conventional web browsers can be used to display and manipulate data on web pages.

Although the FIG. 1 environment shows an exemplary environment, it will be understood that other computing environments also may be used. For example, one or more examples of the present invention may use an environment having fewer than all of the various aspects shown in FIG. 1 and described above, and these aspects may appear in various combinations and subcombinations that will be apparent to one of ordinary skill.

The invention now will be described in conjunction with the remaining figures, which help illustrate various example features and aspects of the invention and which help explain the invention. The specific figures and information contained in this detailed description should not be construed as limiting the invention.

IV. Example Systems, Methods, and Computer-Readable Media According to the Invention In modern computer operating systems and application programs useful on them, many file navigation, searching, listing, and/or retrieval operations occur via query operations, as the systems attempt to locate items (such as stored electronic files or other data) that meet the various query parameters. Aspects of the present invention provide navigational tools that, in at least some instances, also can be used for item placement and file storage, which assists the user in these file navigation, searching, listing, and/or retrieval efforts.

In accordance with example aspects of this invention, users may use navigational tools in accordance with this invention: to navigate to and/or locate information relating to any page in a navigational control menu; to add pages to the navigational control menu or listing; to add items to any set (such as a property set, an auto list set, a list set, a folder set, etc.); to see the content of existing and/or system folders (e.g., a "My Documents" folder, etc.); to see expanded sub-folders within folders; to add properties or other data to files or other items (e.g., optionally in a hierarchical manner), even to files or items stored in an auto list or a system generated list; and the like. Additionally, in accordance with at least some example aspects of this invention, users and/or independent software vendors will be able to customize the system navigational tools for use in different application programs, in different views, in different modes of operation, and/or the like. If desired, users also can be given various tools to restore the navigational panel to a previous state or to its original state.

As more specific examples, if desired, navigational tools in accordance with examples of the invention may be designed or customized with lists and/or auto lists that allow users to quickly locate and view information relating to pages of interest. For example, if desired, systems may have lists or auto lists named "Documents Stacked by Author" (or the like) to allow users to quickly jump to a view showing "stacks" of files collected together based on the underlying authors named for the various documents (the user can further drill down into the stacks, if desired, e.g., to locate specific documents by specific authors), and/or based on properties associated with the files when they are created, stored, edited, downloaded, modified, or the like. Other potential groupings or listing of stacks may include listings such as "important documents," "recent documents," "good music," "recently used," "recently obtained," etc.

More detailed descriptions of various aspects of the invention follow. Those skilled in the art will appreciate that this description merely includes examples of various aspects of the invention and does not limit the invention.

A. Storing Properties in a Hierarchical Relationship

As described above, certain example aspects of the present invention relate generally to systems and methods for storing and using "properties" in conjunction with individual stored files or data on and/or available through a computer system or network. In general, when saving new files to a computer system or network, such as a PC, a network of PCs, a server, or the like, users typically can assign "properties" to the files. Examples of such "properties" include: Comments, AuthorID, Keywords, and the like. While this capability is useful and may be adequate in some instances (for example, when only a small set of properties is involved), this conventionally available "flat" property structure can become difficult to manage and/or use over time (e.g., as the overall number of available properties increases). Also, with this flat property data structure, users must separately enter and/or associate each desired property with an individual file. This can be a time consuming task. Additionally, the failure to accurately and/or completely associate properties with respective files may limit a user's ability to search for, locate, and/or retrieve the desired data at later times. For example, as the number of different individual available properties increases, it becomes more difficult for users to reliably retrieve items when they must correctly name, in a search query, one or more of the individual properties associated with the file.

At least some example aspects in accordance with this invention provide users the ability to assign and store at least some file "property" data along with an electronic file, e.g., as metadata, wherein the assigned property data is part of a hierarchical structure. As more and more properties become available to users (e.g., through user designation and/or user definition of new properties), providing the properties in a hierarchical structure in accordance with examples of this invention will allow users to quickly assign multiple properties to a file through a simple one property assignment action. The availability and use of hierarchical properties in accordance with examples of this invention also will allow users to have more control over ordering their property values (e.g., in a display of the hierarchy, to provide the most common or important elements high in the hierarchy, etc.), and it will allow users to express relationships between the values of a property and have these relationships reflected when retrieving items or assigning values to items. The availability and use of hierarchical properties in accordance with examples of this invention also will give users compelling ways to organize the values generated in a property and to browse through and retrieve their items using this organization. The use of hierarchical properties in accordance with examples of this invention, as will be explained in more detail below, may allow users to more easily navigate through files across different properties, locate desired files, and/or retrieve files using a single property (even, at least in some instances, when the property searched with was not explicitly assigned to the file by the user but was simply part of the hierarchy of a property assigned by the user).

Figure 2A:
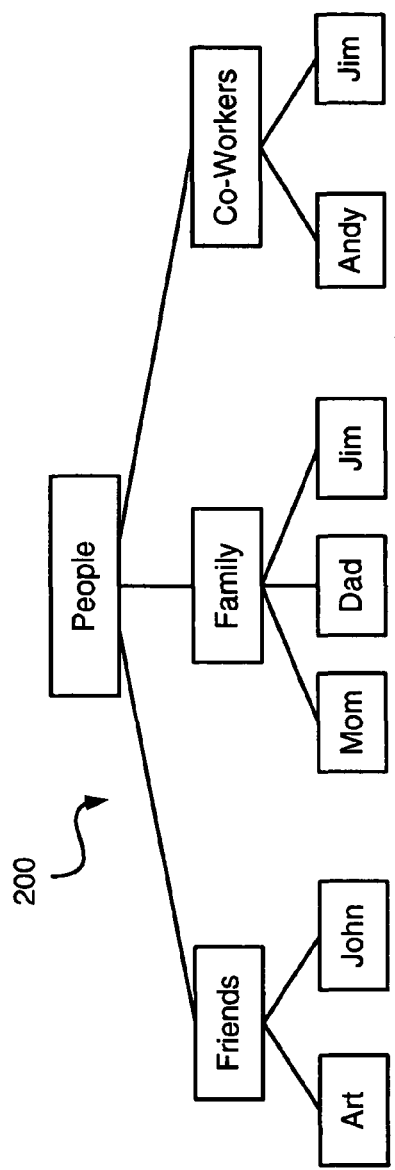
FIGS. 2A and 2B illustrate examples of permitted and non-permitted hierarchical property paths, respectively, in accordance with at least some examples of the invention.

FIG. 2A illustrates an example property hierarchical structure 200 for "keyword" properties that may be used in association with various electronic files, such as digital pictures, music, videos, electronic documents, or the like. In this example, the user has defined a hierarchical structure 200 that may be used in assigning properties to files, e.g., when the files are first stored, created, downloaded, when modified, edited, moved, etc. In this hierarchical structure 200, a "People" node constitutes a parent level node in the hierarchy 200. The "People" node includes three immediate children nodes (namely, "Friends," "Family," and "Co-Workers"), and each of these children nodes contains further individual children nodes, as shown in the figure. In use, assigning a keyword to a file (e.g., including a keyword in metadata associated with an electronic file) not only associates that specific keyword with the file, but it also associates any higher parent keywords of the associated keyword in the hierarchy with that file. As a more specific example based on FIG. 2A, assigning the keyword "Dad" to an electronic file would also, automatically, associate the keywords "Family" and "People" with that file in this example system and method, because these keywords exist in the hierarchal path associated with the assigned keyword "Dad" (i.e., the overall hierarchical keyword data applied in this example is: Dad>Family>People). Therefore, a search query containing any one of the three terms "Dad," "Family," and/or "People" would return a hit for this file. Without the hierarchy according to this example of the invention, the user would have to separately apply all of these keywords to the file (e.g., each of "Dad," "Family," and "People") if he/she wanted to associate each keyword with the file and/or be able to retrieve information relating to the file based on any of these keywords.

Additional aspects of the present invention relate to systems and methods for entering or capturing a hierarchy that may exist between properties (e.g., a user defined hierarchy, an automatically generated hierarchy, etc.). If desired, this hierarchical property information may be stored, e.g., as metadata contained in and/or associated with the electronic file itself, as a flat path, similar to the manner in which hierarchical folders are stored in various commercially available systems and methods (such as systems and methods with folders available in various operating systems and application programs available from Microsoft Corporation). More specifically, systems and methods according to at least some examples of this invention will store one or more hierarchical properties for an electronic file as a flat path string (akin to a known flat folder path string), which allows the shell operating system to correctly stack, filter, group, and/or otherwise navigate or process information relating to the stored files using the hierarchical properties in the same or a similar manner to which a folder hierarchy may be navigated and/or processed today in various conventional systems and methods that utilize folder structures. Similarly, providing a hierarchical data structure for properties gives users the ability to drill into a sub-property to get to lower child property levels in the hierarchy, in a manner similar to the manner in which users can drill into sub-folders in the known and conventional folder systems.

In the data structure (e.g., in data sets or fields, such as in metadata associated with a file), the various property values may be differentiated by paths, such as the flat path strings described above. In this manner, an individual value (e.g., an individual node name) can appear multiple times in a hierarchy, provided the paths to the identical node names or values are different at each place the name appears. FIG. 2A illustrates an example. Specifically, as shown in FIG. 2A, the value "Jim" appears under both the "Family" node and the "Co-Workers" node. Because the paths to these two "Jim" values differ from one another (i.e., People>Family>Jim v. People>Co-Workers>Jim), these two values, including the same ultimate end name (optionally on the same hierarchical level as shown in FIG. 2A), can co-exist in the hierarchy without causing difficulties. A specific node name or value can appear any number of times in a hierarchy provided that the path to it in each instance is different from all other paths to the same name or value.

Additional example aspects of the invention relate to processes to disambiguate between properties in different branches of a hierarchical structure that utilize the same name or node value. In the example described above in conjunction with FIG. 2A, the name "Jim" is associated with both a family member and a co-worker. To distinguish between these two cases, systems and methods according to at least some examples of the invention need only compare the values in higher levels of the hierarchy for the two cases in question to determine whether the values in question have an uncommon parent property, node, or path. Using the example above, systems and methods according to at least some examples of this invention can differentiate between the two common node names in the hierarchy by looking at each "Jim" node's parent node. This investigation shows that one "Jim" node has "Family" as a parent node while the other "Jim" node has "Co-Workers" as its parent node. Because their immediate parent nodes are different and distinguishable, these two "Jim" nodes can co-exist in the property hierarchical structure 200. Of course, the different parent node names need not be located at the immediate parent node of the node(s) under consideration (e.g., the differently named parent nodes could be located at a grandparent node level, at an even higher node level, and/or at different node levels in the hierarchical structure).

Figure 2B:
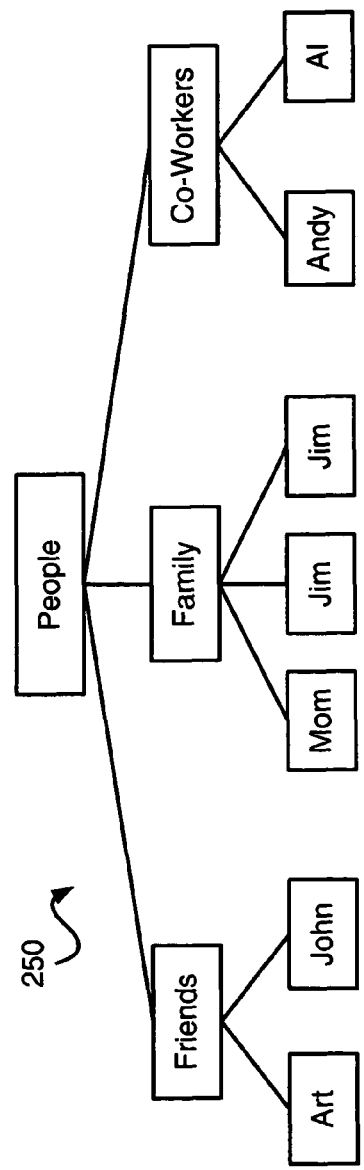

The hierarchical structure 250 illustrated in FIG. 2B, however, typically would not be permitted, in at least some example systems and methods in accordance with this invention. More specifically, as shown, the hierarchical structure 250 in FIG. 2B is similar to the hierarchical structure 200 in FIG. 2A except with respect to certain nodes at the lowest level. In FIG. 2B, the "Family" node contains two child nodes on the same hierarchical level having the same name (namely, the two "Jim" nodes). Because the flat path string to each of these "Jim" nodes is the same (i.e., People>Family>Jim), it would not be possible for the operating systems and/or application programs to distinguish one node from the other, and therefore, an ambiguity would exist any time the flat path string "People>Family>Jim" were used. If a user attempts to set up two identical property paths as shown in the example of FIG. 2B, systems and methods according to at least some examples of this invention will display an error message, present a dialog box, request entry of a new name, and/or otherwise indicate to the user that this name or value is not permitted in the hierarchical structure at this location.

Figure 3:
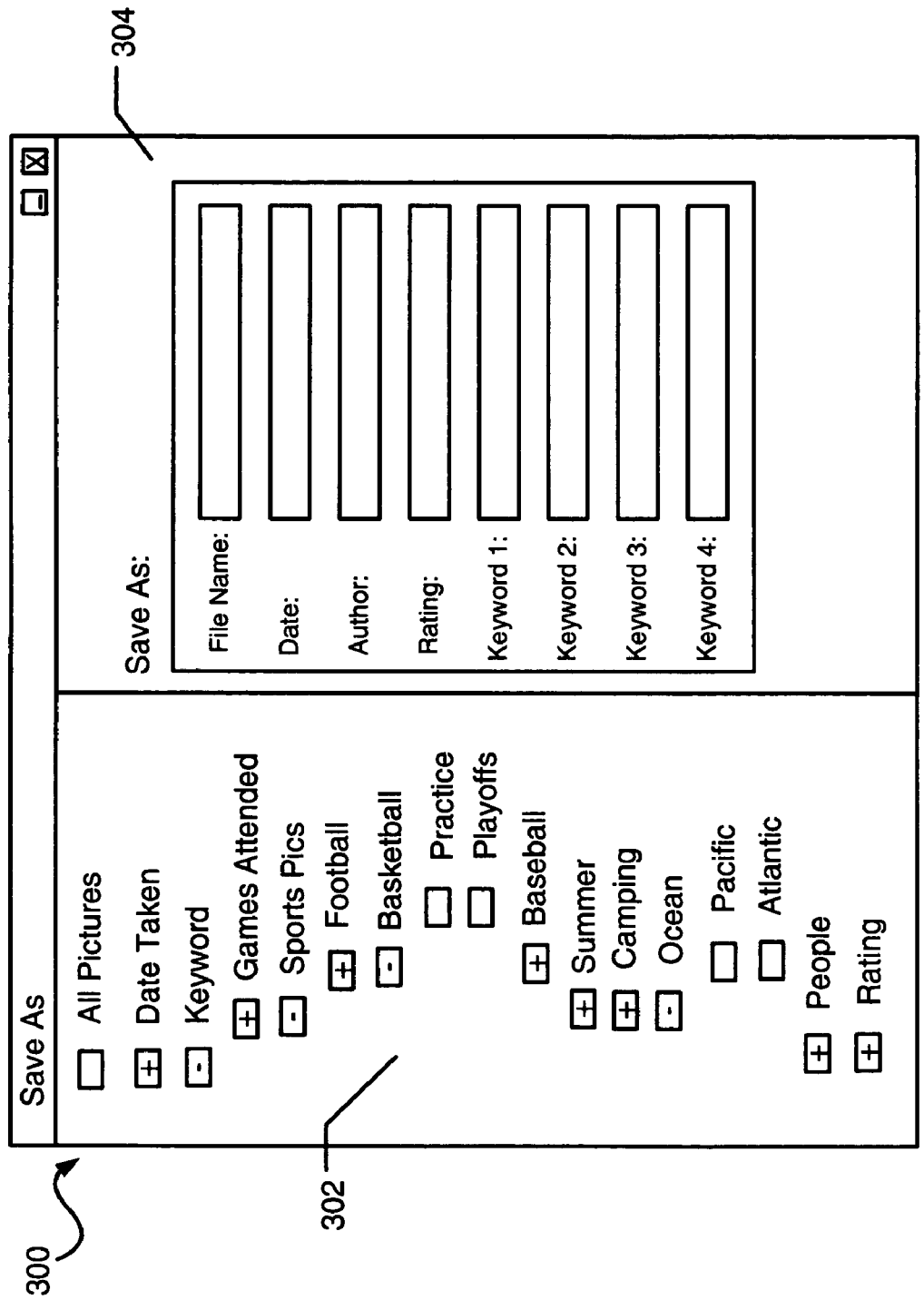
FIG. 3 illustrates an example of a user interface for saving a new item (e.g., a file) with associated hierarchical properties in accordance with examples of this invention.

Property values may be assigned to and/or associated with an individual file in any desired manner and/or at any desired time without departing from this invention. For example, users may be given an opportunity to assign property values to a file when a new file is downloaded to and/or saved onto a user's computer system or network. FIG. 3 illustrates an example user interface 300 through which a user may save a file to his/her computer system or network and, if desired, through which he/she may assign one or more properties to the file. As shown, the user interface 300 includes a navigation panel 302, which displays at least some of the properties or other information that may be associated with and/or assigned to a file (e.g., when information relating to a new file is entered in an input panel 304, in an "edit profile" procedure, and/or at any other desired time). Notably, the properties in navigation panel 302 are arranged in a hierarchical manner. The various properties can be assigned to and/or associated with the file in any desired manner, e.g., by typing or writing the node name in at the appropriate location in the input panel 304 (e.g., in a "keyword" input box) by "dragging" and "dropping" a property name from the navigation panel 302 to an appropriate location in the input panel 304, etc. As another example, if desired, properties may be assigned by dragging an icon or other representation of a file (e.g., from a file list) onto the desired value or node name in the navigation panel 302 and dropping the icon or other representation at that location (if desired, the hierarchy in the navigation panel 302 may exhibit an "auto-expand behavior" in which dragging an icon or other file representation onto a parent property value and holding it over that property value (without dropping) will expand the parent property value (if possible) to at least its next level of hierarchy (e.g., in the same manner that some folders will "auto-expand" in currently available systems and programs)). In addition to assigning property values to files through a navigation panel 302, like that shown in FIG. 3, users of hierarchical property systems in accordance with at least some examples of this invention may navigate or search through their hierarchies, manage and/or edit their hierarchies, and/or take other actions, as will be described in more detail below.

In accordance with at least some examples of this invention, when a file or other item is assigned a property value that is a child of another property value (e.g., the value "Playoffs" in FIG. 3), the file or other item also will automatically inherit any and all parent property values associated with the assigned property value (e.g., "Sports Pics>Basketball" in this specific example). Moreover, if desired, a parent property value can be assigned to a file or item even if that property value has one or more child property values under it (e.g., one can assign a "Basketball" property to a file). In such an instance, in at least some example systems and methods in accordance with the invention, while the parent property will be assigned to the file, neither of its children property values (i.e., "Practice" or "Playoffs" in this example) will be automatically assigned to the file or item (although its parent property would be assigned). Of course, if desired, systems and methods also could be set up to automatically assign or associate the children properties with the file in this situation without departing from the invention.

As will be described in more detail below, in accordance with at least some examples of this invention, a list files, search, or other query including a parent property value as a search element or parameter will return all items tagged with both the designated parent property value and any of its children property values. In this manner, storage systems and methods in accordance with examples of this invention allow users to easily tag items with a relatively few highly specific descriptive properties (e.g., at lower levels in the hierarchy), but by arranging the properties under increasingly broader parent nodes in the hierarchical structure, the tagged items may be made to readily appear, even in response to relatively broad search queries. If desired, in accordance with at least some examples of the invention, when the search results, list files results, or file preview results are displayed in response to a search query, the primary value assigned to the file (e.g., the actual value assigned by the user) will be highlighted and/or made known or available to the user in some manner.

The available (e.g., previously defined by the user, system, or another) and/or stored hierarchical properties may be displayed by systems and methods in accordance with examples of this invention at any desired time and/or at any desired location without departing from the invention. For example, as shown in FIG. 3, the properties may be displayed during a "Save" or "Save As" operation (e.g., in the navigation panel 302). They also may be displayed during file "search," "list," or "viewing" operations, e.g., in the same hierarchical tree layout illustrated in navigation panel 302 of FIG. 3. Also, if desired, hierarchical properties in accordance with examples of this invention may be displayed in any and/or all places where conventional properties are shown by application programs and/or operating systems today (e.g., as properties shown in a "list view" display, as properties shown in an "item details" display, as properties shown in a file "preview" display, etc.). Also, if desired, hierarchical properties in accordance with examples of this invention may be displayed in any controls used to navigate properties, such as in a tree control supporting properties.

Figure 4:
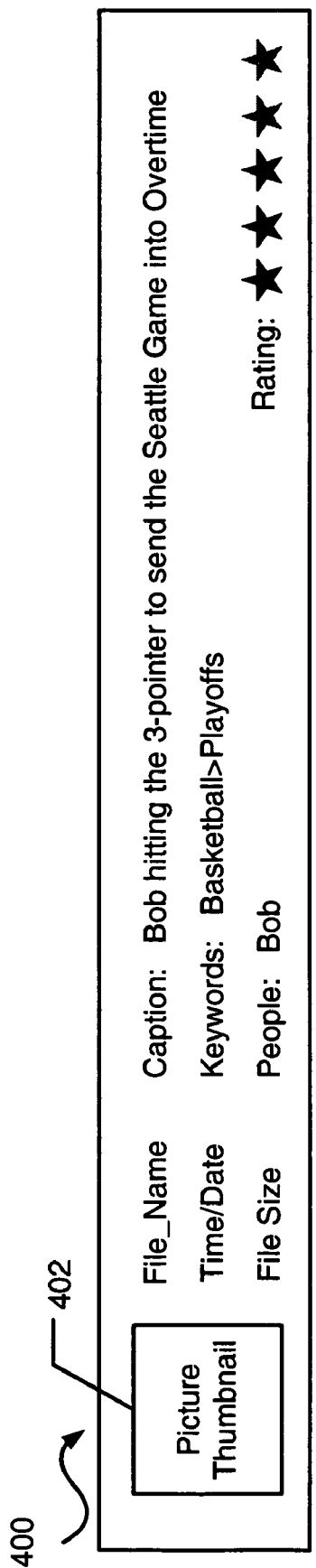
FIG. 4 illustrates an example "preview panel" that includes information relating to a stored item (e.g., a digital picture file) in accordance with examples of this invention.

FIG. 3 illustrates an example of display of hierarchical properties in a tree control screen (e.g., in the navigation panel 302). FIG. 4, on the other hand, illustrates an example of display of property information in an item or file "preview" screen 400. As shown in FIG. 4, this example item or file "preview" screen 400 includes a thumbnail or iconic display 402 of the item (e.g., a small version of the picture included in the file, in this example), as well as certain system and/or other factual information relating to the file, such as the file name, its saved time/date, file size, and user input "caption" information. In addition, this item or file "preview" screen 400 displays certain "property" information input by the user, including: assigned keywords (displayed in a flat path string format), picture subject ID's, user input rating information, and the like. Of course, any number of properties may be listed in such screens without departing from the invention (optionally, with the ability to display information regarding any undisplayed properties).

The property information may be entered and/or associated with individual files at any desired time and in any desired manner without departing from the invention. In addition to including the property information with the files at the time they initially are saved onto the computer system or network, properties associated with individual files may be added to, deleted from, and/or modified at other desired times, such as whenever a file is opened, edited, or used, in response to an "edit profile" or "edit properties" command, and the like. The properties may be entered via typing (optionally with "auto-completion" of matching strings, optionally from any level in the hierarchy), through drag-and-drop operations, through "right-click" operations, through pen "press-and-hold" operations, etc. Any tools useful for setting, editing, and/or deleting properties associated with a particular file also may be accessed and used in the preview screen 400 without departing from the invention.

Figure 5:
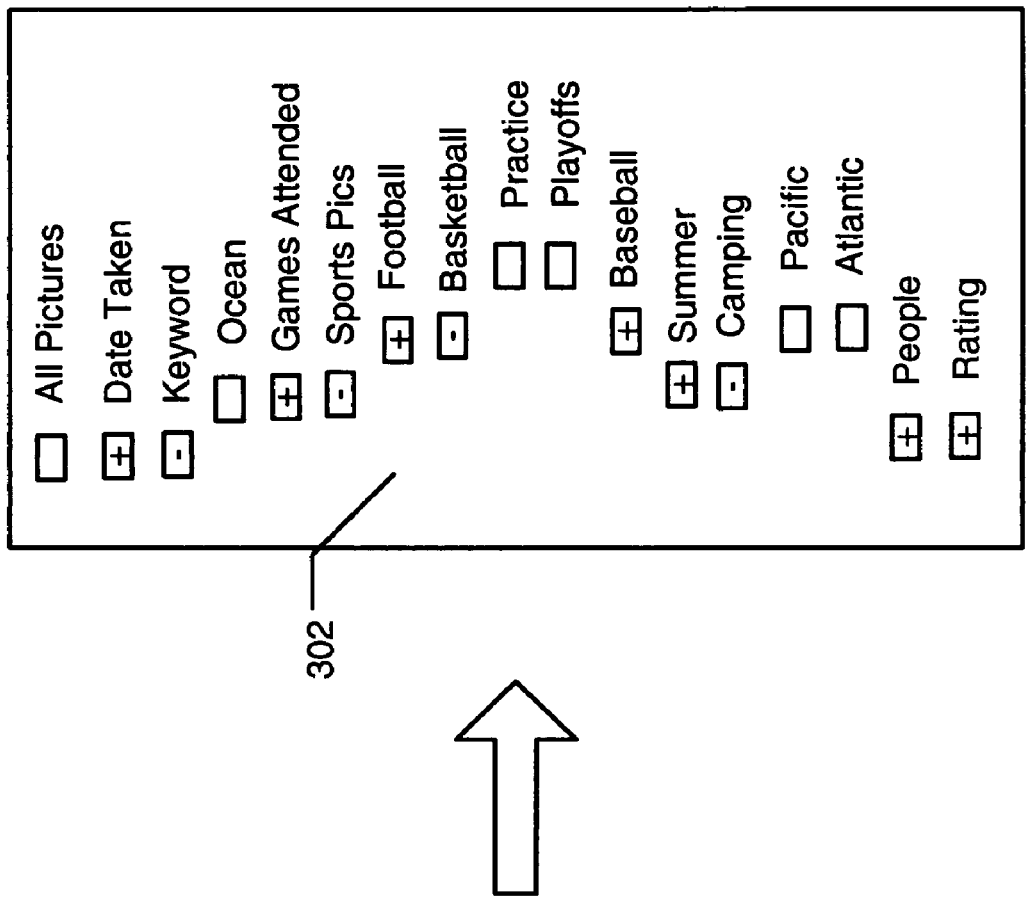
FIG. 5 illustrates an example of changing a hierarchical arrangement of hierarchical properties in accordance with an example of this invention.
Figure 5:
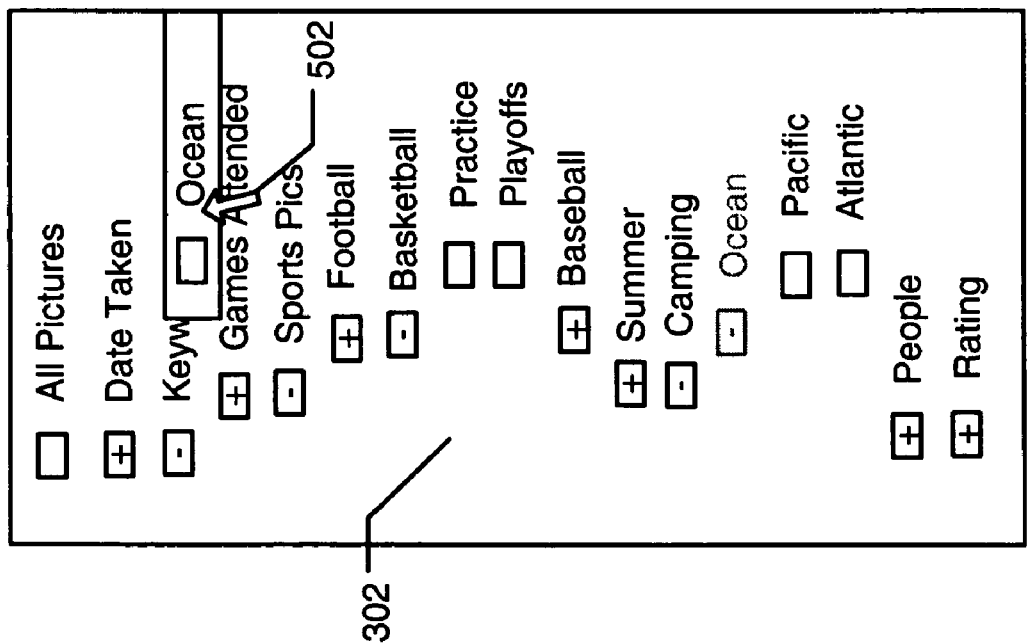

Additionally, the actual content of the properties in the hierarchical arrangement may be changed by the user at any desired time and/or in any desired manner without departing from the invention, including, for example, in the manner that conventional "folder" structures are added to, deleted from, and/or otherwise edited in conventional application programs and operating systems. As examples, new properties may be added under an existing property and/or existing properties may be deleted via "right click" mouse button actions (which may display an appropriate user interface, e.g., a menu including "insert new property," "delete existing property," "change node level or position," cut, copy, paste, or other appropriate actions) or in any other desired manner. As another example, if desired, the locations of existing properties in a hierarchical structure may be changed, e.g., moved via "drag and drop" operations, as illustrated in FIG. 5. More specifically, FIG. 5 illustrates the navigation panel 302 displaying a hierarchical property listing, e.g., for an application program for storing and editing digital photographs. The left hand side of FIG. 5 illustrates the user moving the icon for the keyword "Ocean," through a drag and drop operation (illustrated by arrow 502) from beneath the "Camping" parent node to the hierarchical level immediately beneath the "Keyword" node. Once positioned at the desired location (e.g., immediately over the "Keyword" node in this example) via the dragging operation (e.g., with the left mouse button held down), the "Ocean" node may be repositioned in the hierarchy by dropping it in that place (e.g., by releasing the mouse's left button). This action will reposition the node "Ocean" as shown in the right hand side of FIG. 5. If desired, the user can move the former children nodes "Pacific" and "Atlantic" to accompany the "Ocean" node through additional drag and drop operations. Alternatively, if desired, systems and methods according to at least some examples of this invention may operate such that repositioning a node also will result in automatically repositioning of its children nodes (if any). If desired, in accordance with at least some examples of this invention, a user can press the "Control" button while dragging a property value in this manner (or take other pre-determined action) to make another copy of the property value (and optionally its children property values) appear under a different property value (e.g., using a paste command). Of course, other ways and protocols for cutting, copying, and/or repositioning nodes and/or their respective children nodes may be used without departing from the invention (e.g., repositioning a node with collapsed children may be used to reposition the node and all of its children in one action, but repositioning a node with its children fully expanded and displayed may be used to only reposition the parent node, without its children, etc.). Other default methods and ways of moving nodes may be used in systems and methods without departing from this invention.

In at least some instances, depending on the specific characteristics of systems and methods in accordance with the invention, errors may be generated during this repositioning action, for example, if the same property name appears more than once in the new path or position for the moved property. Systems and methods according to examples of this invention may handle such situations in any desired manner, e.g., by not completing the desired move, by providing an interface to enable the user to change a name within the path, by displaying a dialog box to advise the user of the problem with various options for rectifying the problem, etc. As another example, if desired, systems and methods may be developed that will allow multiple uses of a single name within a path (e.g., Location>New York>New York), such that this error would not appear unless an attempt is made to produce multiple nodes having the same overall flat path string names.

Users that take advantage of the hierarchical property characteristics in accordance with examples of this invention may develop a relatively large hierarchical structure for properties such that the overall hierarchical structure, when fully expanded, spans longer than the available space in the navigation panel 302 and/or the height of their display screen. This situation can be handled in any desired manner without departing from the invention, for example, by providing scroll bars within the navigation panel, by allowing children nodes to collapse under their parent nodes (and to be fully expanded or collapsed based on user input, e.g., in a manner similar to the way that hierarchical folder structures expand and collapse in conventionally available systems and methods), etc. When opened, navigation panels 302 of the type illustrated in FIGS. 3 and 5 may open at any desired location within the hierarchical structure and/or in any desired expansion/contraction condition, such as always at the top of the hierarchical structure location, at the most frequently used location in the hierarchical structure, at the most recently used location in the hierarchical structure, at a location in the hierarchical structure that includes the open document (if any), in a fully expanded condition, in a fully collapsed condition, in the most recently used condition, etc. Also, the navigation panel 302 may appear at any desired location on the display screen, such as at the left or right side, e.g., based on user preference, default, etc.

If desired, systems and methods in accordance with at least some examples of this invention may include a basic hierarchical structure when shipped, and this basic structure may be used by users as a starting point to build a more complete, richer hierarchy, e.g., one that is more targeted and customized to their own uses. Examples of such a pre-determined basic hierarchical structure, e.g., for storing digital picture, audio, video, or other user data, may include base nodes such as: Keywords, Events, Places, People (e.g., potentially with child nodes, such as Author, Photographer, Subject People, etc), Dates, My Pictures, My Music, My Documents, My Videos, etc. Any desired information may be included in this basic hierarchy without departing from the invention.

Figure 6:
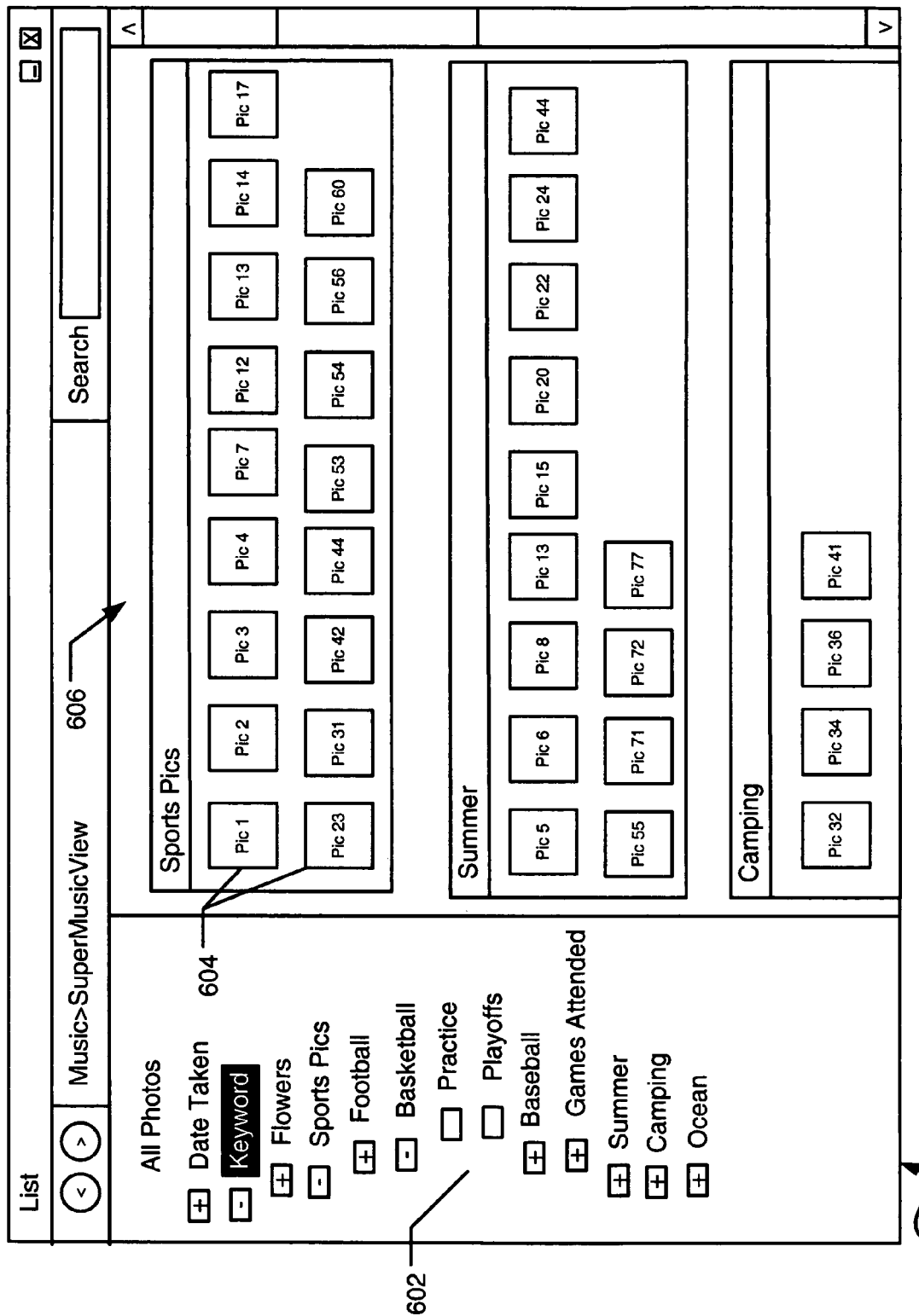
FIG. 6 illustrates an example user interface with a navigation panel in accordance with some examples of this invention.

FIG. 6 illustrates an example display screen 600 as it may appear, for example, in response to a "List Files," search, query, navigate, or other appropriate command. Notably, the left hand side of this example display screen 600 includes a navigation panel 602 for the hierarchical properties under which at least some of this user's files are stored (e.g., relating to a digital photograph storage/editing system in this example). In at least some examples of systems and methods in accordance with this invention, the display screen 600 with navigation panel 602 may be a primary entry and interaction point for hierarchical properties for the user. From such a screen 600, users may be able to view files, present search queries, and/or filter through their files based on the various hierarchical categories that have been created as well as other stored data associated with the files. As shown in FIG. 6, highlighting the node "Keyword" in the hierarchy (e.g., by a left mouse button click action) pulls up a complete listing of user files having keywords assigned to or associated with them. In this example system and method, this action pulls up listings of digital photograph files including thumbnail icons or pictures 604 illustrating the individual files in the display portion 606 of the screen 600. The individual files in this example are grouped based on the individual child levels of the hierarchy immediately below the highlighted search term (i.e., grouped as "Sports Pics," "Summer," and "Camping" groups in this illustrated example, with the other levels of the hierarchy (i.e., "Flowers" and "Ocean") not shown due to display portion 606 size constraints). Of course, many ways of displaying the search or list view results are possible without departing from this invention.

Any desired form or format may be used for storing or representing the hierarchical properties with individual files without departing from this invention. For example, if a child property value is assigned to a file, the path to that property value through the hierarchical structure may be stored as part of and/or associated with the actual file (e.g., as metadata included in and/or associated with the file). As an example, the representation or data structure of the hierarchical structure may include, at least: (Parent property value) [delimiter] (child property 1) [delimiter] (child property 2). . . . Returning to the more specific example illustrated in FIG. 6, a file saved with the individual properties "Football" and "Games Attended" associated with it may have metadata associated with the file that would be displayed along with information about the file in at least some instances (e.g., as shown in FIG. 4), for example, in the form of: "Keyword/Sports Pics/Football;" and "Keyword/Sports Pics/Games Attended." In these examples, the parent property value is "Keyword," the first child property value in each instance is "Sports Pics," the second property values are "Football" and "Games Attended," respectively, and the delimiter is the slash "/" (the delimiter may be a special character used to separate property names, and this delimiter may not be included in property names, to avoid confusion in the system). Of course, any number of children property levels may be included in the flat path data string without departing from the invention.

Properties listed in a navigation panel, e.g., panel 602, at least in part, may behave in a manner similar to the way conventional folders behave in various known operating systems and application programs. For example, the manner of expanding and/or collapsing hierarchical properties in the navigation panel 602 may be similar to expanding and/or collapsing folders in similar folder navigation panels or controls. As more specific examples, in order to view and display child property values under a parent property, a user can click on a "widget" provided to the left of the property (note, for example, the widget with the "+" sign therein for the "Summer" keyword in FIG. 6 (the "+" sign in the widget indicates the presence of one or more additional undisplayed child properties, and a "−" sign in the widget indicates that the specific property already has been expanded in this example system)). In at least some examples, if a property or node has no children, the widget to its left may be omitted, it may include no additional indicator (e.g., a "+" or "−" sign, etc.), it may include another indicator, or the lack of children nodes may be indicated in another desired manner. An indentation scheme, e.g., as shown in FIG. 6, also may be used to help better illustrate the hierarchical structure. Notably, because an individual file may have multiple properties associated with it, the same file or item may appear in multiple groupings in the display panel 606 (note, for example, that Pictures 13 and 44 appear in both the "Sports Pic" grouping and the "Summer" grouping in FIG. 6).

Systems and methods in accordance with at least some examples of this invention may support still other ways for users to change, modify, and/or use the hierarchical property structure. As one example, in situations when a property value in the navigation panel 602 is selected via a right-click action when no items in the display panel 606 are selected, the user then may be given an option (e.g., via an interface) to add a new hierarchical property as a child under the right click selected node (e.g., a new node with an editable textbox may appear at the location of the new property value in the hierarchical structure to enable the user to type in (or otherwise enter) the new property value). A "delete" function or option may be provided, e.g., via a right mouse button click, to enable the user to delete any desired portion of the hierarchy, such as an individual node, a node and all of its child nodes, etc. "Promote" and "demote" functions may be provided, e.g., to allow a user to select a property value and move it (optionally along with all of its own child values) up or down a level in the hierarchy, respectively (e.g., promotion makes the selected node move to a level so that it now appears as a peer to its former immediate parent node). As still another example, a "rename" function may be provided, e.g., via a right mouse button click, that will enable users to give any property value or node a different name (optionally, with limitations if the same name is used twice in a path and/or if two identical flat path names are presented, as described above). Potential functions that may be provided in accordance with examples of this invention, e.g., via a right mouse button click when a file is selected in the display panel 606, include a "remove property" function and an "add property" function, which may be used to remove and/or add one or more properties from/to the metadata or other data stored with and/or associated with the file. Of course, other functions and/or other ways of performing the above functions may be provided without departing from the invention. Where necessary, all files or items tagged with a given property and/or path that is changed via the various functions described above may have their corresponding property data and/or path information updated to reflect the user made changes to the paths and/or properties.

Additional features in accordance with at least some examples of the invention relate to sharing hierarchical properties, e.g., when existing files including hierarchical property data are sent to another user having a system or network that supports hierarchical property data but does not necessarily have the same available hierarchical property structure corresponding to the newly received file(s). Systems and methods in accordance with at least some examples of this invention may be constructed to allow sharing of files (or other items) with hierarchical property values in a manner similar to the manner in which files (or other items) having flat property values are shared. In accordance with at least some examples of systems and methods according to this invention, the default behavior for when a file or other item comes into a system with hierarchical property values will be as follows: (a) the hierarchy of the new file will be displayed in all areas where hierarchical keywords typically are displayed by the system or network, e.g., in the same manner as if the newly received file originally had been created on the target system or network; (b) if the same hierarchy as that required for the new file already exists on the new recipient's system or network, the new file item will associate itself with the hierarchy already on the system or network; (c) if only part of the path necessary for the new file exists on the recipient's system or network, the remaining parts of the hierarchy to accommodate the new file will be created on the recipient's system or network; and/or (d) if none of the path necessary for the new file exists on the recipient's system or network, the new hierarchy to accommodate the new file will be added to the recipient's system or network.

The following provides a more detailed example of property hierarchy sharing in situations where a file is received and saved to a new user's system or network. In this example, the recipient user has an existing property hierarchy with the path/property values "Family/Brothers/Toby." A new file is received by a recipient user (e.g., as an email attachment), and this new file, which is saved to the recipient's system, includes metadata from the file sender's hierarchical configuration. Both the file sender and the file recipient operate programs, systems, and/or methods with hierarchical data structures in accordance with an example of this invention. The following table describes the manner in which the recipient user's system may handle receipt of the new file in various different scenarios:

TABLE 1

| New File's Hierarchical Property Value | State of the Recipient's System Before Receiving the New File | State of the Recipient's System After Receiving the New File |
| --- | --- | --- |
| Family/Brothers/Toby | Family/Brothers/Toby | Family/Brothers/Toby - (no change) |
| Family/Brothers/Noah | Family/Brothers/Toby | Family/Brothers/Toby; Family/Brothers/Noah - (the system adds a child node for "Noah" to accommodate the new file's hierarchy) |
| Relatives/Cousins/Toby | Family/Brothers/Toby | Family/Brothers/Toby; Relatives/Cousins/Toby - (the system adds an entire new hierarchy for the new file). |

The various property values associated with a file may be displayed at any appropriate time and in any appropriate fashion without departing from the invention. For example, as described above in conjunction with FIG. 4, property information may be displayed in a "preview" panel associated with a file. As additional examples, if desired, the properties associated with a given file may be included with a "property" page or a "display properties" command associated with a file. Existing properties also may be displayed, for example, during save, save as, edit profile, open file, or other similar operations. If desired, the stored properties associated with a file also may be displayed while the file is opening and/or open, e.g., in a toolbar, and the user may have an interface available for editing the properties, e.g., while actively working with the file, after it is saved, before it is opened, etc. Many other options are available for displaying the saved property data associated with a given file without departing from this invention. Of course, any number of properties may also be associated with a given file without departing from this invention.

Also, any desired amount of the property data associated with a file may be displayed in the various locations without departing from the invention. For example, if desired, the entire hierarchical path may be shown for each property (or at least some properties) at any location where one or more of the properties associated with a file are displayed (e.g., in "preview" or "property" panels, like that shown in FIG. 4). As another example, if desired, only the assigned property value itself may be shown at the various locations (and the remainder of the hierarchy can be seen, for example, via the navigational panel, during a cursor "hover" action, etc., as well as via the file information stacking and grouping features to be described in more detail below). As a more specific example, if an individual file (such as a digital picture) has the following hierarchical keywords assigned to it: "Sports Pics>Baseball>Practices>Cardio Drills," this lengthy flat path string may be represented in at least some locations simply by providing the lowest child node in the path, namely "Cardio Drills." This truncated format of property listing, however, runs the risk of having name collisions and/or being somewhat unclear to the user (e.g., if the node "Cardio Drills" exists at multiple locations in the hierarchy). In such situations, if desired, additional hierarchical information may be displayed along with the lowest level keyword to distinguish the conflicting information. For example, as described above in conjunction with FIG. 2A, each hierarchical node in systems and methods according to at least some examples of this invention has a different and unique path. This information may be used to resolve conflicts described above. Specifically, for example, when there is a conflict of the type described above (defined as two hierarchical property values being visually represented in the same way), systems and methods according to at least some examples of the invention will traverse the conflicting paths until a different parent property value is found, and that value will be displayed (optionally along with the conflicting lowest level node information). For example, if a hierarchy contained and/or an individual file was tagged with both: "Sports Pics>Baseball>Practices>Cardio Drills" and "Sports Pics>Basketball>Practices>Cardio Drills," the displayed property information, e.g., in a "preview" or "property" display, may be represented, for example, as "Cardio Drills . . . Baseball" and/or "Cardio Drills. Basketball," and/or in some other appropriate manner to distinctly show the correct hierarchy.

As another example of practical use of hierarchical property information, many businesses are arranged with at least some degree of hierarchical structure (e.g., departments, divisions, locations, etc.). More targeted operating systems, methods and/or application programs according to examples of the invention may be developed for such businesses that take advantage of the hierarchical nature of the individual corporation's structure. For example, pre-determined hierarchies may be provided for the computer systems, networks, and/or application programs used by corporate employees that include a predefined hierarchical structure for properties in data stored for the corporation. Such systems and methods can enable at least some overall sensible hierarchical structure in the corporation's systems and networks in which its data may be organized and stored.

Aspects of the present invention also relate to computer-readable media including hierarchical property data stored thereon and computer-readable media including computer-executable instructions stored thereon for allowing entry and/or use of hierarchical property data in various operating systems, application program environments, and/or various other systems and methods, including the systems and methods described above. The computer-readable media may constitute computer-executable instructions stored on the various specific examples of computer-readable media described above.

B. Multiple Property Selections

As described above, additional aspects of the present invention relate generally to systems and methods for searching information contained on a computer system or network, optionally, taking advantage of the hierarchical property structures described above.

With its Windows® computer operating systems, Microsoft Corporation of Redmond, Wash. introduced a real world analogy for saving, organizing, and retrieving electronic information from computer systems or networks, namely folders. This folder system was strictly an end-user concept introduced to give a real world feel to the electronic data and information stored on or available through the computer. Computer users typically think of their computer's hard drive as a big filing cabinet in which their files are organized. However, to the computer system itself, an electronic file is simply a series of bits that are encoded magnetically to a hard drive (or in some other manner), and a "folder" is simply a way for the computer system to reference those sets of files.

With Microsoft Corporation's NT File System ("NTFS"), the ability to support hard links was introduced. This feature enabled users to place electronic files in multiple folders. Of course, physically, this feature does not require that the bits representing those electronic files are duplicated multiple times on the computer's hard drive (or other storage system), e.g., once for each folder in which the file is placed. Rather, the different folders reference back to the same file. However, when initially released, this ability was not exposed to end users because putting a single file into multiple folders did not match the user's real, physical world concept (i.e., the same physical piece of paper cannot be located in two separate physical folders at the same time).

In at least some operating systems in which at least some aspects of this invention may be practiced, a new end-user concept called a "list" is being introduced. As a physical analogy, one may think of a "list" as a container that references sets of items (e.g., electronic files). To better understand "lists," a more detailed explanation of a "folder" is described. A "folder" may be considered as a "set" or group of items that are considered as related to one another in some manner (e.g., being present in the same "folder" may be one way that items in a set may be considered as "related"). Each item or file in a set or folder may include a property called "PARENTFOLDER" (e.g., in the form of a path, such as "c:\users\usera\documents\"). Notably, this path also is an end user metaphor and does not necessarily reflect the physical structure of the computer. In fact, the concept of a drive itself also may be considered a metaphor, as a single physical hard drive may be partitioned into multiple "drives," such as a c drive, a d drive, etc.

Another way users can define a "set" is through a "list." "Lists" may be considered as related to "folders" because each may be thought of as defining a set of items. Unlike "folders," however, "lists" in accordance with at least some examples of this invention do not define this relationship using a "PARENTFOLDER" property as described above. Rather, "lists" will allow the same item (e.g., an electronic file) to exist in multiple locations (e.g., in multiple, independent "lists"). Like "folders," "lists" are an end-user concept. Putting electronic files or other items in multiple "lists" does not cause the actual physical bits representing the underlying data to be duplicated, but rather, the underlying electronic files or items are referenced by (or "linked" in some manner) to that "list." To tie this discussion back to a real world example, a person may have a "Shopping List" and an "Urgent 'To Do' List" in which they keep track of items they need to purchase and things that they need to do. Both of these "lists" may include an item such as "birthday present for wife." The user understands that buying a gift is both something that must be done while shopping and something that must be done rather urgently. The user further understands, however, that just because this item is entered in two of his/her lists, this does not mean that they need to purchase two gifts. Rather, the single act of buying the gift allows the user to remove each item from its respective list.

Operating systems in which at least some aspects of the present invention may be practiced further may include "Auto Lists." "Auto Lists," like "lists" and "folders," define sets of items. These sets of items may be generated automatically based on common property values associated with items stored on or available through the computer system. For example, if desired, users can have an Auto List based on the property value: rating=5 star. Using this "Auto List" feature, users can easily locate and see information relating to all of their files that are rated 5 stars regardless of which specific folder or "list" they may appear in. As long as the file or item has a 5 star rating associated with it, systems and methods according to at least some examples of this invention will automatically include this file or item as a member of this dynamically and automatically generated set, e.g., any time a user's query asks to see the 5-star Auto List. Other examples of "Auto Lists" may include, for example: recently created files, recently edited files, frequently used files, Author ID, creation time/date, edit time/date, file type, application name, etc.

One aspect relating to the content of an "Auto List" relates to the list's scope (i.e., the set of files and/or locations that will be searched to generate the "Auto List"). Various limits on the scope of an "Auto List" may be set, depending, for example, on the environment in which the computer is located, user preferences, the manner in which the computer or network is used, and the like. For example, the scope of an "Auto List" may be limited to a particular machine, to a particular user's files on a machine or a network of machines, and/or in any other desired manner without departing from aspects of this invention. As a more specific example, the scope of a "5 star" Auto List may be limited to a set of specific files or folders to search across, such as the files or folders on a given physical computer and/or files or folders created by a given user. If desired, however, users can set an Auto List scope (or other search scope) to search across everything on the computer and/or the network containing the computer, such as to locate all "5 star" files stored on either of the user's desktop or laptop computers.

With the increasing number of files users are saving on their PCs (e.g., documents, music, video, and picture files, etc.) and the increasing use of networked computer systems, the ability for users to select smaller search scopes (e.g., for Auto Lists or other searches) may become important (e.g., to avoid location and display of excessive irrelevant data (e.g., data from other users or other locations), to avoid search delays, etc.). As a more specific example, a graphics designer may want to scope an "Auto List" search to limit its search and returned content to a hard drive portion (e.g., a directory or the like) that contains only Photos (or, optionally, only a specific user's photos). This user would not necessarily want to search everything on the PC and/or everything on the network to which the PC may be connected. Such users may not wish to see other user's files that also may meet the search parameters set for the "Auto List."

Accordingly, in systems and methods in accordance with at least some examples of this invention, users may select and define "sub-item domains" as part of search scopes. A "sub-item domain" is a set of folders defining a smaller scope for the computer system to search across. This sub-item domain may include a set of folders and/or sub-folders where users store their data, items marked with certain properties, etc.

FIGS. 7A and 7B illustrate examples of sub-item domain scope setting aspects. For example, FIG. 7A illustrates an individual computer or network 700 shared by multiple users (e.g., Users A, B, and C), wherein each node in the illustration indicates a folder or other file "container" set created by and/or for the various users. During searching activities, including activities relating to generation of "Auto Lists," as described above, a user may set the system to search only a portion of these available "folders" or other elements. For example, by setting the "sub-item domain scope" for a certain search or Auto List, a user can limit his/her search to only certain folders of files. FIG. 7A illustrates a "sub-item domain," represented by triangle 702, set to search only the folders including and under the folder "User B." Of course, a "sub-item domain" may be set to encompass any portion of the network 700 without departing from this invention. Additionally, if desired, the scope may differ for the various different Auto Lists generated by a given computer system without departing from the invention. By using a sub-item domain scope such as that shown in FIG. 7A, the results of the "Auto List" or other searching activities may be much more relevant because the searching is more targeted to only certain specified source data (e.g., User B's data in this example). Also, performance speed may be increased because the set of items to inspect is smaller. Of course, user interfaces may be provided so that users can readily adjust and change the sub-item domain for any search activities, including Auto List searches.

The content of this settable "sub-item domain" need not be limited to a single folder or even a single common branch of the folder hierarchy. Rather, if desired, in accordance with at least some examples of systems and methods in accordance with this invention, a user may set a search scope (such as an "Auto List" generation search scope) to consider files located in multiple folders, optionally in multiple branches of the network or computer memory. FIG. 7B illustrates the example individual computer or network 700 of FIG. 7A, but in this example, the search "sub-item domain" is set to search through data included only in folders available from two independent users, as represented by sub-item domain triangles 704 and 706 (photo data from Users B and C in the illustrated example of FIG. 7B). Again, using this sub-item domain scope, the results of the "Auto List" or other searching activities may be much more relevant because the searching is more targeted to only the desired users' data in this example, and performance speed may be increased because the set of items to inspect is smaller.

Additional aspects of the present invention further extend from the aspects described above. In at least some example systems and methods in accordance with this invention, multiple folders and/or properties may be selected by users as the scope for searches and/or displays of information stored on the computer. Such systems and methods may utilize navigation panels that display properties and/or folders in a hierarchical manner, as described above, for example, in conjunction with FIGS. 2-6.

In conventional and currently available "folder trees" that display folders of items stored on a computer, users cannot select more than one folder at a time. If a user wants to view the contents of multiple folders, he or she has to open multiple windows (e.g., one for each folder desired) and/or consecutively open and inspect the desired folders. Therefore, the user cannot view all information from multiple folders in a common screen, making it difficult to get an accurate overview of the available information stored on the computer system or network.

The availability of "lists" and "Auto Lists" further exacerbates this problem. As noted above, lists and Auto Lists may comprise sets of property values that help define or categorize files and/or other items stored on the computer system or network. Often, users would like to further narrow down information presented via a list or Auto List procedure (i.e., the relevant files identified as meeting a search criteria) based on the requirement that the displayed information include multiple properties associated with it. For example, users may wish to see all stored pictures from a specific trip locale that also include a specific person (e.g., spouse). Without the ability to use multiple property selection techniques, users may not be able to easily find the sub-set of files that meet these two independent property criteria.

Aspects of this invention relate to systems and methods that allow for conducting searches, interpreting search results, and/or displaying search results when multiple properties are selected as part of the search criteria, e.g., from a hierarchical listing of properties provided in a navigation panel or otherwise made available to a user. Such systems and methods may be used, for example, when navigating, searching, displaying, and/or otherwise interacting with various lists, Auto Lists, and/or folders.

One feature relating to this aspect of the invention relates to the manner in which information or files are determined to satisfy the search, which includes multiple properties and/or other search parameters. More specifically, in some instances users would prefer to see the combined union of all information that satisfies either feature of a multiple property search query (i.e., display information that satisfied either property A "OR" property B), and in other instances users would prefer to see the intersection of only the information that satisfies both features of a multiple property search query (i.e., display information that satisfied property A "AND" property B). As some more specific examples, when users request retrieval of information identifying all files that contain "Maui pictures" taken with a member of the family contained therein, they expect the searching systems and methods just to retrieve those pictures that contain both a family member AND were taken in Maui. With such a query, users typically do not wish to see all Maui pictures (including all pictures without family members contained therein) and all family pictures (including pictures not from Maui). On the other hand, when users request retrieval of information identifying files that are rated either three stars or four stars, they expect the searching systems and methods to retrieve files with either of these ratings (because at least most files would not be simultaneously rated three stars and four stars by the user).

Accordingly, at least some aspects of this invention relate to algorithms that automatically determine whether users likely wish to receive set "union" or set "intersection" information based on the information or multiple search parameters selected, e.g., from a navigation panel of properties and/or folders, e.g., arranged in a hierarchical manner. In general, as will be explained in more detail below, systems and methods in accordance with at least some examples of this invention will return information (e.g., during a "search," "list files," or other navigation task) regarding files based on a union of the multiple parameters selected (a logical OR operation) when the searched multiple properties, lists, folders, items, and/or other parameters belong to the same "property" in the hierarchy. On the other hand, systems and methods in accordance with at least some examples of this invention will return information (e.g., during a "search," "list files," or other navigation task) regarding files based on an intersection of the multiple parameters selected (a logical AND operation) when the searched multiple properties, lists, folders, items, and/or other parameters belong to or lie across different properties. More detailed examples of operation of this algorithm are described below in connection with FIGS. 8 through 18. Of course, if desired, a user may be given an option and/or opportunity (e.g., via an interface screen, right mouse button click, etc.) to override the automatically selected AND or OR operation for a given search query to customize and target the results for that specific query.

1. Multiple Selections Within a Single Multi-Value Property

Figure 8:
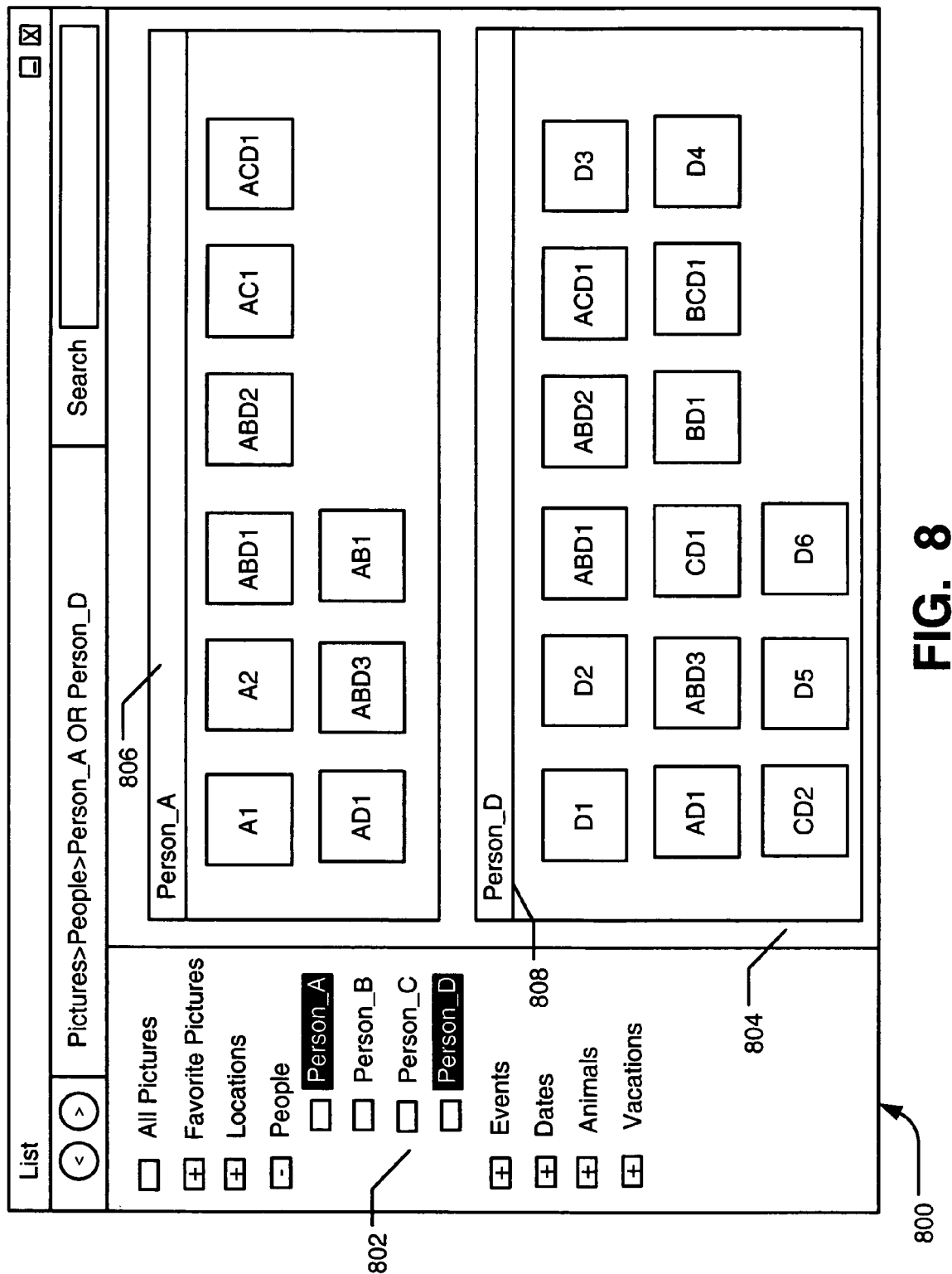
FIGS. 8 through 18 illustrate examples of user interfaces, displays, and operations during multiple property or other information selections in navigation and display operations in accordance with examples of this invention.

FIG. 8 illustrates an example display screen 800 that includes a navigation panel 802, which may include a hierarchical listing of properties, folders, and the like (the various nodes in panel 802 in the illustrated example). Information stored under and/or associated with the nodes optionally may contain information identifying individual electronic files or items of information (e.g., email files, music files, digital photo files, electronic documents, audio and/or video files, etc.) that have been associated with that node (e.g., automatically, by user input, by another's input, when the file was downloaded from another source, etc.). Information identifying at least some of the files corresponding to one or more criterion specified for the search query or list files activity is displayed, in this example display screen 800, in the display panel 804. Using the navigation panel 802, a user may select one or more of the hierarchical nodes representing an assigned property associated with the file, and the display panel 804 will contain information identifying files or other collections of information that satisfy the user specified property criteria.

As shown in FIG. 8, in this example, the user has indicated that they wish the system to retrieve information identifying files that include pictures showing Person_A and Person_D (as shown by highlighting in the figure). As a more general description, in this example, a user has selected multiple values within a single, multi-value property from the hierarchy (i.e., selection of the hierarchical icon representing Person_A and selection of the icon representing Person_D from a single property ("People")). The "People" property is called a "multi-valued" property because the files under the "People" property may have multiple individual property entries (e.g., a given picture may contain more than one identified person, and thus may have multiple "People" child properties associated with it). In response to this query, search, or "list files" command, systems and methods according to this example of the invention retrieve any pictures that contain either Person_A or Person_D (to be retrieved, the system automatically or some person must have, at some time, associated the "Person_A" or "Person_D" properties or keywords with the various picture files (e.g., as metadata, as discussed above), thereby indicating the person(s) included in the picture). Notably, in this example search query, systems and methods in accordance with this example of the invention automatically retrieve union information, i.e., information identifying files that contain either Person_A OR Person_D (represented by the letters "A" and "D," respectively, in the names included in the icons in FIG. 8), including any pictures that contain both Person_A and Person_D (i.e., pictures ABD1, ABD2, ACD1, AD1, and ABD3 in this example). In essence, systems and methods in accordance with this example of the invention performed a logical OR operation based on the input parameters specified by the user in the navigation panel 802.

Accordingly, from this example, a first rule of a selection algorithm in accordance with at least some example systems and methods according to the invention may be derived. By this rule, information returned from user selection of multiple sets within a single, multi-value property set automatically will be returned in a "unioned" or logical "OR" query language manner. Of course, if desired, systems and methods in accordance with at least some examples of the invention may provide a user with the ability to override this rule and/or this automatic selection action (and thereby run an "AND" operation).

Notably, in the illustrated display panel 804, the two selected data sets are shown or are available in their entirety and maintained separate from one another (i.e., one sub-panel 806 for the Person_A pictures and one sub-panel 808 for the Person_D pictures in this example). Notably, a single list item may appear in each sub-panel 806 and 808 (or in others), if appropriate (i.e., the icons representing pictures ABD1, ABD2, ACD1, AD1, and ABD3 appear in each sub-panel 806 and 808 in this example). Of course, many other ways of displaying the retrieved information (e.g., in display panel 804) may be used without departing from the invention, including for example, displaying a compiled listing of files or items without an indication of the source property and/or without providing repeated representations of the same file or item. As another example, if desired, the display portion 804 could also include a display sub-panel or the like that includes the results of the logical AND operation (i.e., pictures including both Person A and Person D in this example), to make this information readily available to the user, in the event the logical AND operation was desired.

2. Multiple Selections within a Single-Value Property

Figure 9:
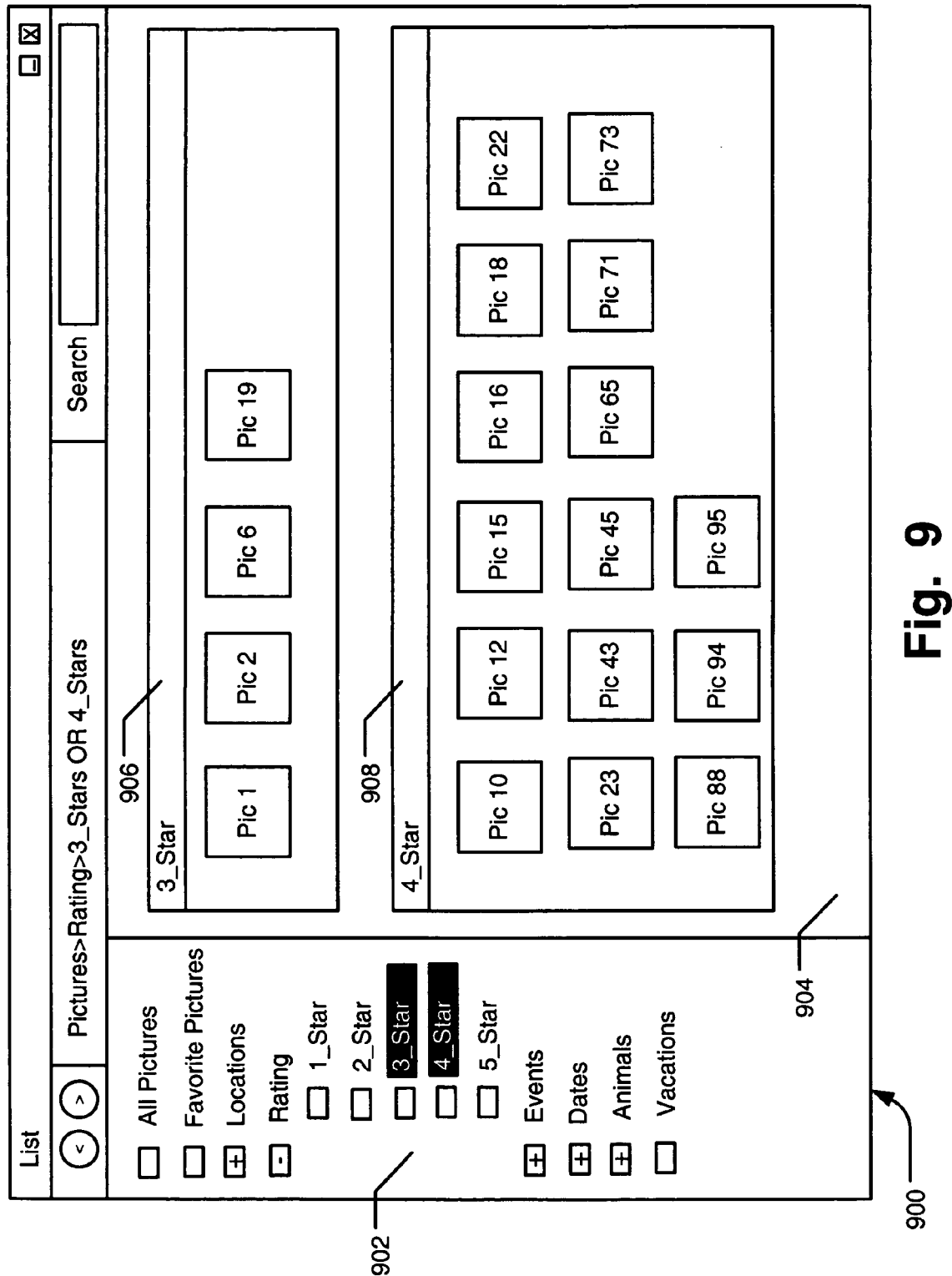

As described above, in the example of FIG. 8, the "People" property is a multi-valued property (meaning that an item of information (e.g., a file) stored under that property may have more than one of the underlying child properties associated with it). Some properties, however, may be considered "single valued properties," which means that each item of information (e.g., a file) stored under that property contains only a single instance of an underlying child of this property. Examples of single valued properties may include, but are not limited to: size, rating, and the like. FIG. 9 illustrates an example display screen 900 in which a user has selected multiple properties (e.g., in a list files, search query, or other action) from a navigation panel 902 including a hierarchical arrangement of properties (or folders, etc.), wherein the selected properties lie under a single valued property "Rating" (i.e., a user typically can and/or will give only one rating to a file). Notably, in this example, the user has requested retrieval of all pictures having a 3 or 4 star rating, as evident from the highlighting in the navigation panel 902.

In response to this query, search, or "list files" command, systems and methods according to this example of the invention retrieve any pictures rated either as 3 stars OR 4 stars (to be retrieved, the system automatically or some person must have, at some time, associated a rating property with the various files (e.g., as metadata, as discussed above)). Notably, in this example search, systems and methods in accordance with this example of the invention automatically retrieve union information, i.e., information identifying files rated either 3 stars OR 4 stars. In essence, systems and methods in accordance with this example of the invention performed a logical OR operation based on the input parameters specified by the user in the navigation panel 902. In fact, in this example, because the "Rating" property is a single valued property, it would not make sense to perform a logical "AND" operation, because the "AND" operation would return an empty set in each instance (i.e., because each file contains one and only one rating, no files will be located during the search that contain both a 3 star AND a 4 star rating)

Accordingly, from this example, another rule of a selection algorithm in accordance with at least some example systems and methods according to the invention may be derived. By this rule, information returned from user selection of multiple sets within a single-valued property set automatically will be returned in a "unioned" manner or in a logical "OR" query language manner. Of course, if desired, systems and methods in accordance with at least some examples of this invention may provide a user with the ability to override this rule and/or this automatic selection action.

Notably, in the illustrated display panel 904, the two selected data sets are shown or are available in their entirety and maintained separate from one another (i.e., one sub-panel 906 for the 3-star rated pictures and one sub-panel 908 for the 4-star rated pictures in this example). Notably, in this instance, no single list item appears in both sub-panels 906 and 908 (or in others), because each file, by definition in this example, contains a single rating value. Of course, many other ways of displaying the retrieved information (e.g., in display panel 904) may be used without departing from the invention, including for example, displaying a compiled listing of files or items without an indication of the source property.

3. Additional Logical "OR" Examples

Figure 10:
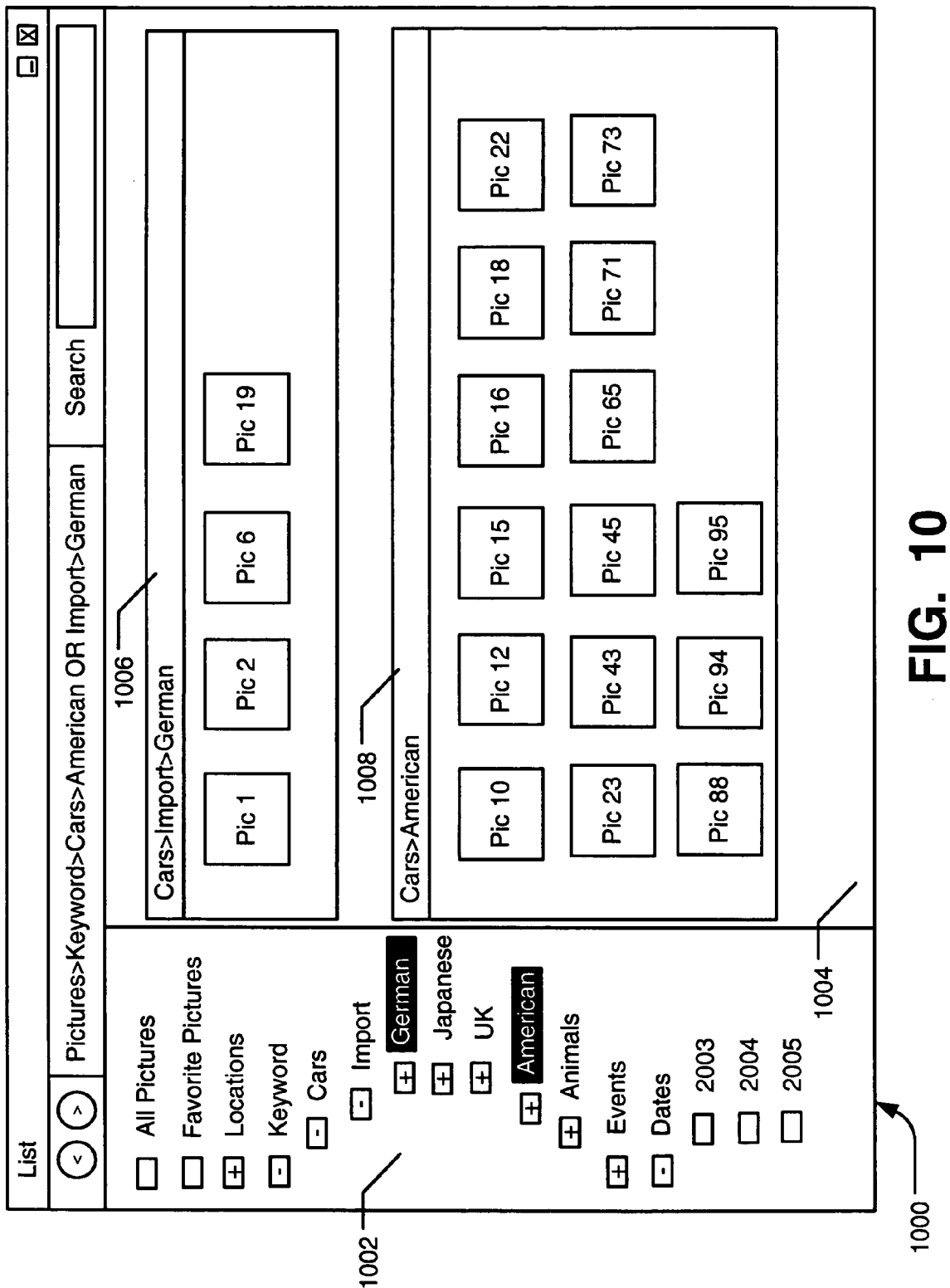
Figure 11:
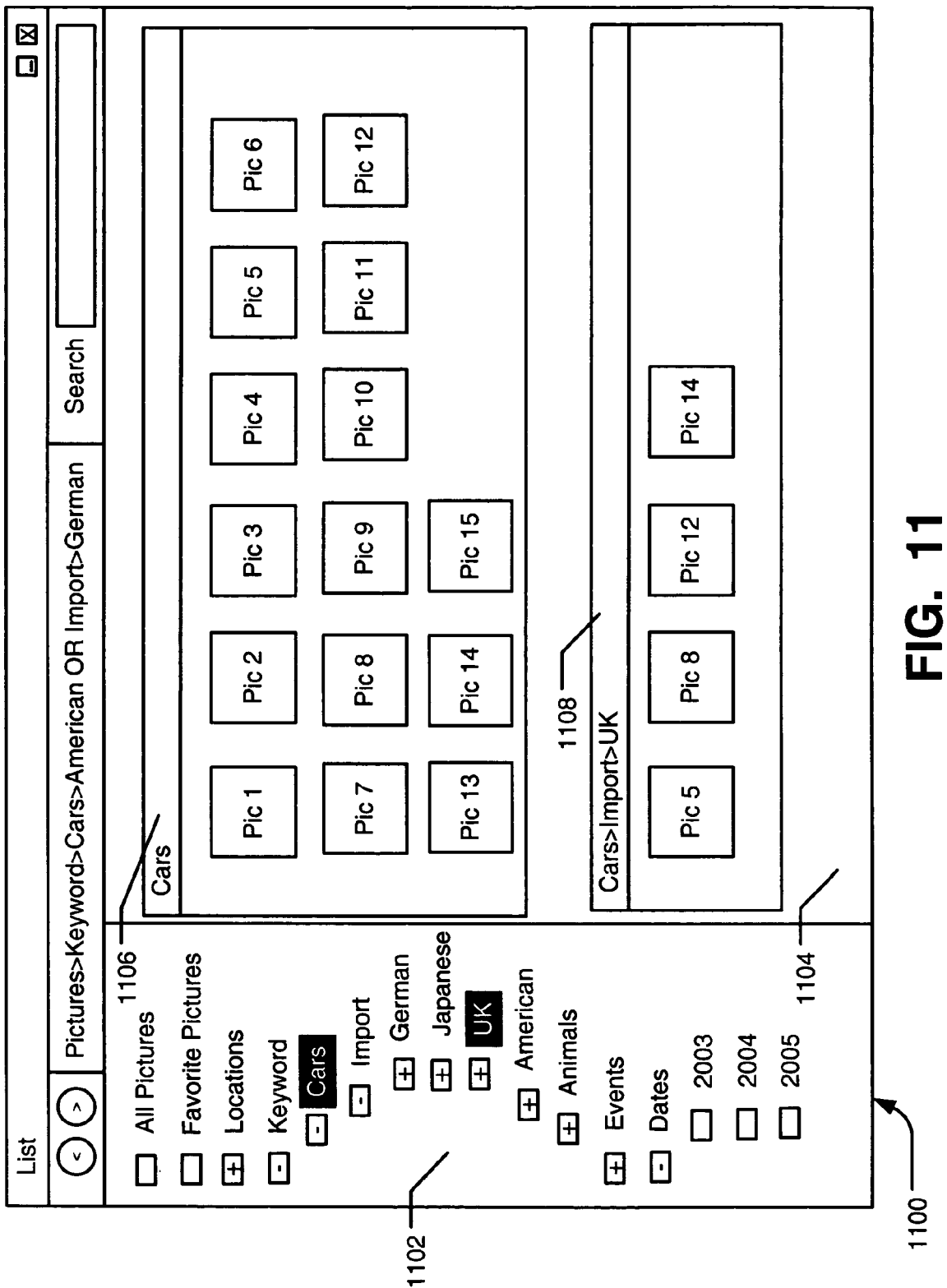
Figure 12:
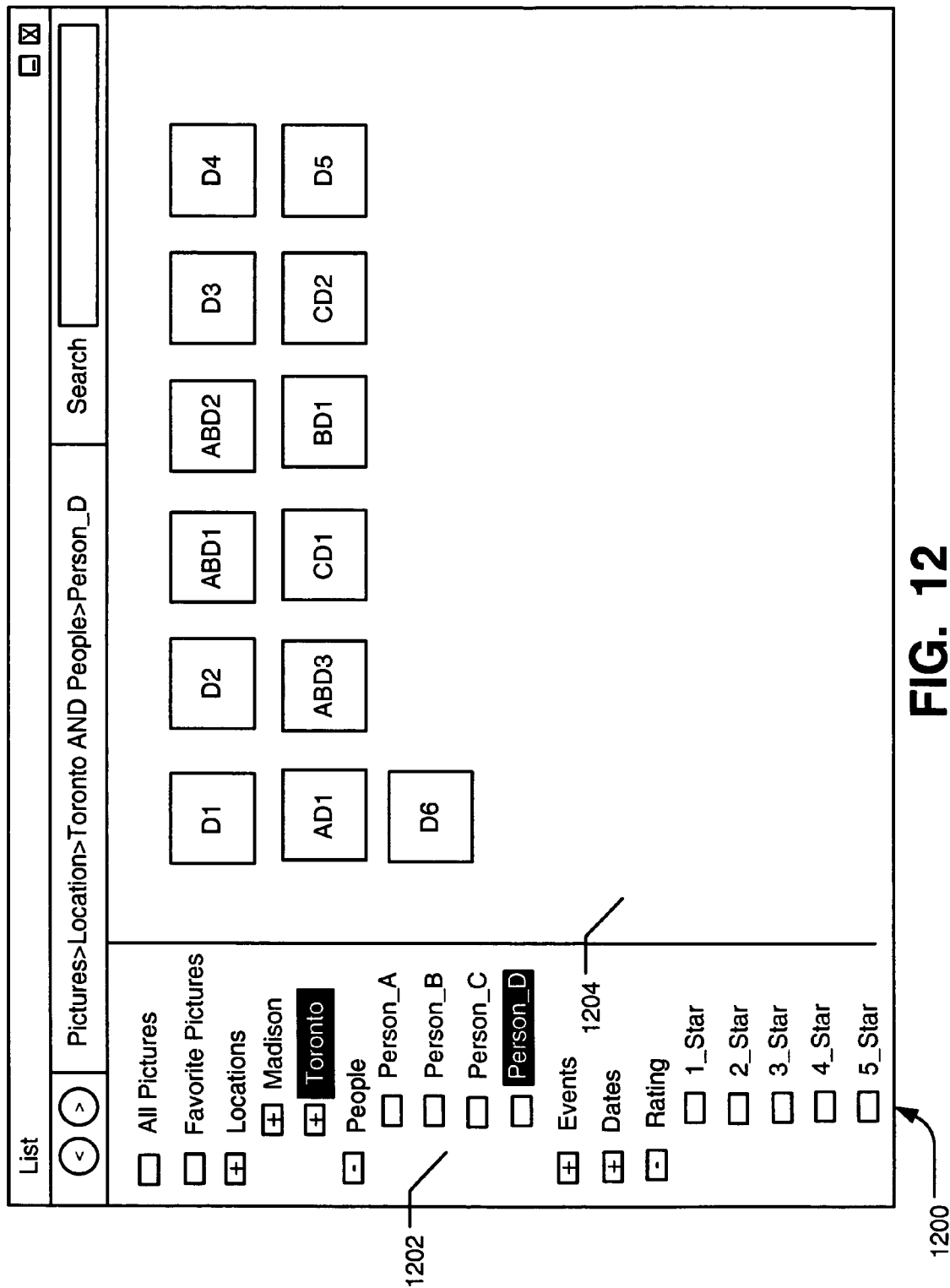

As noted above, the above rules may apply to items in folder structures and/or in a hierarchical property structures. FIGS. 10 and 11 illustrate some additional examples when user selection is applied to hierarchical properties in a navigation panel.

As shown in the display screen 1000 of FIG. 10, a user has selected two independent entries in a hierarchical property table present in a navigation panel 1002, namely a Cars>Import>German property and a Cars>American property. Because the selected properties still are located under a common multi-valued parent property ("Cars" in this example), the above rule applies, and the display panel 1004 will display the union of the two selected properties in response to this query, search, or list files operation. More specifically, as shown in FIG. 10, the display panel 1004 includes information identifying all stored files corresponding to the logical OR operation, i.e., information that satisfies either search criterion, namely stored digital pictures corresponding to German import cars OR stored digital pictures corresponding to American cars. A logical AND operation makes less sense or is less likely in this specific factual situation because typical cars would not be considered both "imports" AND "American" (an AND operation could return a hit however, for example, if multiple cars were included in a given picture and properties were associated with the file for both cars in the picture).

Notably, in this example, the two selected items (i.e., properties) in the hierarchical structure were not located in the same hierarchical level. Nonetheless, the logical OR operation was conducted in this instance because, as noted above, the algorithm's rule requires the OR operation to be performed when the selected properties are located under a common parent property (this common parent property, however, need not be an immediate parent of both or either selected node).

Notably, in the illustrated display panel 1004, the two selected data sets are shown or are available in their entirety and maintained separate from one another (i.e., one sub-panel 1006 for the German car pictures and one sub-panel 1008 for the American car pictures in this example). Again, in this instance, no single list item appears in both sub-panels 1006 and 1008 (or in others), but, because a single picture may include more than one automobile, overlapping pictures may be possible in the sub-panels 1006 and 1008. Of course, many other ways of displaying the retrieved information (e.g., in display panel 1004) may be used without departing from the invention, including for example, displaying a compiled listing of files or items without an indication of the source property, with no duplicated photo listings, etc. Also, if desired, the results of a logical AND operation also may be displayed in display panel 1004, optionally along with the results of the logical OR operation.

FIG. 11 illustrates another example display screen 1100 in which multiple hierarchical property nodes in a navigation panel 1102 are selected by a user. In this example, a node and one of its corresponding grandchildren nodes are selected by the user (namely, the Cars node and Cars>Import>UK nodes were selected). In this instance, a logical AND operation makes little or no sense because if the user had intended to list files corresponding to only the UK import cars, he/she could have simply selected the UK node to create this listing (a multiple selection was not required). Accordingly, the above selection rule still applies, i.e., because the selected properties are located within a common parent property ("Cars" in this example), the system will automatically retrieve and the display panel 1104 will automatically display the union of the two selected properties in response to this query, search, or list files operation. More specifically, as shown in FIG. 11, the display panel 1104 includes information identifying all stored files corresponding to the logical OR operation, i.e., information that satisfies either search criterion, namely stored digital pictures corresponding to all cars OR stored digital pictures corresponding to imported UK cars.

As with the various display panels described above, display panel 1104 makes the two selected data sets available in their entirety and maintained separate from one another (i.e., one sub-panel 1106 for all the car pictures and one sub-panel 1108 for the UK imported car pictures in this example). In this example system and method, all of the UK car pictures in sub-panel 1108 also are included within the more generic Cars sub-panel 1106 because all UK car pictures must fall within the Cars parent node (e.g., as described above with regard to the hierarchical properties, when a child property is assigned to a file, that file also automatically is assigned all parent properties to the assigned child property). Of course, many other ways of displaying the retrieved information (e.g., in display panel 1104) may be used without departing from the invention, including for example, displaying a compiled listing of files or items without an indication of the source property, with no overlapping photos displayed, etc.

4. Logical "AND" Examples

The above examples for FIGS. 8-11 relate to multiple user selections within a given hierarchical grouping, such as a folder, a hierarchical property, or the like. Another rule of the example algorithm for determining what data to display in response to multiple user selections in a hierarchical folder or property structure is illustrated with respect to FIGS. 12 through 14.

In general, this "rule" of the algorithm requires that when the multiple user selections are made across different parent property sets, the "intersection" of the search results will be displayed (or a logical AND operation will be performed and the results displayed). In the example illustrated in FIG. 12, the display screen 1200 shows a navigation panel 1202 in which multi-value hierarchical properties are displayed. The user has selected two properties that span across two of the highest level parent property sets, namely: Locations> Toronto and People>Person_D. In situations of this type, users typically expect a logical AND operation to be performed such that the displayed results include only pictures taken in Toronto that also include Person_D (e.g., typically with a search query of this type, a user would not wish to see all Toronto pictures or all pictures including Person_D). Therefore, as shown in display panel 1204 in this example, the resulting displayed results include only those pictures from the Toronto trip that include Person_D therein. Because the intersection of both selected sets is displayed, there is no reason to separately show the results from each user selected set, as was shown above in FIGS. 8-11 (i.e., each item in display panel 1204 would be present in the Locations> Toronto listing and in the People>Person_D listing), although these individual selected sets also may be shown, if desired (e.g., to cover the possibility that the user wanted to see both individual sets).

Of course, any way of displaying the search results, e.g., in display panel 1204, may be used without departing from this invention. Additionally, if desired, users may be provided with the ability to override the automatic AND operation produced by systems and methods in accordance with this example of the invention.

Application of the logical AND operation is not limited to use with multi-valued hierarchical properties. For example, if one or both of the user selections in FIG. 12 had constituted a single valued property (such as one of the star "Rating" properties shown in the navigation panel 1202) and the other selection had been located in a different parent property set (such as in the "People" or "Locations" property sets), the "intersection" of the selected star Rating property and the selected People or Locations property would have been displayed (i.e., a logical AND operation still would have been performed and the results displayed because the selections spanned across different property sets).

Figure 13:
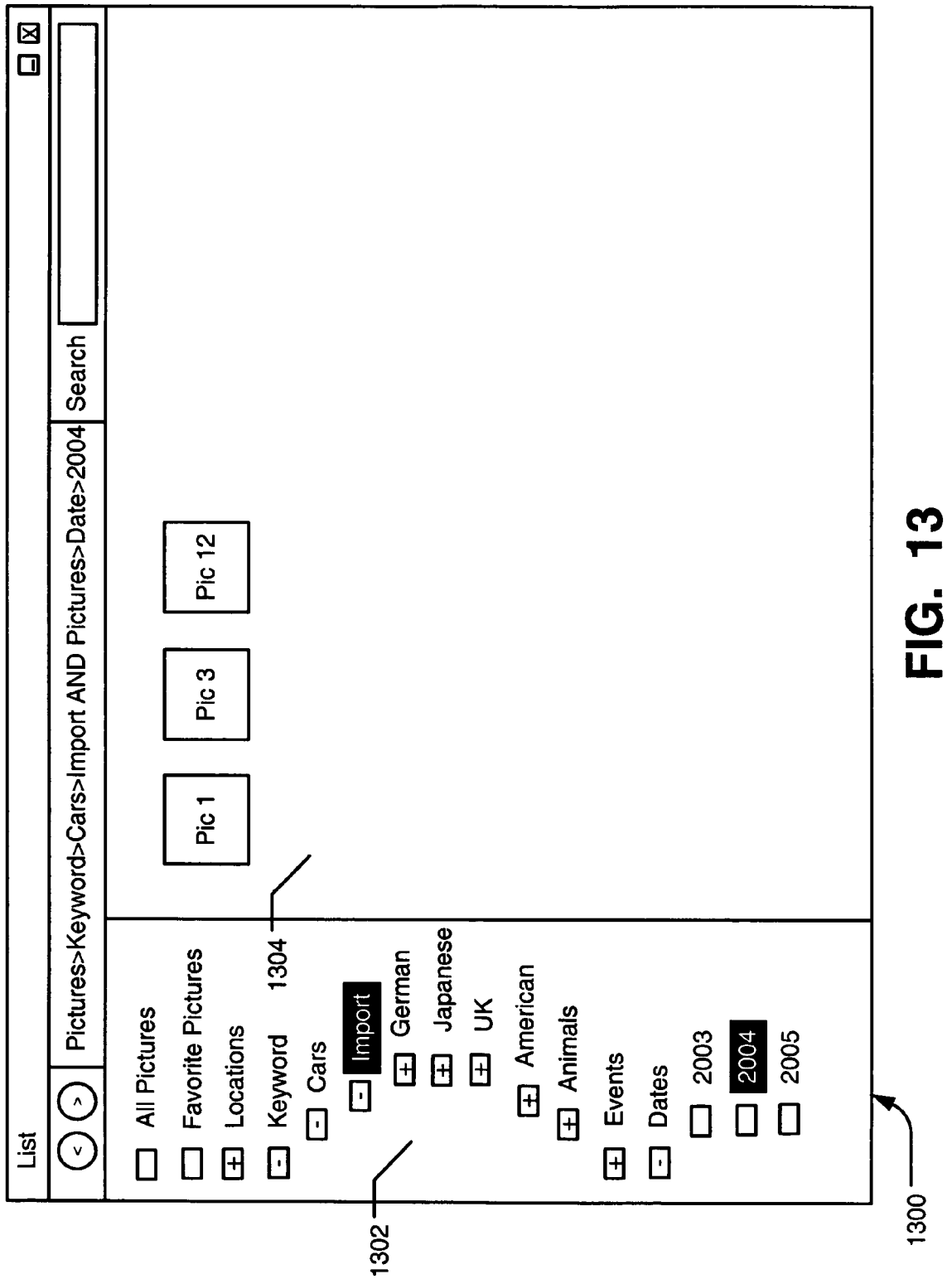

The algorithm's rule for applying a logical AND operation also applies when selections are made across different hierarchical properties, even when these selections are located at different depths within the hierarchical structure. FIG. 13 illustrates an example. As shown in the display screen 1300 of FIG. 13, the user has selected the properties Keyword> Cars>Import and Date>2004 in the navigation panel 1302. Because the top level parent properties differ, a logical AND operation is conducted, and display panel 1304 displays the intersection of these two properties (i.e., it displays files having both selected properties, namely pictures of Import cars from the year 2004). This AND operation is conducted despite the fact that one of the selected nodes has a different number of parent nodes as compared to the other selected node (and therefore exists at an overall different level in the hierarchy).

This same algorithm rule may apply and similar intersection results may be obtained irrespective of whether one or both of the user selected properties is a single value property or a multi-valued property.

Figure 14:
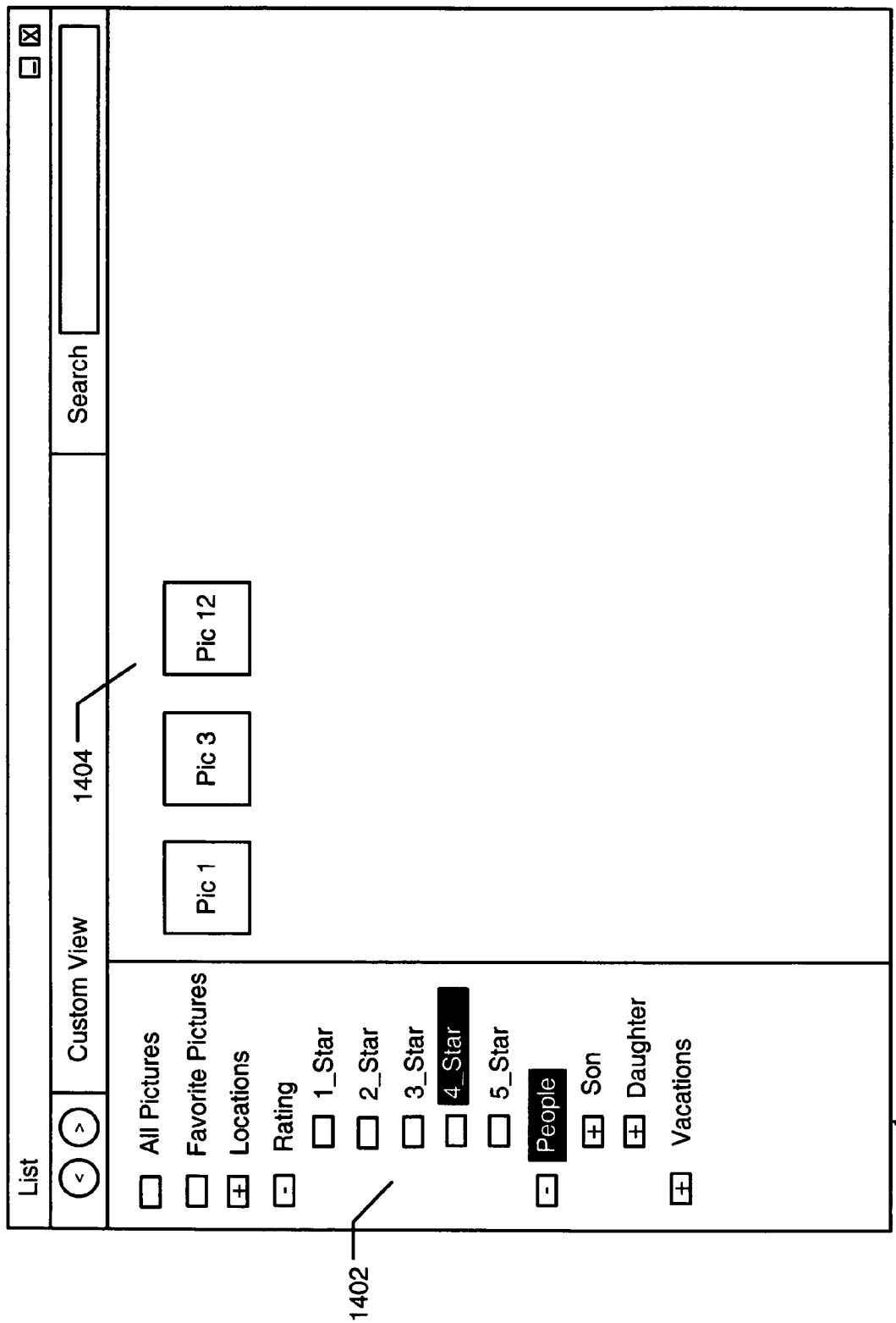

Additionally, the algorithm's rule for applying a logical AND operation also applies when selections are made across different hierarchical properties, even when at least one of these selections does not include a low level item in the hierarchy. FIG. 14 illustrates an example. As shown in the display screen 1400 of FIG. 14, the user in this example has selected the properties Rating>4_Star and People in the navigation panel 1402 (no particular person under the People node was selected). Because the top level parent properties differ, a logical AND operation is conducted, and display panel 1404 displays the intersection of these two properties (i.e., it displays information relating to files having a "People" property (e.g., any person) included therein that is rated 4 stars).

5. Use of Multiple Selections in Hierarchies with Folders, Lists, or Other Structures As noted above, aspects of the use of multiple user selections in hierarchies also may be applied to hierarchies that include conventional folders (e.g., performance of the OR/AND functions may be determined using the rules above, even if one or both user selected elements includes a folder structure). Conceptually, in accordance with at least some example aspects of this invention, a "folder" may be treated as a single-valued property. More specifically, because an individual file will reside only in a single conventional folder as described above, a folder may be treated as a single-valued property in accordance with these aspects of the invention. Optionally, if desired, the multiple user selections may include a mixture of selections of folder elements and property elements in the hierarchical structure. Various examples follow.

Figure 15:
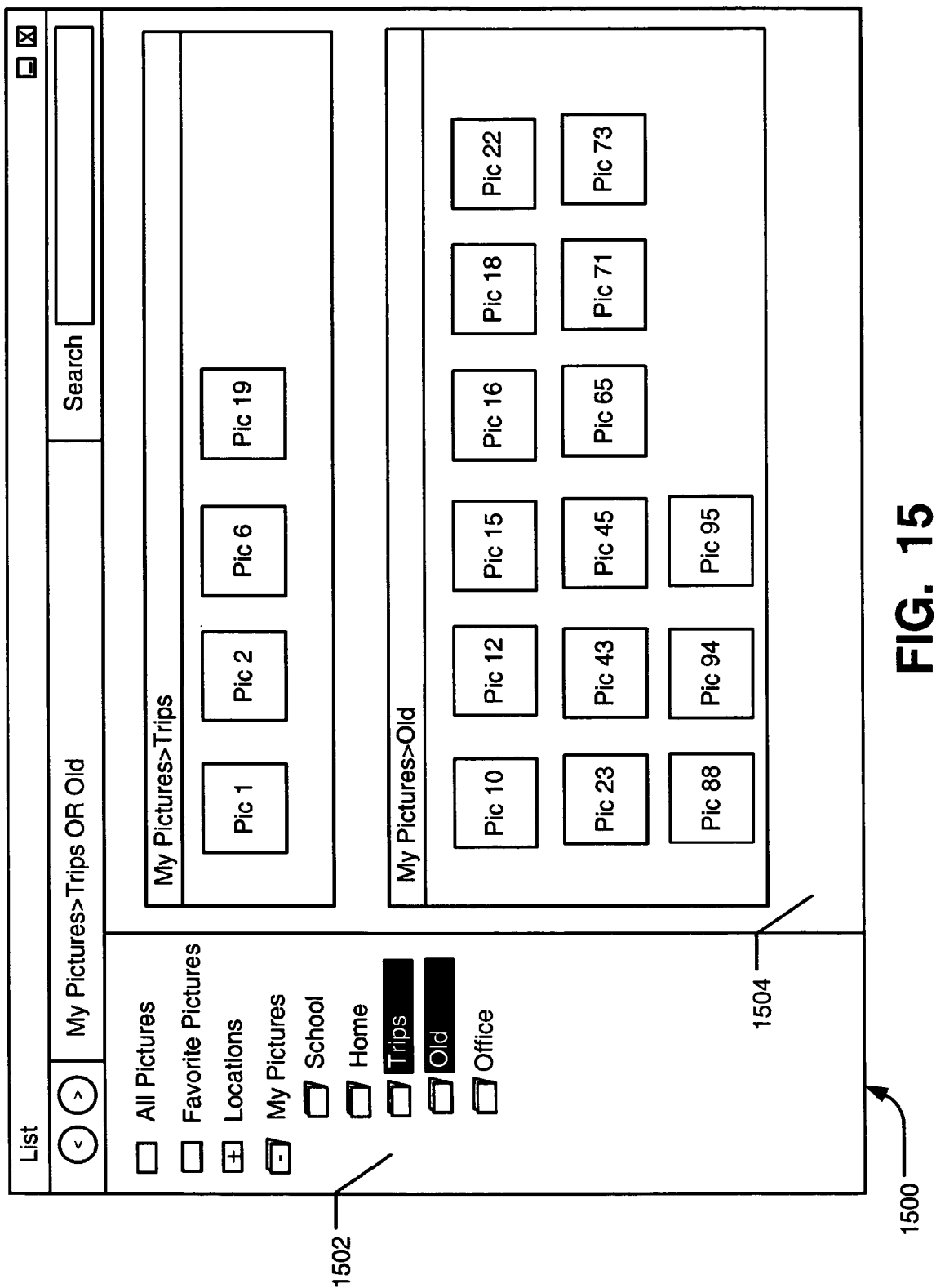

FIG. 15 illustrates a display screen 1500 including a navigation panel 1502 in which both hierarchical properties and folder structures are present. In the example illustrated in FIG. 15, the user has selected two individual folders, namely, the My Pictures>Trips folder and the My Pictures>Old folder. Because the two selections are located under the same top level parent element in the hierarchy (namely, the "My Pictures" element, in this example), a logical OR operation is applied through application of the various algorithm rules described above, and the displayed results, as shown in display panel 1504, show the union of the two selected sets. While the content of these selected sets may be displayed in display panel 1504 in any desired manner, in this illustrated example, the displayed files are identified in separate and distinct sub-panels as generally described above, for example, in FIGS. 8-11.

As described above, user files exist in a conventional folder hierarchy at a single location (i.e., a single file or other item cannot exist in two independent and separate folders at the same time). Therefore, a logical OR operation makes the most sense in the situation illustrated in FIG. 15, because a logical AND operation would return an empty set as the results.

Figure 16:
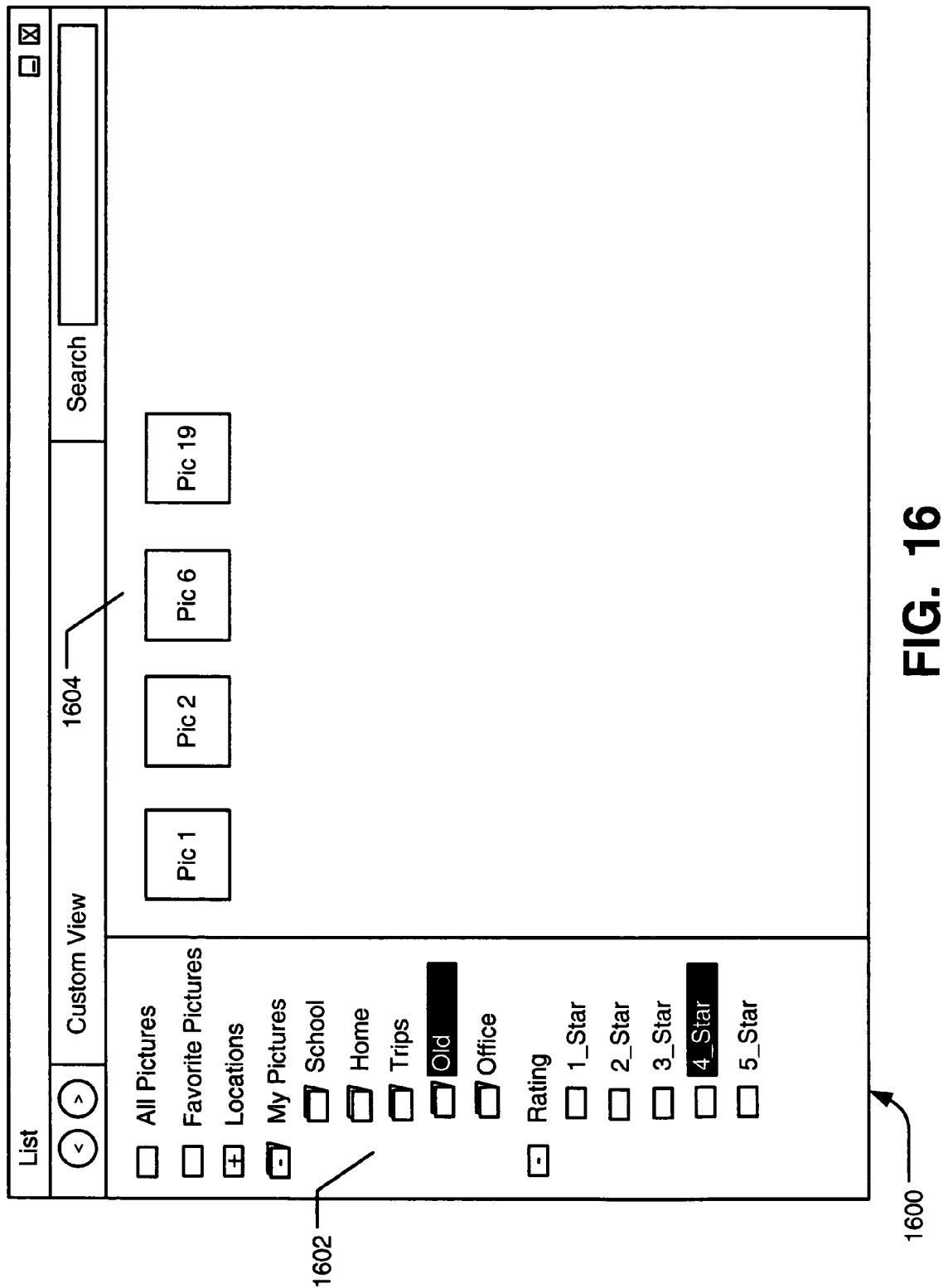

FIG. 16 illustrates display screen 1600 in an example where the OR/AND logical operation selection rules and algorithm are applied in a situation where the user's selections include at least one folder set and the selection spans across independent and different portions of the hierarchy (i.e., portions having different ultimate top level parent nodes). As shown in the hierarchy navigation panel 1602 of FIG. 16, the user has selected a rating node (4_Star, in this example) and a folder node (the My Pictures>Old folder node, in this example). Applying the various rules and algorithm described above, because the selections have different top level parent nodes in the hierarchical structure, a logical AND operation is applied, and information regarding the intersection of these two hierarchical elements is displayed in display panel 1604. More specifically, in this example, all of the stored "old" pictures having a "four star" rating are displayed in display panel 1604. Of course, any way of displaying the query, search, or list files result may be used without departing from this invention. Also, if desired, display panel 1604 could be designed to additionally show the results from a logical OR operation, and/or a user may be able to inform the system in some manner that the logical OR operation is desired.

Figure 17:
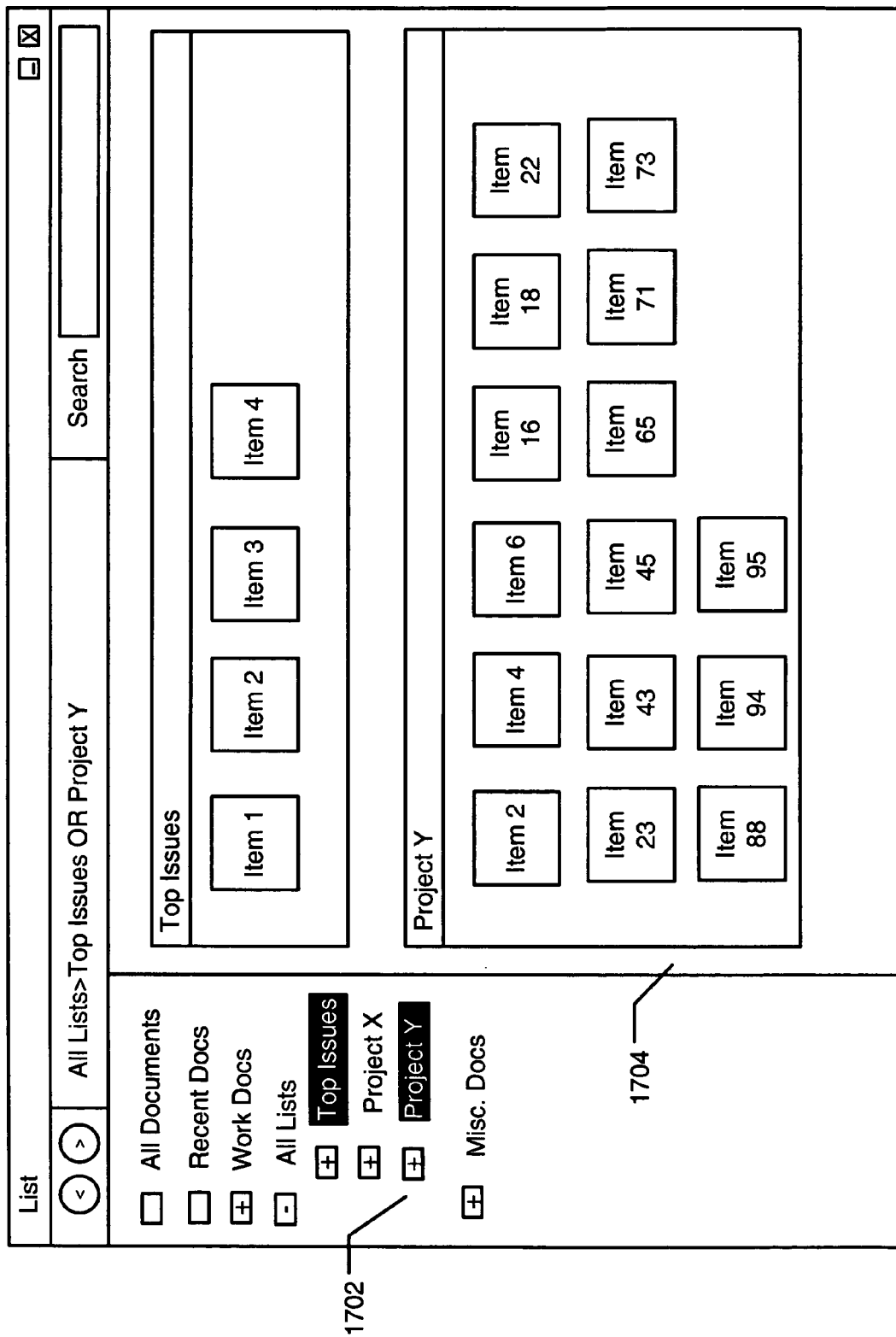

The same OR/AND logical operation selection features may be applied to list elements in a hierarchical structure, in accordance with at least some examples of this invention. "Lists" may be conceptually considered as simply constituting sets of items, such as files or the like. FIG. 17 shows an example display screen 1700 in which various list elements are included in the hierarchical structure shown in the navigation panel 1702. Multiple elements under the "All Lists" node are user selected, namely the "Top Issues" node and the "Project Y" node. In the display panel 1704, the generated display provides information regarding list items that satisfied either of these search criterions, namely, list elements designated as being "Top Issues" OR list elements designated as corresponding to "Project Y." Notably some of the list items may be included under the groupings for both nodes (e.g., items 2 and 4). While the content of these selected sets may be displayed in display panel 1704 in any desired manner, in this illustrated example, the displayed list elements are identified in separate and distinct sub-panels as generally described above, for example, in FIGS. 8-11. Also, if desired, display panel 1704 could be designed to additionally show the results from a logical AND operation, to cover the possibility that this AND result was desired by the user. Also, as noted above, if desired, the user may be given the ability to override the automatic OR operation selection.

Figure 18:
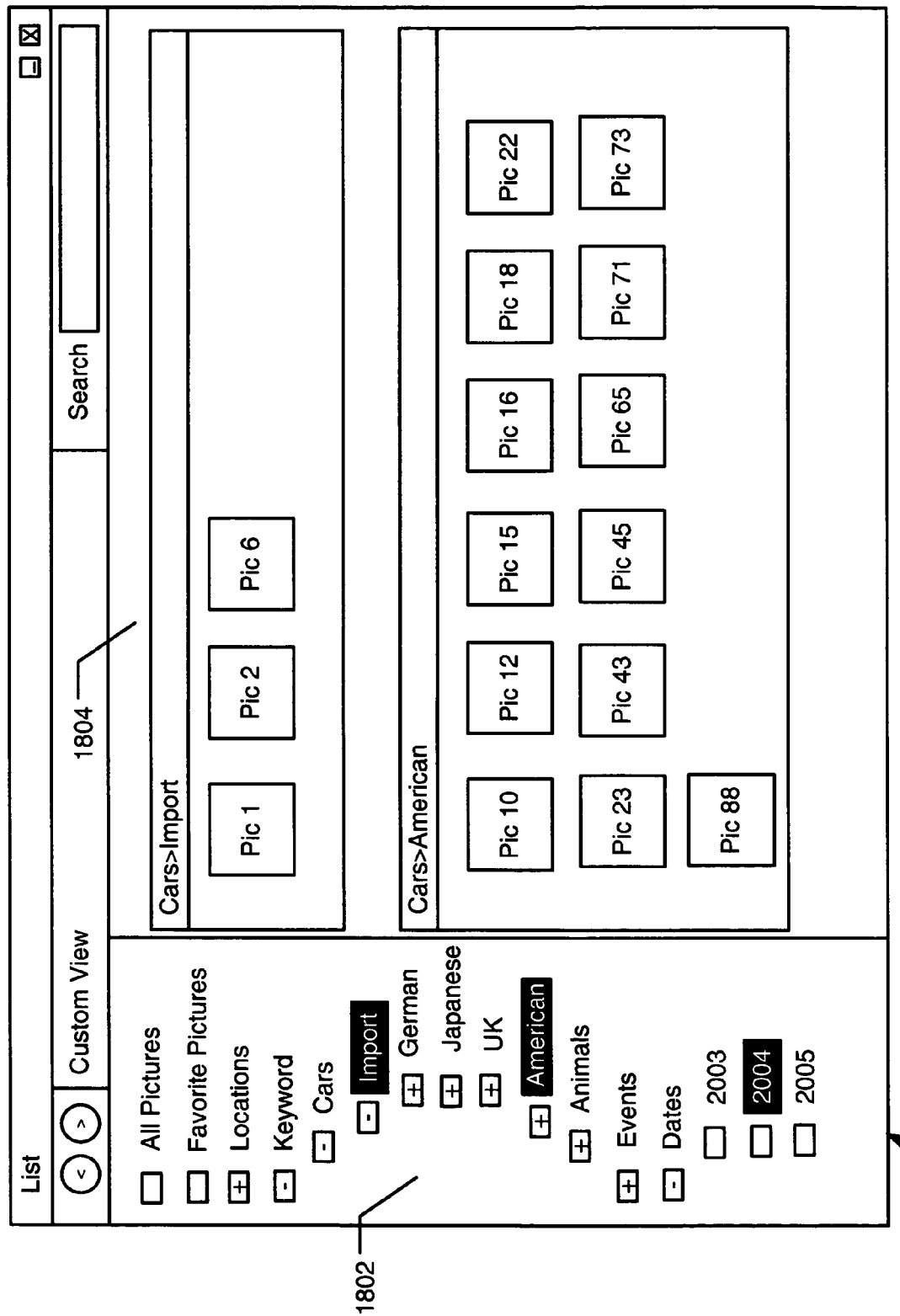

The above described OR/AND logical operation selection determination algorithms and rules also may be applied in situations in which a user selects more than two hierarchical elements (e.g., three or more folders, list elements, properties, etc.). In general, in such situations, a logical OR operation (i.e., the union) is performed with respect to any selections made under the same hierarchical parent element set, and a logical AND operation (i.e., the intersection) is performed with respect to selections made across different hierarchical parent element sets. Optionally, operations within a given hierarchical parent element set (i.e., the OR operations), if any, may be performed first. FIG. 18 illustrates an example of this type of operation.

Specifically, as shown in the display screen 1800 of FIG. 18, a user has selected three elements from the hierarchical navigation panel 1802, namely a Dates>2004 property, a Keyword>Cars>Import property, and a Keyword>Cars> American property. In response, systems and methods according to at least some examples of this invention will first perform an OR operation with respect to the selected Keyword properties, to locate all saved files including stored keyword properties meeting either of these criterion. Then, from those identified files meeting either of the Keyword criterion, a determination is made as to which files also satisfy the date criterion (by applying a logical AND operation). The displayed results, in display panel 1804, then will show the imported car pictures and the American Car pictures from 2004. While the content of these selected sets may be displayed in display panel 1804 in any desired manner, in this illustrated example, the displayed information regarding the files is provided in separate and distinct sub-panels directed to the different "OR" selections, as generally described above, for example, in FIGS. 8-11.

The above noted rules and application of these rules in determining whether to conduct a logical OR operation or a logical AND operation to multiple user selections are advantageous because they produce predictable and logical results when users use the hierarchical properties, folders, lists, or other structures for storing, searching, and retrieving information from a computer system or network. Of course, if desired and as noted above, users may be provided an interface to allow them to override these automatic retrieval rules at any time, e.g., if the rules produce the undesired results in any individual instances. As new information is introduced into the computer system or network, the above rules can continue to be applied, including to the newly added information, regardless of whether the new information may be incorporated into the existing hierarchy or requires new/additional hierarchy. Once placed in the hierarchical structure in some manner, the above OR/AND logical operation selection procedures can be carried out by determining whether the various selections are located within a given property or other hierarchy element level and/or whether they span across different top level parent property or other hierarchy element levels.

6. Computer-Readable Media

Additional aspects of the present invention also relate to computer-readable media including computer-executable instructions stored thereon for performing the various multiple property or other value selection methods and/or for use in various systems that include multiple property or other value selection methods, including the systems and methods described above. The computer-readable media may constitute computer-executable instructions stored on the various specific examples of computer-readable media described above.

C. Grouping and Stacking in the Display Panel

Today in Windows® based computer operating systems (e.g., available from Microsoft Corporation of Redmond, Wash.), it is possible to organize sets of files (e.g., from a search query or a list files command) into groups. For example, grouping by file "type" may be used to place all PowerPoint® presentations (presentation software available from Microsoft Corporation) within the search domain into one grouping and/or all digital pictures into another grouping. It can be difficult, however, for users to efficiently and effectively deal with large sets of items because they still have to locate the correct grouping to ultimately locate the file that they wish to further consider. For example, if a user has a folder with 100,000 files contained in it, grouping those files may help sort through things somewhat, but it still may be difficult for users to locate the specific file desired (e.g., particularly if keyword searches or other search techniques are not effective to narrow down the grouped files).

In application programs and/or operating systems in accordance with at least some examples of this invention, users may take advantage of the ability to "stack" as a new/additional way for visually organizing files into sets. For example, if systems and methods were to stack by "file type," users would be able to see all of their files stacked into individual sets, e.g., a set for PowerPoint® presentation files, a set for spreadsheets, a set for digital pictures etc. Each of these sets may be represented, e.g., in a computer-generated display, by a stack icon that conceptually acts as a virtual container for that set of items. Stacking is a very useful way to help users narrow down on a set of items they care about because stacking clearly enumerates and identifies to the user the various available stack options.

Applied to a more concrete, real world example, stacking can be conceptually thought of as going to a car rental location and asking them to tell you what color cars are on the lot. They may advise you that they have blue and red cars available today. Conceptually, this is what happens when users stack their files by a property, i.e., they may obtain stacks for each unique value of that property.

This stacking feature (as well as other display features) may be applied, for example, to user interfaces like those described above in conjunction with FIGS. 6 and 8-18. In such user interfaces, systems and methods in accordance with at least some examples of this invention may show information including things such as Lists, Auto Lists, Folders, and properties, including, for example, user defined properties. Each Auto List may be designed to provide a way for users to view information identifying their files in various ways, for example, by a certain property. As a more specific example, a music Auto List may be stacked for example, by the performing artist, and searching by this performing artist property will allow the user to see stacks identified with all the artists included in the music collection, e.g., Bjork, Madonna, etc.

One issue, however, with simply showing a shortcut to this Auto List is that if the computer system has music from many different artists stored on it and available in the view, it still may be difficult for the user to locate the desired individual artist and/or the desired individual album, CD, or song(s).

One aspect of systems and methods in accordance with examples of this invention relates to exposing the stacking structure of the available Auto Lists as sub-nodes in the navigation panel and/or the display panel associated with it. As one more specific example, for the "Artists" Auto List situation described above, systems and methods in accordance with at least some examples of this invention may enable users to expand the "Artists" (or other) nodes in the navigation panel and/or the display panel, to thereby enable them to control and/or see all the unique Artists (or other nodes) saved on the computer, network, or system.

Other aspects of this invention relate to the manner in which information relating to groups and stacks of information is processed and/or manipulated, e.g., in a navigation panel and/or a display portion of a user interface presenting such information. More specifically, aspects of the present invention will treat "grouped" and "stacked" information in the same way and allow Auto Lists that are grouped to represent hierarchy in the navigation panel. In other words, if a user has a view of music files grouped by "Artist" in the display panel, systems and methods in accordance with examples of this invention may be used to generate sub-nodes for the various artists in the navigation panel. In at least some instances, the sub-nodes may in fact constitute another stack, and therefore, when users click on one of these sub-nodes, the set of items in the view would filter down to only those results. This gives users a quick index of the items present in the view and allows them to actually narrow down to a set of files instead of just visually or mentally organizing them.

Still another example aspect in accordance with this invention relates to the ability of users of systems and methods according to at least some examples of this invention to stack in a parent folder and flatten its folder hierarchy. For example, when a user stacks by file type in a hard drive directory or other collection of data (e.g., a "D:\Data" grouping), systems and methods in accordance with at least some examples of this invention will search through all sub-folders and take those items and place them into stacks. This gives users the ability to navigate to any folder and view its contents organized by a desired property value instead of by its folder hierarchy.

In general, aspects of this invention are useful because, in systems and methods according to at least some examples of this invention, grouping and stacking can be used to create a dynamic organizational structure in the navigation panel, and it provides the ability to select a group in the navigation panel or the display panel and narrow down the items in the view to display only that set. Still additional general aspects of the invention relate to treating grouping and stacking as sub-nodes to an Auto List and the ability to select a group in the navigation panel and/or the display panel and, through this selection, thereby further narrowing down the displayed view. More specific examples of these aspects of the invention will be described below.

Figure 19:
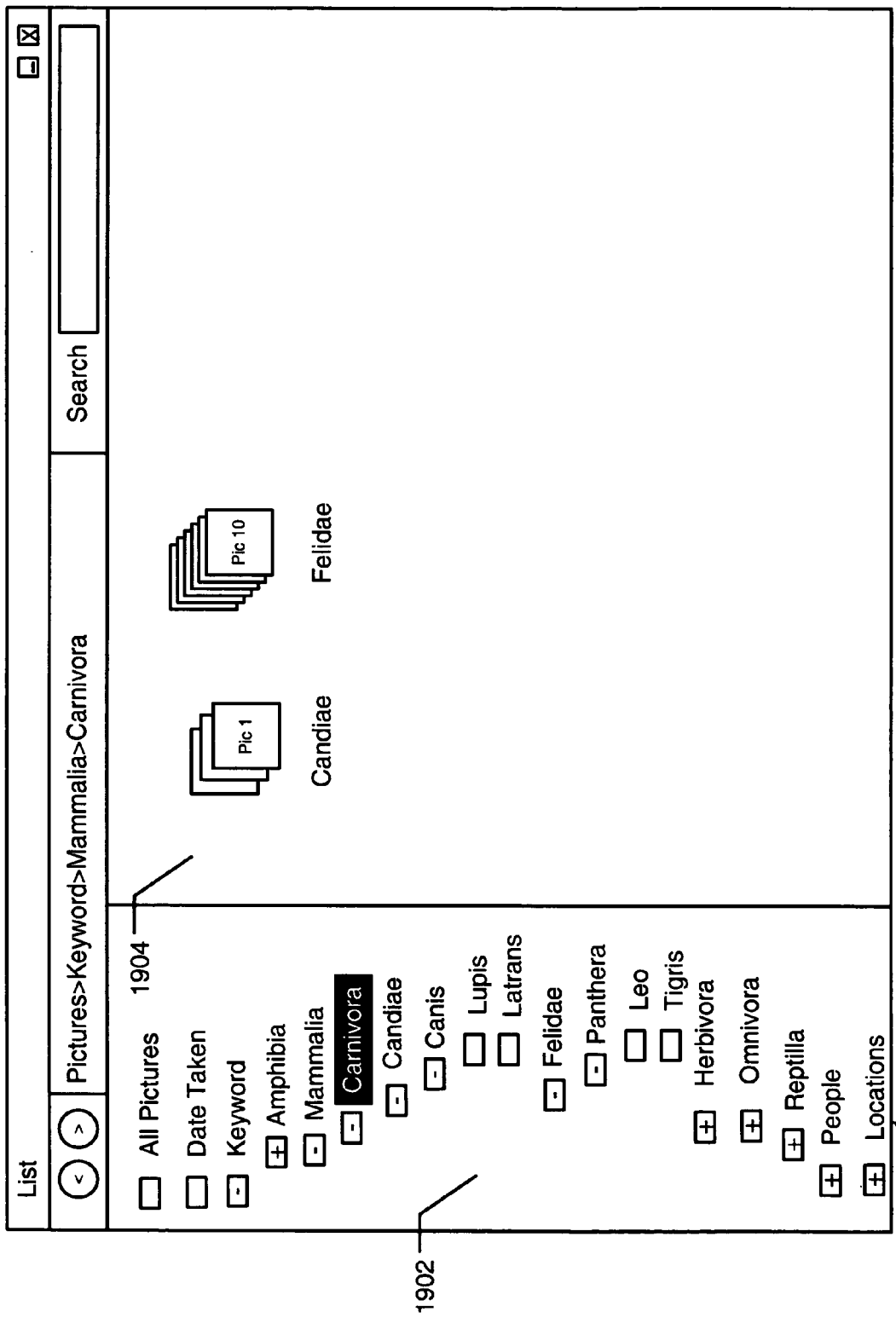
FIGS. 19 through 26 illustrate examples of user interfaces, displays, and operations during grouping, stacking, and filtering of items (e.g., electronic files) in navigation and display operations in accordance with examples of this invention.

As noted above, "grouping" and "stacking" are two different ways to visualize a set of items. FIG. 19 illustrates a display screen 1900 that includes a navigation panel 1902 and a display panel 1904 (which illustrates information relating to various stored files or items based on input received in the navigation panel 1902). Notably, in FIG. 19, the navigation panel 1902 indicates that the property or keyword "Carnivora" has been selected, and the corresponding display panel 1904 shows stacks for the individual child nodes in the hierarchy at the level immediately under the Carnivora parent node. More specifically, as shown in the example of FIG. 19, the display panel 1904 includes a stack of pictures for dogs (Candiae) and a stack of pictures for cats (Felidae). Notably, in the navigation panel 1902, the child nodes under the Candiae and Felidae nodes are fully displayed (down to their lowest level), despite the fact that these sets are shown as stacked in the display panel 1904.

In at least some instances, stacks may not constitute the most preferable way of displaying information in the display panel 1904. For example, as shown in FIG. 19, stacking may be undesirable, at least in some instances, because the user is not able to easily see any information regarding the content within the stack (e.g., the user cannot see thumbnail icons or much other displayed information regarding the content of the stack, as shown in FIG. 19). Without displaying information in the display panel 1904 in an "unstacked" manner, users may have to "drill down" to the deepest levels of the hierarchy, at least in some instances, to finally see the pictures (or other more specific information relating to specific files). This requirement can be inconvenient, particularly if the hierarchy has many levels, if many files are included in the hierarchy, and/or if the user is not certain where the desired files are located within the hierarchy.

Figure 20:
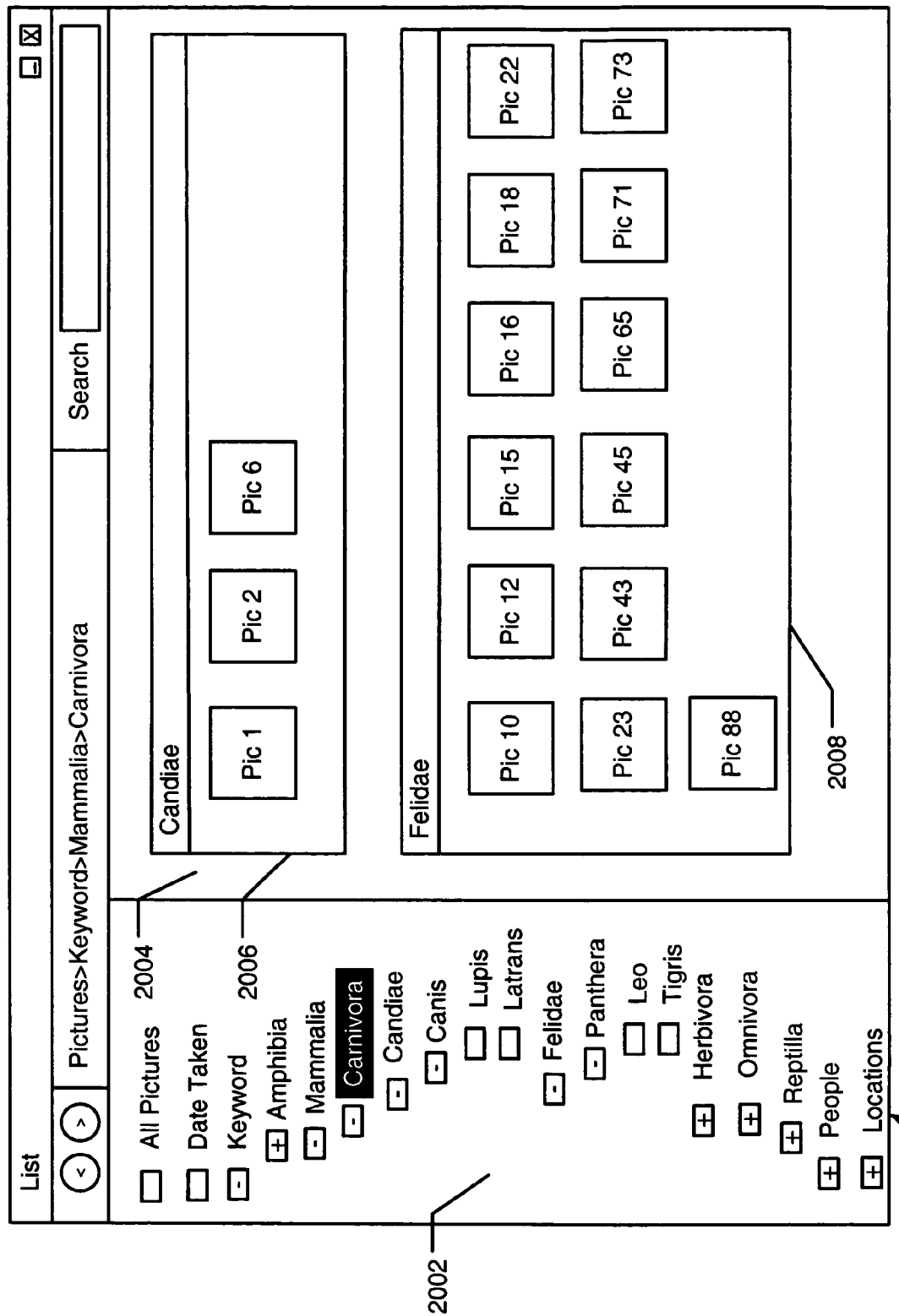

FIG. 20 illustrates another example display screen 2000 that utilizes grouping as opposed to stacking in the display panel 2004. Notably, the same node remains highlighted in the navigation panel 2002 (i.e., the "Carnivora" node, in this specific example), but the display panel 2004 shows the search results grouped under the respective child nodes under the selected parent node as separate sub-panels 2006 and 2008. Moreover, within the sub-panels 2006 and 2008, the underlying file information in this example display screen 2000 is shown in an unstacked manner so that the user can quickly and easily see information relating to the underlying content within the hierarchy.

Notably, in the example shown in FIG. 20, information relating to all of the items contained under the specific node (e.g., the Candiae node) is provided in the respective sub-panel (e.g., in sub-panel 2006), irrespective of the level in the hierarchy at which that information is located (e.g., irrespective of whether the specific picture is stored with the "Candiae" property, the "*Canis*" property, the "*Lupus*" property, or the "*Latrans*" property associated with it). This feature allows quicker and easier user access to and recognition of the desired information. Notably, this same display panel 2004 may appear as a result of other search or list files commands, e.g., if the user highlighted both the Candiae and Felidae nodes in the navigation panel 2002.

Figure 21:
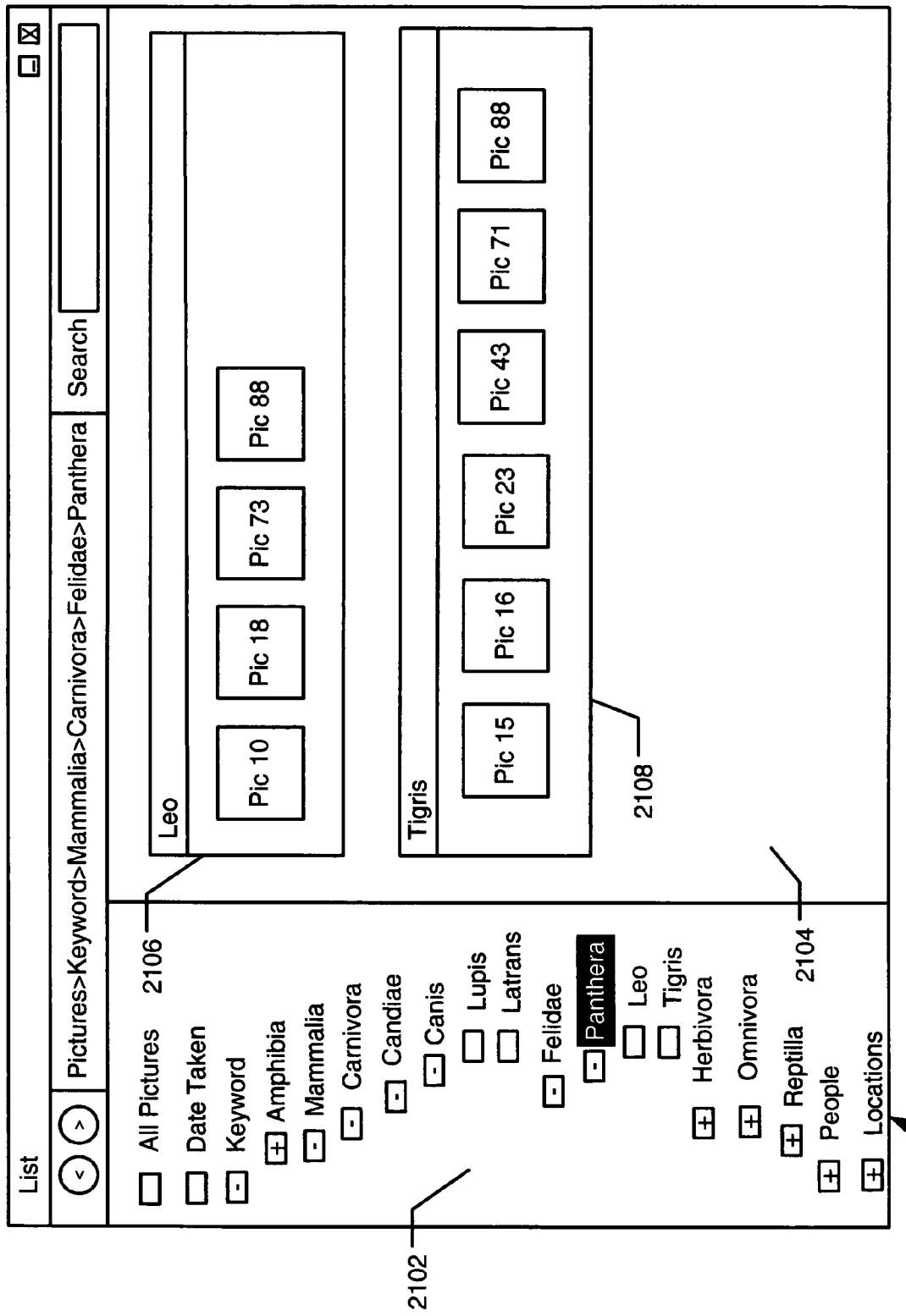

Users also can quickly navigate in the hierarchical structure of the navigation panel 2002 to see different groupings of information. An example of potential changes may be seen by a comparison of FIG. 20 with FIG. 21. Notably, in FIG. 20, as described above, the Carnivora property was selected by the user in the navigation panel 2002, which provided a display of information stored with that property, grouped based on the child nodes of the selected property (i.e., grouped based on the Candiae and Felidae child nodes in this example). In the display screen 2100 of FIG. 21, the user has changed the highlighted selection in the navigation panel 2102 to the more specific Panthera property (a grandchild node under the Carnivora property). As shown in FIG. 21, this change causes the display panel 2104 to provide groupings for the children under the Panthera property node, namely, groups of pictures labeled with the Leo and Tigris properties (see sub-panels 2106 and 2108, respectively). As evident from FIGS. 20 and 21, the navigation panels 2002 and 2102 and the display panels 2004 and 2104, along with the hierarchical properties used in conjunction with these panels, allow users to store, search, and navigate their stored data in a meaningful way and get useful thumbnail or other "preview" information of the available data throughout the hierarchy. Notably, the content and user input in the navigation panels drive the content provided in the display panels, although user input also may be allowed through the display panels, if desired.

Figure 22:
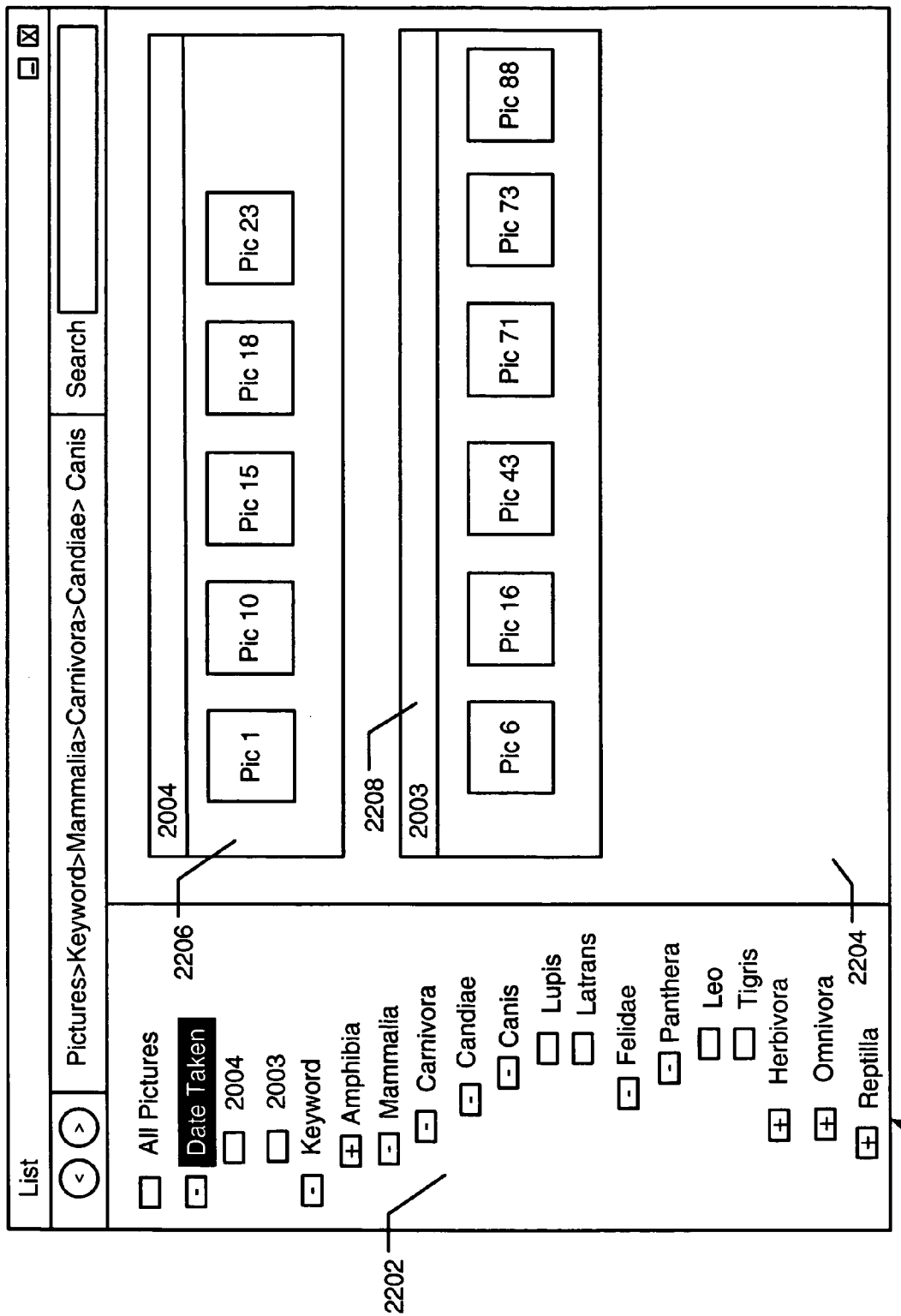

A comparison of the display screens 2100 and 2200 of FIGS. 21 and 22, respectively, illustrate additional features that may be present in accordance with at least some examples of this invention. When changing between various different auto lists in the navigation panel 2202 (e.g., from Keyword>Mammalia>Carnivora>Felidae>Panthera in FIG. 21 to Date Taken in FIG. 22), the hierarchical structure in the navigation panel 2202 does not collapse, but rather, it remains as the user left it (e.g., in the illustrated example, the full hierarchy for the Mammalia property and its children remains exposed). In general, in accordance with at least some examples of the invention, the navigation panel 2202 does not reflect or change to reflect what is shown in the display panel 2204 (e.g., in sub-panels 2206 and 2208), but rather, the navigation panel 2202 drives what is being presented in the display panel 2204.

This "non-collapsing" feature of the navigation panel 2202 may be useful for various reasons. For example, in general, users expect this hierarchy to remain exposed in this manner, e.g., from their interactions with conventional electronic file and/or folder systems. As another example, keeping the hierarchy open, expanded, and available in this manner (e.g., until closed by the user) can be more convenient, e.g., if the user decides to return to the hierarchy, for example, for additional searching, navigation, or previewing purposes, for property assignment to file purposes, and the like. Moreover, by leaving the navigation panel 2202 in an unchanged state as the user navigates and potentially manually changes it, the past locations visited by the user will remain readily available, so that they can quickly return to where they have been, if desired.

Figure 23:
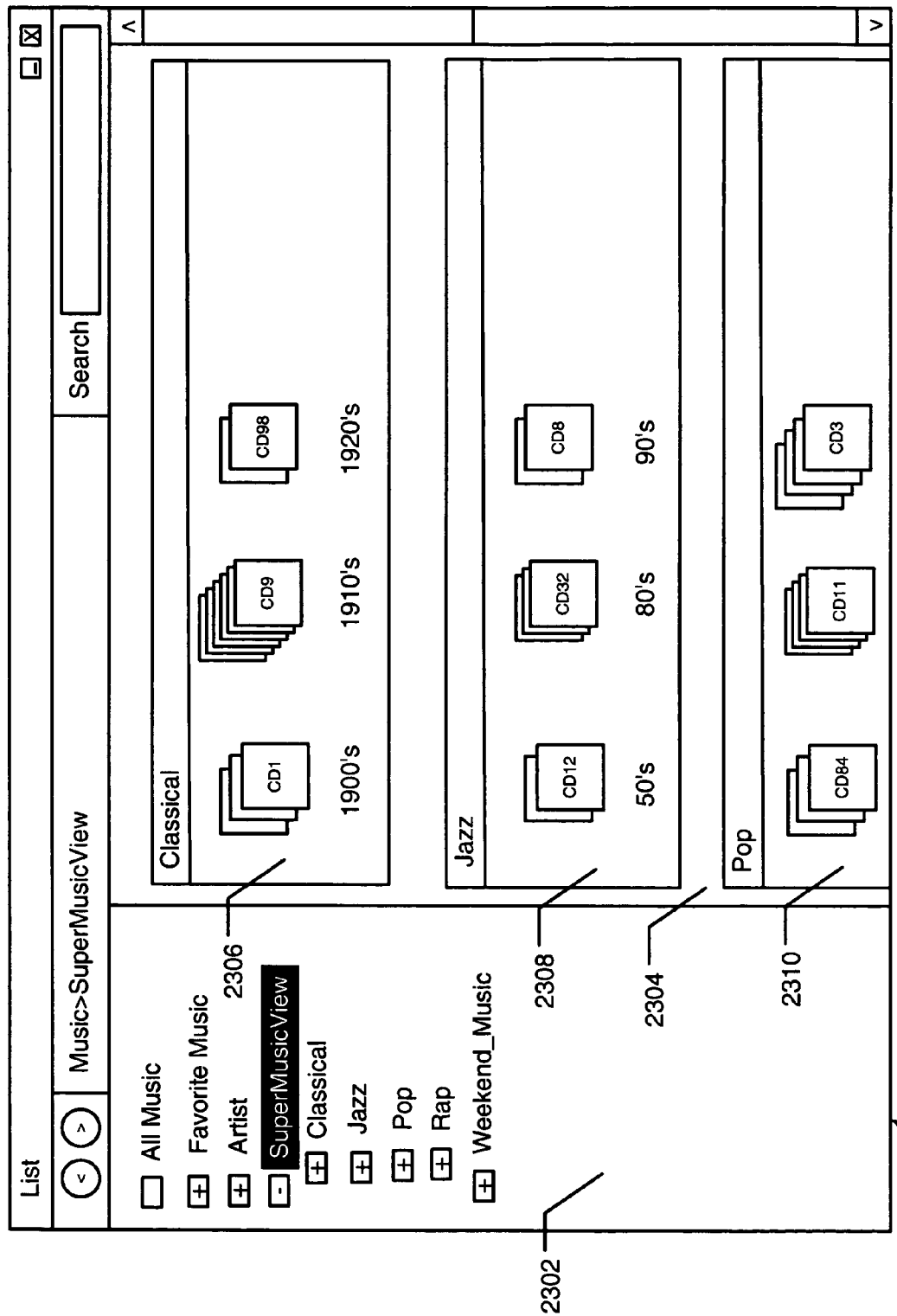

If desired, in accordance with at least some examples of this invention, combinations of grouping and stacking may be used in the display panel. An example of this combined use of grouping and stacking may be seen, for example, in the display panel 2304 of the user interface display screen 2300 shown in FIG. 23. More specifically, FIG. 23 illustrates a display screen 2300 having a navigation panel 2302 including information relating to a collection of stored digital music, wherein at least some of the information relating to the stored music includes hierarchical properties. In this example display 2300, the user has highlighted an auto list entitled "SuperMusicView" in which the contained music data has been stored with properties including various different genre of music (e.g., one child node for "Classical" music, one for "Jazz," one for "Pop," one for "Rap," etc.). Of course, any number of genres may be included in the hierarchical structure without departing from the invention.

By selecting the parent "SuperMusicView" node, the systems and methods in accordance with this example of the invention display information in the display panel 2304 relating to stored music on the system grouped by the various genres (e.g., sub-panels 2306, 2308, and 2310 for the genres "Classical," "Jazz," and "Pop," respectively). Within each individual genre grouping, in this example, the information is stacked, e.g., by the decades in which the albums or musical selections were released. If desired, a user can further "drill down" into the hierarchical structure, e.g., in the display panel 2304 or the navigation panel 2302, to see more detailed information relating to the information stored within the stacks (e.g., individual CD or album titles, in this illustrated example, information stacked by performing groups or artists with the stack including individual albums, etc.). Further drilling into the individual CD or album titles may be used, if desired in at least some examples of systems and methods of the invention, to display information regarding the titles of the individual songs or tracks included on the album or CD. Of course, any number of stacks, groupings, and/or any desired types of information may be included in the hierarchical property structures without departing from this invention.

Notably, in the example navigation panel 2302 and display panel 2304 shown in FIG. 23, at least some portion of the hierarchy of the Auto List is shown in the navigation panel 2302 regardless of whether grouping or stacking appears in the display panel 2304. In fact, in this example structure, the display panel 2304 includes both grouped information and stacked information. In general, grouped information is present as a "transparent container," meaning that the content in the grouping is readily available and visible to the user in the view. Information contained in "stacks," on the other hand, may be considered as being in an "opaque container," meaning that at least some of the individual content may be hidden from the user due to the stacking display (but the hidden content may be displayed or made available, if desired, by further highlighting or "drilling down" into the individual stacks via the navigation panel 2302 and/or the display panel 2304).

As with any of the windows, display panels, sub-panels, and the like contained in systems and methods in accordance with examples of this invention, when the available information more than fills the available display area, user access to undisplayed information may be gained in any desired manner, for example, through the use of scroll bars as shown in display panel 2304, through "next page"/"previous page" buttons or icons, and/or in any other desired manner.

Figure 24:
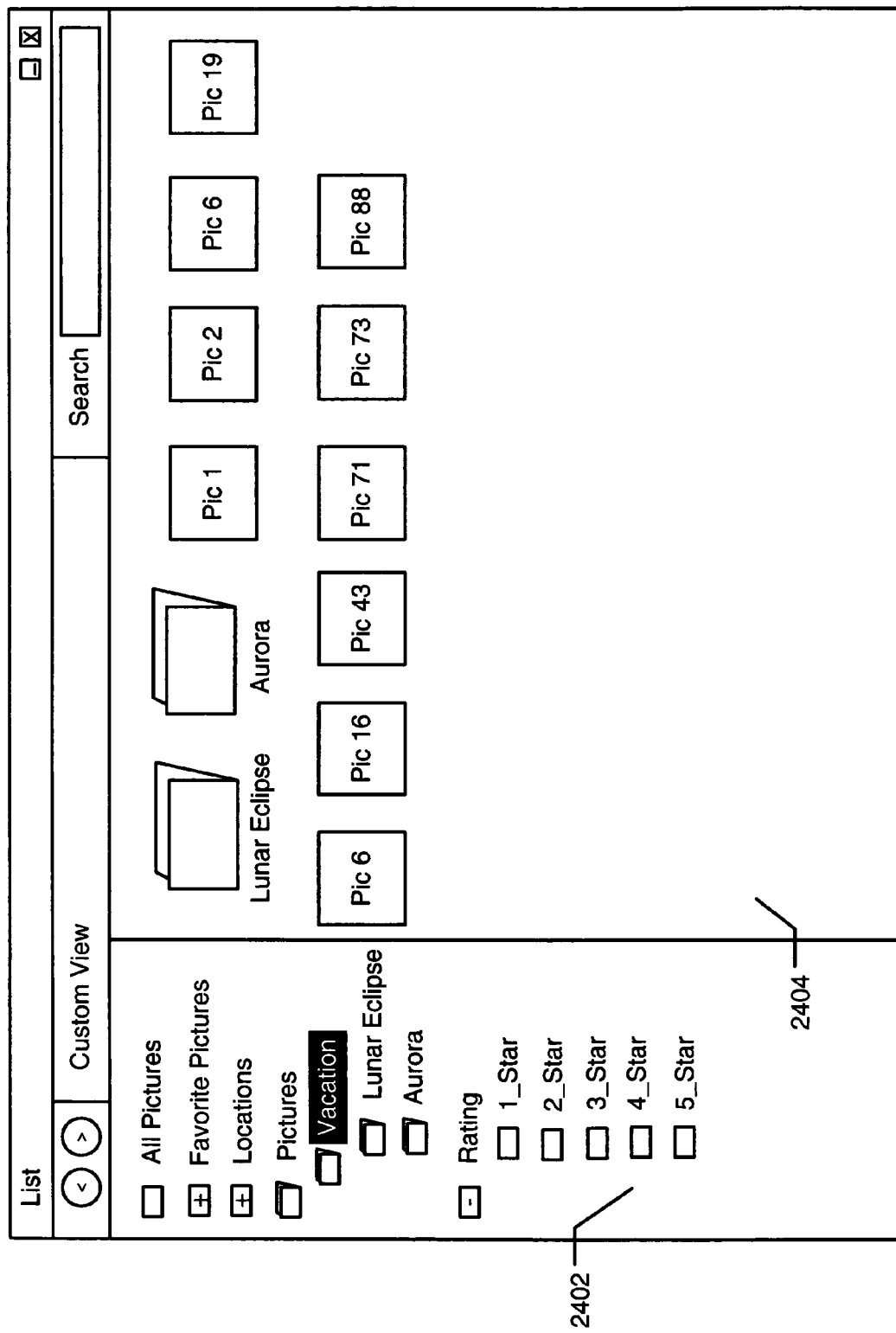

The hierarchical properties and other elements, navigation panels, and displays of groups and/or stacks of information in accordance with examples of this invention may be used in combination with conventional folder structures without departing from this invention. In general, stacking folders (e.g., in a display panel) is not useful to users because individual folders within a hierarchical structure may have vastly different and independent subjects and because users that organize information in folders often do not store many files on any given level of their folder hierarchy. Therefore, in accordance with at least some examples of this invention, stacking in a folder will flatten the folder hierarchy and re-organize the items contained within the folder into sets based on that property. FIG. 24 illustrates a display screen 2400 that includes a navigation panel 2402 with a folder hierarchical structure contained therein. When the "Vacation" folder is selected by the user in the navigation panel 2402, the display panel 2404 displays the underlying folder structure (i.e., the "Lunar Eclipse" and "Aurora" folders under the "Vacation" folder in this example), as well as the individual files contained within those folders (thereby "flattening out" the folder structure to make the underlying information readily visible and available to users). This may be accomplished, for example, by creating an "Auto List" element or node scoped to look at the selected folder and all of its sub-folders.

Of course, other ways of presenting information from the folders in the display panel 2400 are possible without departing from this invention. For example, if desired, rather than flattening the hierarchical structure shown in FIG. 24, the folder structure may be maintained in the display panel 2404, particularly in the situation where the highlighted folder itself includes several levels of hierarchy. For example, if desired, when a folder is selected in the navigation panel 2402, the information may be displayed in the display panel 2404 by removing the individual items from the sub-folders and showing these items in stacks named after the sub-folders. Of course, other display techniques are possible without departing from this invention.

Figure 25:
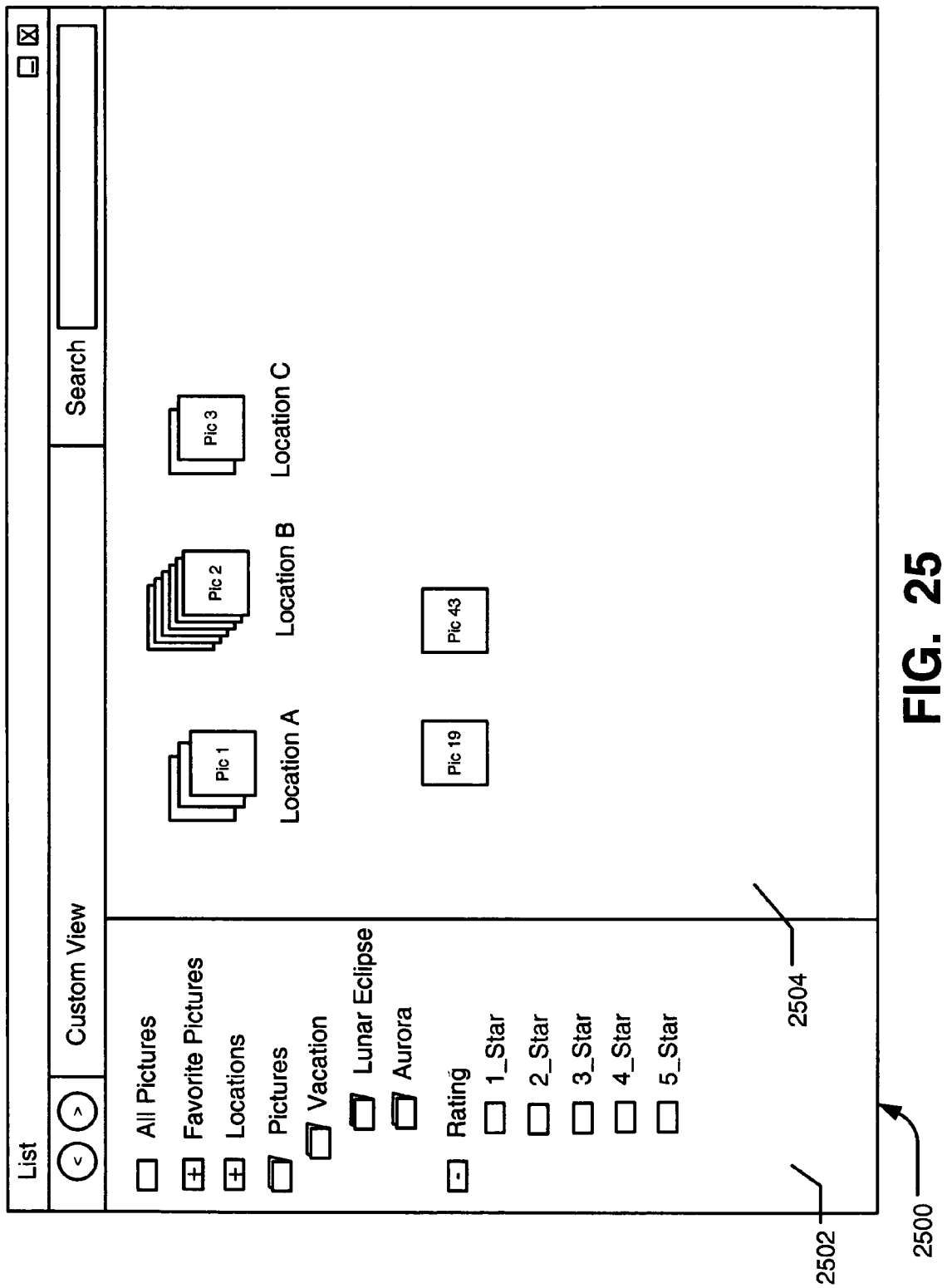

Various manipulations also may occur to data once highlighted or selected in a navigation panel and/or information relating thereto is displayed in a display panel. FIG. 25 illustrates an example display screen 2500 that may be used and/or appear in accordance with at least some examples of this invention. In this example, the user interface display screen 2500 includes a navigation panel 2502 in which a hierarchical folder structure appears, and a display panel 2504. Because of a deeper hierarchy in the folder structure in this example, when a folder is highlighted (e.g., the "Vacations" folder in this example) in the navigation panel 2502, the information in the display panel 2504 is removed from the underlying sub-folder structure (i.e., the folders under the "Vacations" folder) and placed in individual stacks. If the user then were to re-organize the information (e.g., by clicking on the "Location" icon or other property icon in the navigation panel 2502, selecting a property from a right click or drop down menu, etc.), the data could reorganize and stack by locations, as shown in FIG. 25. Because this revised stacking of the data in FIG. 25 (stacked by "Vacations" and "Location") does not correspond to the contents of the "Vacations" folder in the manner provided in that folder, no highlighting is shown in the navigation panel 2502 in FIG. 25. In effect, this action is akin to a flattening out of all information contained in the selected folder (i.e., the "Vacations" folder in this example) and then a reorganization of this information into stacks based on the children properties contained under a selected property.

Of course, many options for grouping and/or stacking in response to user commands, e.g., in a navigation panel of the type described above, and other system actions in response to user commands may be provided in systems and methods without departing from this invention. The following includes at least some additional examples of options that may be included in at least some examples of this invention.

As one example, when grouping or stacking by a property that is multi-valued, systems and methods in accordance with at least some examples of this invention may provide one group or stack for each top level value under the property, and further children property values may not be exposed in the display panel (although, if desired, the underlying information in those lower children property values may be displayed and/or made available for display). In such systems, if desired, the user can expose the children property values by navigating into the various hierarchical level groups, e.g., using the hierarchical navigation panel, drilling down into stacks provided in the display panel, etc.

If desired, in accordance with at least some examples of this invention, no way need be provided to view all keywords (grouped or stacked) as a flat list, and the information highlighted in the navigation panel will control what is displayed in the display panel. If desired, systems and methods according to at least some examples of this invention may allow users to "unstack" at any level, e.g., by providing a menu item (e.g., a button, a right click menu, a tool bar menu, etc.) that allows the user to "expand all stacks," "expand this stack," and/or the like.

Other actions also may occur while information is grouped and/or stacked, e.g., operations relating to the hierarchical properties contained in the groups and/or stacks. One example relates to dragging and/or dropping operations. In at least some examples of this invention, when dragging an item from one group to another group, the item may be changed to have the property value(s) of the newly applied group and/or stack applied to it (i.e., changed to also include the property value(s) of the "destination" groups and/or stacks from the drag and/or drop operation, and optionally, at least, to remove the property value(s) of the original source groups and/or stacks, if necessary and desired). Another example operation relates to "paste" operations. When an item is placed in a new group and/or stack by a paste operation, the destination property and its parent property value(s) may be applied to the newly placed item.

Figure 26:
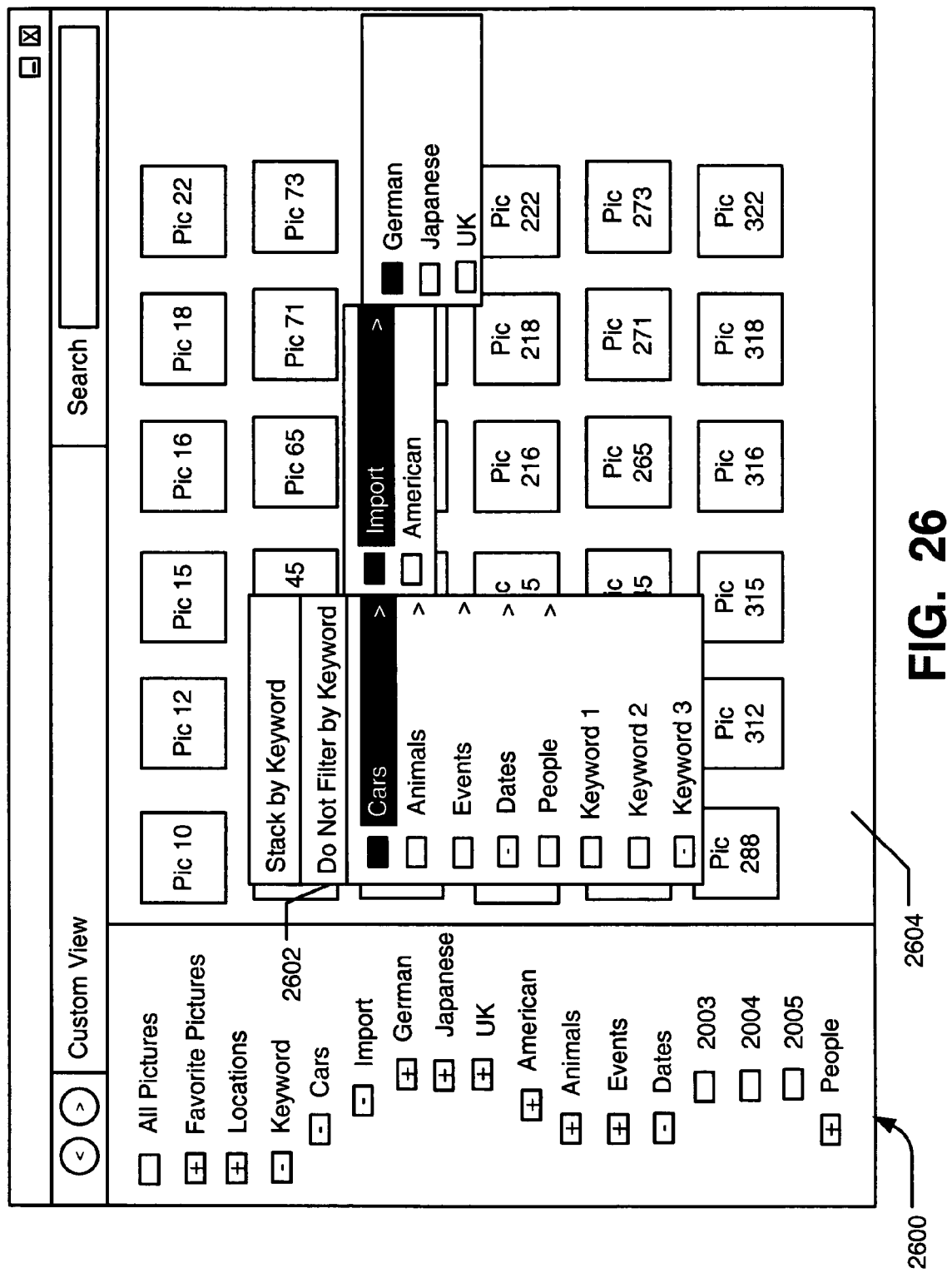

Also, many different types of displays or display contents may be provided in response to navigating into a group and/or a stack. As described above, however, in accordance with at least some examples of this invention, all items with the group title property value may be shown in an initial display, as well as all items tagged with children property values of this group/parent property value (if any). If desired, an indicator of some type may be provided in the navigation panel and/or the display panel to indicate that the item in the hierarchy can be further expanded to display children property values (e.g., a "+" sign is used with the icons or widgets in several of the illustrated examples shown in the figures of this specification). This same convention may be used in filtering menus without departing from this invention. FIG. 26 illustrates an example display screen 2600 in which an example menu 2602 has been pulled up (e.g., via a right click action or in any other appropriate manner) that will allow further user filtering of information contained in the display panel 2604 of the display screen 2600. More specifically, in this example, by clicking on the desired menu items to be used for the filtering, changes in the information present on the display panel 2604 may be made. In this example, a caret structure ">" at the far right side of each menu item is used to indicate that further, lower hierarchical levels are available for filtering, if desired.

Additional aspects of the present invention also relate to computer-readable media including computer-executable instructions stored thereon for performing the various grouping and/or stacking methods and/or for use in various systems that display information, such as properties, folders, lists, and the like in grouped and/or stacked manners, including the systems and methods described above. The computer-readable media may constitute computer-executable instructions stored on the various specific examples of computer-readable media described above.

V. Conclusion

While the invention has been described above in terms of specific examples (e.g., with many examples relating to navigation, storage, and retrieval of information relating to pictures, music, electronic documents, and the like), those skilled in the art will recognize, of course, that aspects of this invention may be used in conjunction with any types of data without limitation. Additionally, while various examples of the present invention have been described in detail above, and it will be understood by those of ordinary skill that the present invention includes within its scope all combinations and sub-combinations of these examples. Those skilled in the art also will recognize that the above examples simply exemplify various aspects of the invention. Various changes and modifications may be made without departing from the spirit and scope of the invention, as defined in the appended claims.

The invention claimed is:

1. A method for storing electronic data, comprising:
creating an electronic file including electronic data for storage on a computer-readable medium;
receiving input data indicating a first property value of a plurality of property values to be included as part of the electronic file, wherein the first property value is associated with a first flat path string and a second flat path string, each flat path string identifying a distinct hierarchical path through a first hierarchy to the first property value within the structure of the plurality of property values within the first electronic file, and wherein the first flat path string and the second flat path string each comprise a listing of property values indicating metadata of the electronic file;
storing the electronic file consistent with an association of the first flat path string and the second flat path string within a second hierarchy that is separate from the first hierarchy;
receiving a user query that, when performed, would return a reference to the first flat path string and the second flat path string, each flat path string associated with the first property value within the electronic file and identified within the second hierarchy;
retrieving, from the second hierarchy, a single reference to a flat path string associated with the electronic file and not providing repeated representations of flat path strings associated with the electronic file; and
returning the single reference to the first flat path string associated with the first property value, wherein the single reference is from the second hierarchy in response to receiving the user query.

2. A method according to claim 1, wherein the input data indicating the first property value includes data in the format: parent property value-delimiter-child property value.

3. A method according to claim 1, wherein the input data indicating the first property value includes data in the format: parent property value-delimiter-child property value-delimiter-grandchild property value.

4. A method according to claim 1, wherein:
a third flat path string identifies a third hierarchical path to a second property value within the structure of the plurality of property values within the first electronic file, and
wherein storing the electronic file is consistent with an association of the third flat path string with the first flat path string and the second flat path string.

5. A method according to claim 1, wherein the input data indicating the first property value includes data in the format: child property value-delimiter-parent property value.

6. A method according to claim 1, wherein the input data indicating the first property value includes data in the format: child property value-delimiter-parent property value-delimiter-grandparent property value.

7. A method for processing electronic data, comprising:
receiving data on a computer system or network indicating a hierarchical structure of a plurality of property values of an electronic file, each property value organized in the hierarchical structure by at least one flat path string identifying a unique path to a property value indicating metadata of the electronic file, wherein each flat path string is identified within a second hierarchy that is separate from the hierarchical structure, and wherein each flat path string comprises a listing of property value names for metadata of the electronic file;
receiving user input indicating a new property value to be included at a user desired location in the hierarchical structure;
based on the user desired location determining whether the new property value requires a new flat path string;
adding the new flat path string to the second hierarchy;
returning a reference to the new flat path from the second hierarchy to display the new property value within the first hierarchy;
receiving user input indicating a search query, wherein the search query includes a selection of a first search property comprising a first property value in the hierarchical structure, the first property value associated with a first flat path string and a second flat path string;
determining an electronic file stored on or available through a computer system or network meets the search query, wherein the electronic file determined to meet the search query includes the first search property; and
retrieving a single reference to a flat path string associated with the electronic file and not providing repeated representations of flat path strings associated with the electronic file.

8. A method for processing electronic data, comprising:
receiving data on a computer system or network indicating a hierarchical structure of a plurality of property values of an electronic file, each property value organized in the hierarchical structure by at least one flat path string identifying a unique path to a property value indicating metadata of the electronic file, wherein each flat path string is identified within a second hierarchy that is separate from the hierarchical structure, and wherein each flat path string comprises a listing of property value names for metadata of the electronic file;
receiving user input indicating a new property value to be included at a user desired location in the hierarchical structure;
based on the user desired location determining whether the new property value requires a new flat path string;
adding the new flat path string to the second hierarchy;
returning a reference to the new flat path from the second hierarchy to display the new property value within the first hierarchy;
receiving user input indicating a search query, wherein the search query includes selection of a first search property including a first property value in the hierarchical structure the first property value associated with a first flat path string and a second flat path string;
determining an electronic file stored on or available through a computer system or network meets the search query, wherein the electronic file determined to meet the search query includes the first search property stored therein or associated therewith; and
retrieving a single reference to a flat path string associated with the electronic file and not providing repeated representations of flat path strings associated with the electronic file.

* * * * *